TEST CIRCUIT FOR EVALUATING MAGNETIC MEMORY DEVICES

Filed Aug. 26, 1964

INVENTOR
WILLIAM H. KASTNING
by A. C. Schwarz, Jr.
ATTORNEY.

United States Patent Office 3,440,526

Patented Apr. 22, 1969

3,440,526

TEST CIRCUIT FOR EVALUATING MAGNETIC MEMORY DEVICES

William H. Kastning, Aurora, Ill., assignor to Western Electric Company, Incorporated, New York, N.Y., a corporation of New York Filed Aug. 26, 1964, Ser. No. 392,140
Int. Cl. G01v 33/12, 15/12
U.S. Cl. 324—34 26 Claims

ABSTRACT OF THE DISCLOSURE

Apparatus for testing individual magnetic core response and wiring in partially wired bit strips and completed memories. In testing bit strips including cores linked by a common sense winding to provide alternately poled response signals, the cores are sequentially driven through individual probes and an access matrix, and alternate ones of pairs of detectors coupled to the common sense winding evaluate the core response. The access matrix for testing complete memories includes bit and word counters for selecting each of the cores in sequence. Manual controls are provided for varying the tests performed on the cores, for repeating tests, and for selecting desired cores out of sequence.

This invention relates to a magnetic testing apparatus and, more particularly, to an apparatus for automatically testing and evaluating partially or completely fabricated assemblies including magnetic cores or elements.

Magnetic elements, such as toroidal or multi-aperture magnetic cores, provide relatively compact and economic means for storing data bits and for performing other logic operations in digital data handling systems. In some of the applications in which these elements are used, such as memory planes, a relatively large number of the cores are carried on a common support provided with a number of separate drive, bias, and sense windings. Because of the small size of the magnetic cores and the density of these cores on the supporting member, the formation of these windings usually requires a considerable amount of manual labor, and a significant part of the cost of the completed unit represents labor. Thus, if a completed assembly is found to be defective after the completion of the unit because of incorrect windings or poor electrical or magnetic characteristics of a core resulting from a number of causes such as incorrect formulation of the magnetic material or cracked or broken core bodies, a substantial loss is incurred. This loss is aggravated because of the fact that it is difficult and, in some instances, impossible to replace a defective core in a completely wired assembly.

One way of reducing these losses is to subject the individual magnetic elements to a complete evaluation prior to using the cores in the end product, such as a memory plane. The contemporaneously filed application of William H. Kastning, Ser. No. 392,139, which application is assigned to the same assignee as the present application, discloses one such system capable of performing a wide variety of tests on different types of magnetic cores. This testing, however, is not sufficient to insure the absence of defects in the completed circuit. As an example, the cores tested by the apparatus described in the contemporaneously filed Kastning application are subjected to a number of manual handling operations during the manufacture of memory sub-assemblies or bit strips in which only a part of the windings necessary in the completed unit has been provided. These manual handling and wiring operations can result in damage to the previously tested cores, such as invisible cracks, which do not become apparent until the completed memory plane is tested. These defects, as well as defects in the part of the wiring provided in the bit strips, could be detected by fully evaluating the response of each of the individual cores in the bit strip prior to assembling the bit strips in a completed memory plane. This would be particularly desirable because defective cores can be easily replaced in the bit strip because of the partially wired nature of this sub-assembly, and defective wiring occurring in the fabrication of the bit strips can also be corrected if the errors are known at this time.

When the fabrication of the end product, such as a memory plane, has been completed, it is also necessary to check the performance of the memory plane to insure the subsequent manufacturing operations have been correctly performed and that no defects have arisen in the cores resulting from the necessary handling operations. This testing must be complete enough to insure a complete evaluation of all of the necessary operating characteristics of the memory and yet should be performed automatically to reduce the time required to individually assess and test the large number of cores provided in even a small memory plane. This testing apparatus should be such as to provide an indication of the location of any faulty storage core or cell. Further, the cost of providing test equipment would be substantially reduced if the same testing apparatus can be used for evaluating completed memories and partially completed bit strip assemblies.

Accordingly, one object of the present invention is to provide a new and improved apparatus for testing assemblies including magnetic elements or cores.

Another object is to provide an apparatus operable to test either completed assemblies or subassemblies having a plurality of magnetic elements.

A further object is to provide an automatic magnetic core testing apparatus that can be conditioned to test different types of circuits including magnetic cores.

A further object is to provide an automatic magnetic memory testing apparatus including new and improved means for obtaining access to the individual bit storage elements.

A further object is to provide a magnetic memory testing apparatus including means for evaluating characteristics of a plurality of magnetic cores providing oppositely poled response signals.

A further object is to provide an apparatus for testing magnetic cores in completed or partially fabricated memory assemblies including means for subjecting each core to a series of evaluating tests.

Another object is to provide a magnetic core testing apparatus capable of automatically subjecting each core in either a complete memory unit or a memory sub-assembly to a sequence of different evaluating tests and means for automatically subjecting each of the cores in the sub-assembly or completed assembly to the test program in a predetermined sequence.

In accordance with these and many other objects, an embodiment of the invention comprises a system and apparatus for automatically evaluating and testing magnetic cores in a memory unit or plane and in a partially wired memory sub-assembly or bit strip as well as checking and evaluating the core wiring in both the memory and the bit strip. The system includes a main control circuit including evaluating circuits or detectors selectively set by response signals from the cores. The individual test or sequence of tests performed on each of the individual cores is controlled by a program generator which provides control signals defining separate and distinct time slots in a repetitive time frame. Selected ones of these time slots are supplied to core driving means and the detecting means to provide means by which the cores are set to their different magnetic states in a predetermined testing program and the detecting means in the control circuit can be rendered responsive to the response signals from the cores in a predetermined sequence or program established for evaluating not only the response of the cores but also the wiring thereto. To provide means for controlling access to each of the individual cores in the bit strip or the completed memory, the control circuit means includes means for supplying an output signal incident to the completion of each satisfactory series of tests on each core. These pulses are used to advance a bit counter for selecting successive bit storing cores. The bit counter, in turn, controls sequential operation of a word counter for controlling access to a group of cores comprising each of a number of successive data words.

This equipment can be used to check the core response and wiring in both the bit strips and the completed memory. When a bit strip containing a plurality of cores provided with inhibit windings and sense windings is to be tested, this strip is placed in a testing fixture provided with probes to which a read-write drive is supplied. The sense output common to the cores in the bit strip is coupled with the evaluation circuits in the main control, and the drive circuits including the probe connections are connected to an access matrix individual to the bit strip testing fixture. This access matrix is connected to the core drives and to the bit counter in the common equipment. The counter controls the access matrix to supply proper drives to successive cores in the bit strip in response to satisfactory completion of each core evaluation operation. The drive and sense windings on the bit strip are such that the sense leads receive oppositely poled response signals from alternate ones of the cores on the strip, and the evaluation circuit means in the control circuit include a novel arrangement by which the characteristics of the cores can be evaluated using the signals of alternate and opposite polarities.

When a completed memory comprising a plurality of bit strips to which drive windings have been added is to be tested, the bit strip testing fixture is disconnected from the common equipment, and the sense output leads from the memory are selectively coupled to the evaluating means in the control circuit by an access matrix. This matrix which also provides means for obtaining access to each bit storing core in each word is coupled to the core drivers and to both the bit counter and the word counter in the common equipment. In response to the completion of each complete testing sequence on each core, the control circuit advances the bit counter a single step so that the access matrix connects the core drivers to the next bit storing core to be tested. This operation continues until all of the bit storage cores in a given word have been completely evaluated. At this time, the bit counter is reset and supplies an operating pulse to the word counter so that the access matrix is controlled during a succeeding cycle of operation of the bit counter to couple the core drivers in sequence to each of the bit storage cores in the next word. This operation continues until all of the bit storage cores in the memory have been tested or until an improper operating condition has been detected.

In this manner, the same unit of common equipment, including the core drivers, the program generator, the control and evaluating circuits, and the bit and word counters can be used for testing either partially assembled components of the memory or a completed memory without requiring the provision of separate testing units. The program generator is capable of controlling the performance of several different types or sequences of tests on the cores in either of the two units to be tested and can be used with cores of widely divergent characteristics. Further, the system is capable of performing repetitive tests on an individual core and of obtaining access to any individual core in either the bit strip or the memory without requiring the prior testing of any other cores disposed prior to the desired core in the normal testing sequence.

Many other objects and advantages of the present invention will become apparent from considering the following detailed description in conjunction with the drawings in which:

FIGS. 2A–6B illustrate logic symbols and representative logic circuits used in the system;

Figure 27:
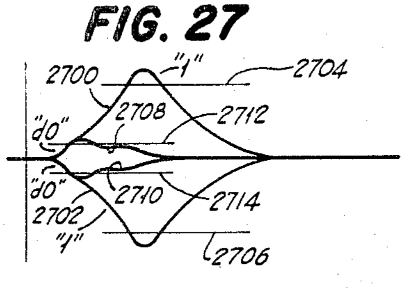
Figure 28:
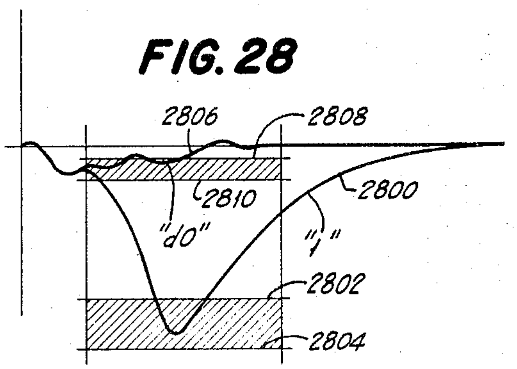
Figure 29:
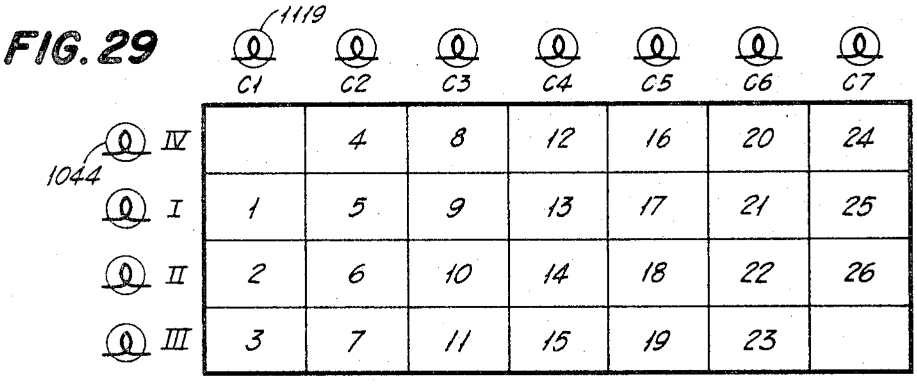
Figure 30:
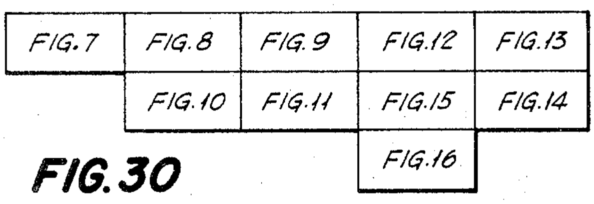

FIGS. 7–16 form a complete logic diagram of the system embodying the present invention;

FIGS. 17–21 are schematic diagrams showing the magnetic states of a magnetic core or transfluxor element when tested in a bit strip;

FIGS. 22–26 are schematic diagrams showing the magnetic states of the transfluxor element when tested by the system as part of a completed memory;

FIG. 27 illustrates waveforms showing the testing and evaluating operations performed on the cores in the bit strip;

FIG. 28 shows waveforms illustrating the tests performed in a completed memory;

FIG. 29 is a schematic drawing of a visual word position display used in the system; and FIG. 30 is a block diagram illustrating the manner in which FIGS. 7–16 of the drawings are placed adjacent each other to form a complete logic diagram of the magnetic testing apparatus embodying the present invention.

Figure 1:
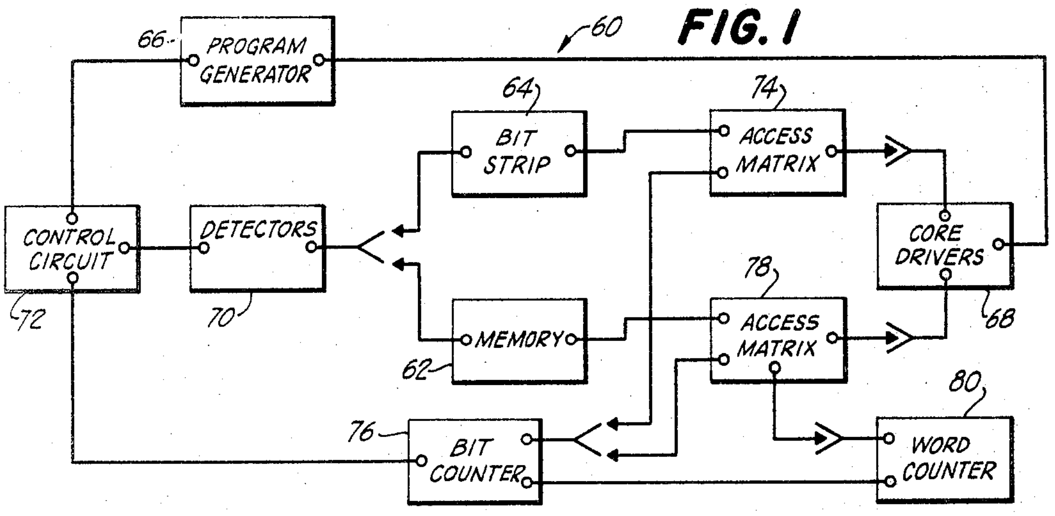
FIG. 1 is a block diagram of a testing system and apparatus embodying the present invention.

Referring now more specifically to FIG. 1 of the drawings, therein is illustrated an apparatus or system 60 which embodies the present invention and which is adapted to evaluate the magnetic characteristics of a plurality of magnetic cores or memory cells and to check the wiring to these cores. The system 60 is capable of individually checking each of the magnetic memory elements in either a completed memory unit 62 or in a bit strip 64 which comprises a sub-assembly of the memory unit 62 including a smaller number of memory cores which are only partially wired. The system 60 is capable of operating the memory cores to their different magnetic states and of fully evaluating the response signals resulting from operation to these different states as well as checking the adequacy of the wiring to each of the cores. This operation is performed automatically and requires no manual intervention other than the insertion of either the memory 62 or the bit strip 64 to be tested.

The testing system or apparatus includes a program generator 66 which provides a plurality of control signals defining discrete time slots in a repetitive time frame. The testing apparatus 60 is so arranged that all of the tests for evaluating the characteristics of a single magnetic element are performed in the different time slots of a single time frame and so that identical test sequences are carried out on successive ones of the cores during successive time frames. To place the magnetic memory cells or storage elements in their different magnetic states incident to the testing operation, the apparatus 60 includes a plurality of core drivers 68 which are selectively connected to the program generator 66. The response signals developed by the magnetic elements in response to operation through their different magnetic states are evaluated by a plurality of detectors 70 which are coupled to the program generator and to a control circuit 72. The connections between the core driver 68 and the program generator 66 are such that, for instance, "1"s and "0"s are written in the magnetic memory elements during certain time slots and read signals are applied to these cores in other time slots. The plurality of detectors 70 are coupled to the core under test by the program generator 66 in the same time slots in which the read drivers are enabled to permit the detectors 70 to evaluate the response signals resulting from the read drives.

The results of the different individual tests in the test sequence performed in a single time frame are stored in the control circuit 72. These test results are checked in the control circuit 72 to determine whether they are satisfactory. The program generator 66 is inhibited following the end of the time frame in which the tests are performed and is returned to an operative state by the control circuit 72 only when the results of the tests are found to be satisfactory. If the evaluating tests are not satisfactorily completed, the control circuit 72 provides an indication of this fact and prevents further operation of the program generator 66 until restarted.

When a bit strip 64 is to be tested by the apparatus 60, the sense leads from the partially wired magnetic elements are coupled to the inputs of the detectors 70, and an access matrix 74 comprising a circuit for directing the drive signals in sequence to the different memory elements in the bit strip 64 is connected to the output of the core drivers 68. The access matrix 74 is also coupled to the output of a bit counter or counting circuit 76, the input of which is coupled to the control circuit 72. At the end of each time frame or at the end of a sequence of tests on a given magnetic element that is satisfactorily completed, the control circuit 72 provides an operating signal to the bit counter 76 to advance this counter a single step so that the access matrix 74 selects the next magnetic element in the bit strip 64 to receive the following cycle of drive pulses from the core drivers 68. At this time, the control circuit 72 also removes the inhibit from the program generator 66 so that the test sequence on the next magnetic element can be initiated. This operation continues to test all of the magnetic elements in the bit strip 64 or until a single magnetic element providing improper test results is found.

When the complete memory unit 62 is to be tested, the connections from the bit strip 64 and the bit strip access matrix 74 to the system 60 are removed, and the memory 62 and a memory access matrix 78 are connected to the system 60. The access matrix 78 provides means for coupling the core drivers 68 to the core drive windings to control the application of sequential drives to the cores in the memory 62 and for coupling the sense windings on successive cores to the detectors 70. This access matrix 78 is connected to the bit counter 76 and to a word counter 80 which is advanced a single step in response to each cycle of operation of the bit counter 76. When the system 60 is placed in operation to test the memory 62, the program generator 66 controls the core drivers 68 to provide a cycle of read and write pulses to the access matrix 78 which are directed to the first memory cell in the memory 62 to be tested. The program generator 66 enables the plurality of detectors 70 during the slots of the single time frame in which read pulses are applied by the core drivers 68. At the end of the time frame during which the first magnetic element is tested, the control circuit 72 inhibits the program generator 66 and determines whether the results of the prior testing operation represented by the output potentials from the detectors 70 indicate a satisfactory conclusion of the testing operation.

If so, the control circuit 72 supplies an operating signal to the bit counter 76 to advance the access matrix 78 to select the next memory cell in the first word to be tested. The control circuit 72 also supplies a signal to the program generator 66 so that it operates through another cycle of operation in which a selected combination of time slot signals are applied to the detectors 70 and the core drivers 68. The second memory cell in the first word is now tested. This operation continues until such time as all of the bits in the first word in the memory 62 have been checked, or, alternatively, until an improperly operating core is detected. As the completion of the testing of all the memory cells in the first word, the bit counter 76 advances the word counter 80 a single step to select the group of cores providing the second word in the memory 62. The control circuit 72 then operates the bit counter 76 through a second cycle of operation in which each of the magnetic cores in the second word are individually tested, each within a single time frame provided by the program generator 66. This operation continues to test all of the memory cells in the memory 62 or until an improperly operating or improperly wired cell is located. In this manner, the system 60 is operated to automatically perform a complete set of evaluating tests on the magnetic elements in either a bit strip 64 or a completed memory 62.

Although the system and apparatus 60 can be used to test many different types of magnetic memory units or other circuit components using a plurality of magnetic elements, the operation of the system 60 is illustrated in conjunction with a memory unit 62 which is word organized for sequential access at a cycle time of approximately three microseconds. The memory 62 has a storage capacity of twenty-six words of twenty-four bits each and comprises a total of six hundred and twenty-four memory cells or magnetic elements. The partially wired memory sub-assembly or bit strip 64 with which the operation of the system 60 is illustrated comprises a board containing two separate rows of twenty-six memory cells or cores. On the bit strips, each of the rows of twenty-six magnetic elements is linked by one common drive winding identified as an inhibit or digit winding and a common sense winding. In the completed memory unit, thirteen of the bit strips 64 are linked by additional drive windings terminating in an additional diode board which controls access to the drive windings.

The system and apparatus 60 is also capable of testing and evaluating bit strips 64 or memory units 62 using individual memory cells or magnetic units of many different types. However, the system 60 is illustrated and described in conjunction with a magnetic core or transflux or element 100 (FIGS. 17–26) which can be of the same general type as that shown and described in detail in U.S. Patent No. 2,926,342 and which comprises a generally uniplanar and rectangular body of a square loop ferrite material formed, for instance, of a zinc-magnesium-manganese-ferrite mixture. This material is suitable for high speed storage and switching elements because of its substantially rectangular hysteresis loop (a coefficient of squareness of .95) and its high direct current resistivity on the order of $10^6$ ohm-centimeter. One ferrite core with which the testing apparatus has been used comprises a .121 x .090 x .016 inch body with three .018 inch openings 102, 104, and 106 spaced along its longitudinal axis on .04 inch centers so as to divide the length of the core 100 into four transversely extending core legs 108, 110, 112, and 114. These cores preferably are individually tested before assembly in the bit strip 64 using suitable evaluating equipment, such as that shown and described in the above-identified application of William H. Kastning.

The apertures 102 and 104 of the magnetic core 100 are threaded by drive windings, and the aperture 106 is threaded by a sense winding. Since the sense or output winding is separated from the drive windings, the flux reversals in the core leg 114 required for the production of an output potential in the sense winding are obtained by flux steering operations in the various legs of the core 100 in response to programmed combinations of drive currents. One flux steering mode is used for testing the magnetic cores 100 in the bit strips 64, and a different flux steering mode is used when the core 100 is tested as part of the memory unit or plane 62.

Figure 22:
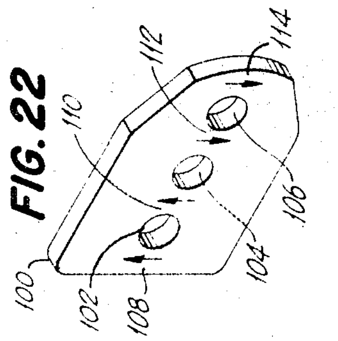

An uninhibited flux steering mode is used when the core 100 forms a part of the memory 62, and the flux states in the core 100 obtained in the uninhibited mode are illustrated in FIGS. 22–26 of the drawings. In these drawings, the directions of the remanent magnetic states in the core legs 108, 110, 112, and 114 are illustrated by the arrows appearing thereon. FIG. 22 shows the core in an initial or normal condition following a read operation in which the flux in the core legs 108 and 110 is directed upwardly and the remanent flux in the legs 112 and 114 is directed downwardly.

Figure 23:
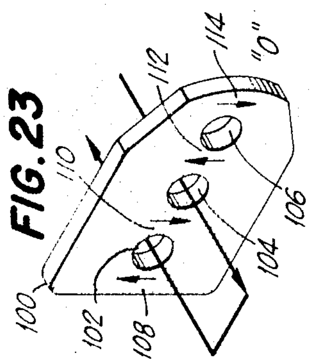

In the uninhibited flux switching mode used in the completed memory 62, concurrent currents are used to write or store a binary "1" so as to facilitate core selection. FIG. 23 of the drawings illustrates one of these two concurrent drives which leaves the core 100 in a "0" state. The drive shown in this figure includes a current flowing out of the page through the center aperture 104 and into the page through the end aperture 102. This results in a reversal of the remanent magnetic states in the legs 110 and 112. However, this does not result in a change in the remanent flux state of the leg 114 coupled by the sense winding.

Figure 24:
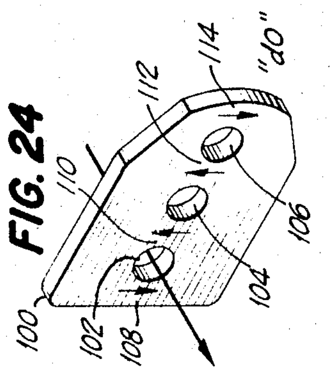

The individual application of the other one of the two drives used to write a "1," a digit or inhibit drive, changes the core 100 to the magnetic condition shown in FIG. 24 which is identified as a disturbed "0" or a "*d*0" state. This second drive consists of a current flowing out of the page through the end aperture 102 and results in a remanent magnetic state in which the flux in the two center legs 110 and 112 is upwardly directed and the flux in the end legs 108 and 114 is downwardly directed. The area of the leg 112, which is somewhat larger than the area of the legs 108 and 110, absorbs any flux tending to switch the remanent state of the leg 114 when the drive shown in FIG. 24 is applied.

Figure 25:
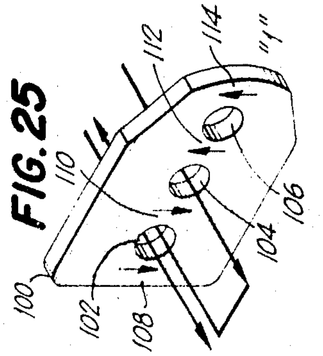

To write the "1" in the core 100 using the uninhibited switching mode, both of the drives shown in FIGS. 23 and 24 are applied, as illustrated in FIG. 25 of the drawings. The concurrent application of these two drives shifts the remanent magnetic states of the legs 108, 110, 112, and 114 to a position completed reversed from that provided in the core 100 in its initial state (FIG. 22). More specifically, the flux in the legs 108 and 110 is downwardly directed, and the flux in the legs 112 and 114 is upwardly directed. Thus, when the core 100 has been placed in a "1" state, the flux in the output or sense core leg 114 has been reversed.

Figure 26:
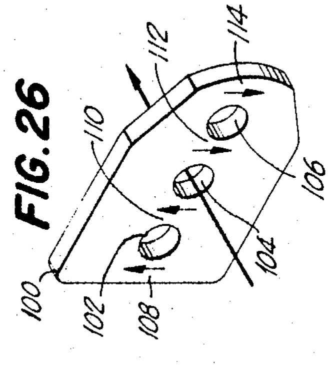

The magnetic state of the core 100 is read in the uninhibited mode by a single read drive signal or pulse passing inwardly into the page through the center aperture 104 as illustrated in FIG. 26 of the drawings. This read pulse restores the remanent flux conditions in the legs 108, 110, 112, and 114 to the initial state illustrated in FIG. 19 in which the flux is upwardly directed in the legs 108 and 110 and is downwardly directed in the legs 112 and 114. If the read pulse is applied to the center aperture 104 with the core 100 in the "0" state shown in FIG. 23 or the "*d*0" state shown in FIG. 24, the direction of the flux in the output leg 114 is not reversed, and an output or response voltage is not induced in the sense winding. Alternatively, if the core 100 is in the "1" state shown shown in FIG. 25, the application of the read pulse shown in FIG. 26 reverses the flux in the core leg 114 and induces an output potential in a sense winding linking this leg.

Thus, the operation of the core 100 in the uninhibited mode in the memory plane requires the application of the concurrent drives shown in FIG. 25 to write a "1" in the core 100 and therefore provides the selectivity desirable in the memory 62. However, the use of the uninhibited mode to test the core or magnetic element 100 in the partially wired bit strip 64 would require mechanically probing both of the drive holes 102 and 104 in each of the twenty-six cores 100 in one row on the bit strip 64 to establish the drive windings necessary. This is true because the only drive winding wired in the bit strip 64 is the inhibit or drive winding shown schematically in FIG. 24. Further, this inhibit drive winding is a two turn winding, and the diameter of the opening 102 is only .018 inch spaced only .04 inch from the opening 104. It is quite difficult to safely and accurately probe an opening of this size containing a winding with a mechanical probing fixture, particularly when twenty-six such openings must be simultaneously probed at a distance of only .04 inch from twenty-six probes for the center drive holes 104. Accordingly, in the testing apparatus embodying the present invention, the cores 100 are tested in the bit strip 64 using an inhibited flux steering mode. This flux steering mode provides magnetic states substantially corresponding to those provided in the core 100 when operated in the uninhibited mode, but does not require the presence of more than a single winding in any of the drive apertures 102 and 104. The winding for the opening 102 is provided by the wired inhibit winding, and the mechanical fixture used with the bit strip 64 must provide only twenty-six probes for the center holes 104.

The drives used in the inhibited flux steering mode and the resulting magnetic states in the core 100 are illustrated in FIGS. 17–21 of the drawings. The initial state of the core 100 or its condition following a read operation is the same as that illustrated in FIG. 22 of the drawings. In the inhibited mode, concurrent drives are used to place the core 100 in a "0" condition, and a single drive is used to place the core in either of two different "1" conditions.

Figure 17:
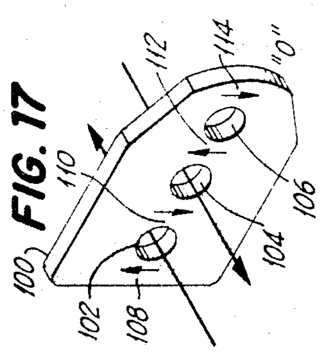

In the inhibited mode, the core 100 is placed in a "0" condition by providing a write current flowing out of the page through the center aperture 104 and by providing an inhibit current flowing into the page through the end drive aperture 102, as shown in FIG. 17. This places the remanent flux states in the four core legs 108, 110, 112, and 114 in the same condition as in the "0" condition provided by the single drive conductor in the uninhibited flux switching mode (FIG. 23) which returns through the end aperture 102. Thus, the flux in the sense leg 114 of the core 100 is not shifted from the initial condition shown in FIG. 22 when the core 100 is placed in a "0" condition.

If the "0" state of the magnetic core 100 is disturbed by the application of an inhibit signal comprising a current passing into the page through the opening 102 (FIG. 20), the core geometry does not permit the flux states in the core legs to change, and the direction of the flux in the sense leg 114 remains unchanged. Thus, the disturbed "0" or "*d*0" condition of the core 100 in the inhibited mode (FIG. 17) provides flux states in the four core legs that are identical to the "0" state of the core 100 in the uninhibited mode (FIG. 23).

Figure 18:
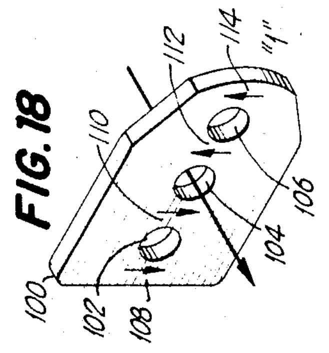

The core 100 is switched to a "1" condition by providing a current out of the page through the center aperture 104, as shown in FIG. 18. In the "1" state, the flux in the core legs 108 and 110 is directed downwardly, and the flux in the core legs 112 and 114 is directed upwardly. This provides the same "1" magnetic state illustrated in FIG. 25 of the drawings for the uninhibited "1." Thus, the flux in all of the legs 108, 110, 112, and 114 has been reversed from the initial state shown in FIG. 22 without requiring the plurality of windings in the drive aperture 102 used in the uninhibited mode.

Figure 19:
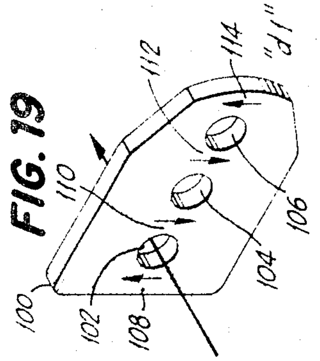

In the inhibited mode, the provision of an inhibit current into the page through the end drive hole 102, as shown in FIG. 19, results in disturbed or loaded "1" flux state in the core 100 designated by the symbol "*d*1." In this state, the flux in the core leg 112 is reversed in direction from that provided in the "1" state (FIG. 18). This reversal has the effect of providing a somewhat greater amplitude "1" output signal when the core 100 is read. This greater amplitude output signal is due to the fact that the flux in the legs 108 and 112 is already in the direction in which it is placed by the read signal, and less flux reversal is required to switch the core 100 from a loaded "1" or "*d*1" condition (FIG. 19) than from the normal "1" state (FIG. 18). Since the magnitude of the output potential developed in the sense winding linking the sense leg 114 is proportional to the rate of change in the flux in the core leg 114, the faster reversal of the flux in this core leg when the core 100 is in the "*d*1" condition results in a somewhat greater amplitude output potential.

Figure 20:
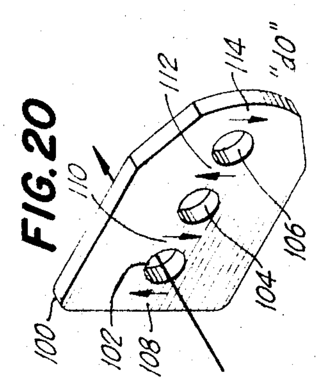
Figure 21:
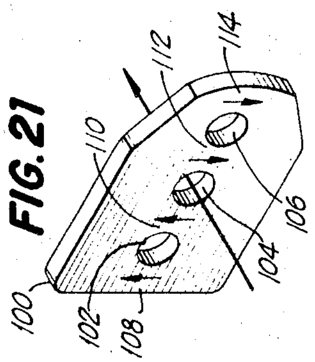

The core 100 is read in the inhibited mode in the same manner as in the uninhibited mode by providing a read current into the page through the center drive aperture 104 (FIG. 21). This restores the flux in the core legs 108, 110, 112, and 114 to the initial state shown in FIG. 22. If the core 100 is in one of the magnetic states shown in FIG. 18 or 19 when the read current is applied, the reversal of the direction of flux in the core leg 114 produces an output potential in the sense winding linking the leg 114. Alternatively, if the core 100 is in the "0" or "*d*0" conditions shown in FIGS. 17 and 20, the direction of the flux in the core leg 114 is not reversed, and an output signal is not induced in the sense winding.

Thus, the core 100 can be operated in the inhibited flux switching mode illustrated in FIGS. 17–21 to provide "0," "*d*0," and "*d*1" states substantially identical to the similar states provided by the uninhibited flux switching mode illustrated in FIGS. 22–25 of the drawings. However, by operating in the inhibited flux switching mode, the need for establishing two windings in any given one of the driver apertures 102 or 104 does not arise, and this makes operation in the inhibited mode preferable for bit strip testing operations requiring mechanical probes while permitting the same testing and evaluation of the core 100 as if operated in the uninhibited mode used in the memory unit 62.

The details of the testing system 60 shown in block form in FIG. 1 are illustrated in FIGS. 7–16 of the drawings by the use of logic diagrams in which the various circuit components are shown in logic schematic form. In the logic diagrams, each circuit component, such as an inverter, is represented by a particular logic symbol. The logic symbols for certain of the circuit components together with typical circuit arrangements represented by the symbols are illustrated in FIGS. 2–6 of the drawings. Each of these figures includes both an illustration of the logic symbol and a typical circuit represented by the symbol. Although the illustrated representative circuits are conventional in design, a brief description of these circuits is set forth below.

Figure 2A:
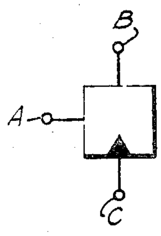
Figure 2B:
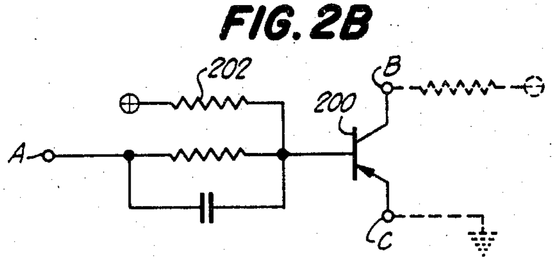

The logic symbol for an inverter is illustrated in FIG. 2A, and a typical circuit for this inverter is illustrated in FIG. 2B. The circuit includes a transistor 200 whose collector electrode is connected to a terminal B and whose emitter electrode is connected to a terminal C. In circuit applications, the terminal B is normally connected to a nominal negative potential of fifteen volts through a load, such as a resistance element shown in dashed outline in FIG. 2B. If desired, the external load connected to the terminal B can include a clamping diode returned to a negative reference potential such as three volts. The emitter electrode is normally returned to a more positive potential, such as ground, as shown in dashed line. In some applications, the terminals B and C of several inverters are connected in series between ground and the negative potential to provide a NAND gate. The base of the electrode is connected to a positive biasing potential through a resistance element 202 that normally maintains the transistor 200 in a nonconductive condition. The base is also coupled to an input terminal A. In the rectangle forming the inverter logic symbol shown in FIG. 2A, the terminal C connected to the emitter of the transistor 200 is indicated by a darkened triangle and is always disposed in alignment with an output lead extending to the collector terminal B. The lead to the base terminal B can appear on either side of the rectangle in the logic diagram.

Figures 3A, 3B:
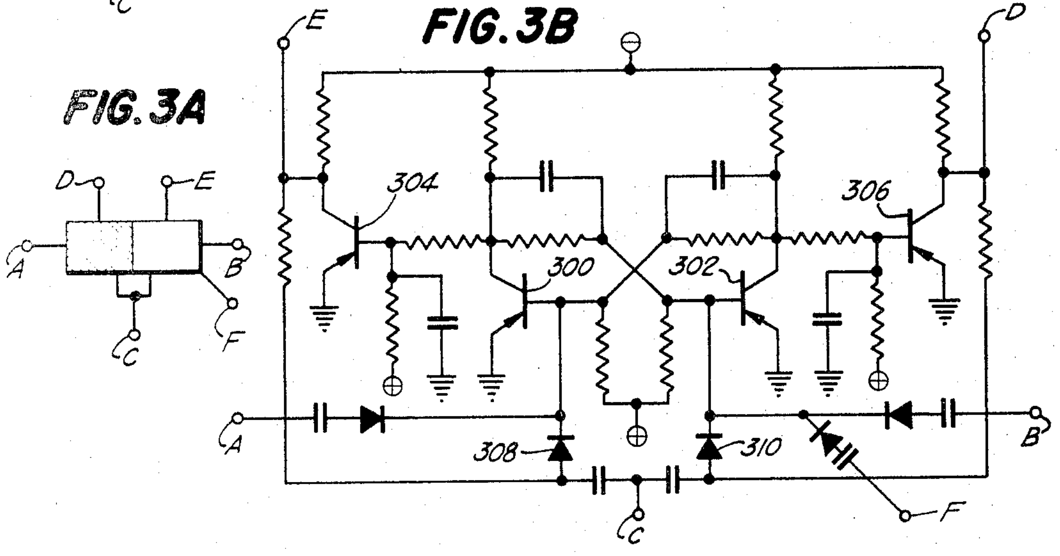

The logic symbol for a representative flip-flop is shown in FIG. 3A, and a typical circuit represented by this symbol is shown in FIG. 3B. The flip-flop includes a pair of cross-coupled transistors 300 and 302 forming a bistable circuit and a pair of output transistors 304 and 306. In the reset condition of the circuit representing a binary "0," the output transistor 306 and the flip-flop transistor 300 are in a conductive condition. The remaining two transistors 303 and 304 are in a nonconductive condition. This means that when the flip-flop is in a reset or "0" representing condition, the conductive transistor 306 applies a more positive potential to an output terminal D and a more negative potential is supplied to an output terminal E. The ground potential applied to the terminal D is represented by the shaded portion of the rectangle forming the logic symbol shown in FIG. 3A, and the negative potential applied to the output terminal E is represented by the open section of this rectangle. In the logic diagram, the logic symbol for the flip-flop can appear in reversed or inverted position.

When the flip-flop is to be set, a positive-going signal is applied to an input terminal A and is coupled through a diode to the base of the transistor 300. This places its base at a positive potential with respect to its emitter and places this transistor in a nonconductive condition. When the transistor 300 is placed in a nonconductive condition, the potential applied to the base of the transistor 302 is driven in a negative direction to place this transistor in a conductive state. The shift in the conductive states of the two transistors 300 and 302 places the transistor 306 in a nonconductive condition and places the transistor 304 in a conductive condition. When the transistor 306 is in a nonconductive condition, the potential of the output terminal D drops to a more negative potential, and the potential at the output terminal E rises to a more positive potential when the transistor 304 is placed in conduction. The flip-flop can be restored to its reset or "0" representing condition by the application of a positive-going signal to either of a pair of input terminals B and F. A complementing input terminal C is coupled to the base electrodes of both of the transistors 300 and 302 through a pair of diodes 308 and 310 so that the application of a positive-going pulse to this terminal shifts the flip-flop from its existing state to its alternate stable state.

Figures 4A, 4B:
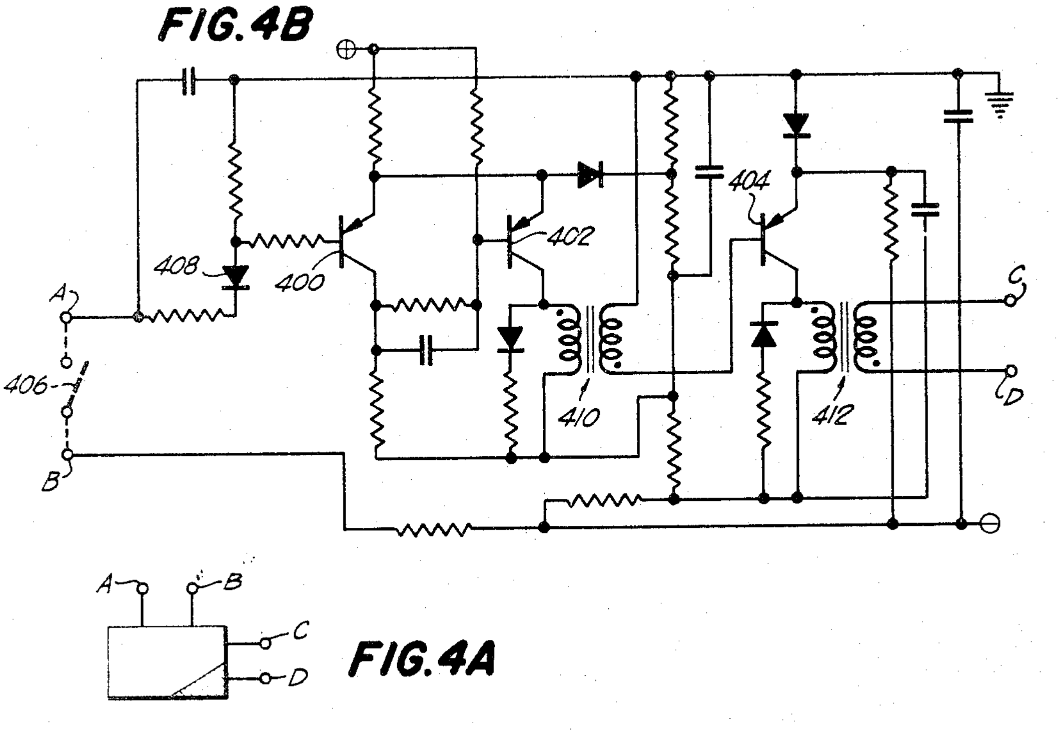

FIG. 4A of the drawings illustrates a logic symbol for a pulse generator, and FIG. 4B illustrates a circuit diagram for a typical pulse generator represented by the logic symbol. In general, when a pair of terminals A and B are momentarily connected together, the pulse generator supplies a negative-going pulse to an output terminal C or a positive-going pulse to an output terminal D.

Referring more specifically to the circuit diagram shown in FIG. 4B, the pulse generator includes three transistors 400, 402, and 404 of which only the transistor 402 is in a conductive state in the normal condition of the pulse generator. When the input terminals A and B are connected together, as by the closure of a switch 406, a more negative potential is forwarded through a diode 408 to the base of the transistor 400 to place this transistor in conduction. When the transistor 400 is placed in a conductive state, a more positive potential is applied to the base of the transistor 402 to place this transistor in a nonconductive state.

When the transistor 402 is placed in a nonconductive state, the termination of current flow through the primary winding of a transformer 410 induces a negative-going pulse in a secondary winding which is applied to the base of the normally nonconductive transistor 404. This places the transistor 404 in conduction so that current flows through the primary winding of a pulse transformer 412. Since the base of the transistor 404 receives only a momentary pulse from the pulse transformer 410, it returns to a nonconductive state and terminates the flow of current through the primary winding of the pulse transformer 412. If the output terminal C is grounded, the current flow through the primary winding of the pulse transformer 412 when the transistor 404 is placed in conduction provides a positive-going pulse at the output terminal D. Alternatively, if the output terminal D is grounded or connected to a source of reference potential, the flow of current through the primary winding of the pulse transformer 412 provides a negative-going pulse at the output terminal C. Oppositely poled pulses are produced at the terminals C and D due to the collapse of the primary field of the transformer 412 when the transistor 404 returns to a nonconductive state. The transistors 400 and 402 return to normal conditions of conduction when the switch 406 is opened.

Figures 5A, 5B:
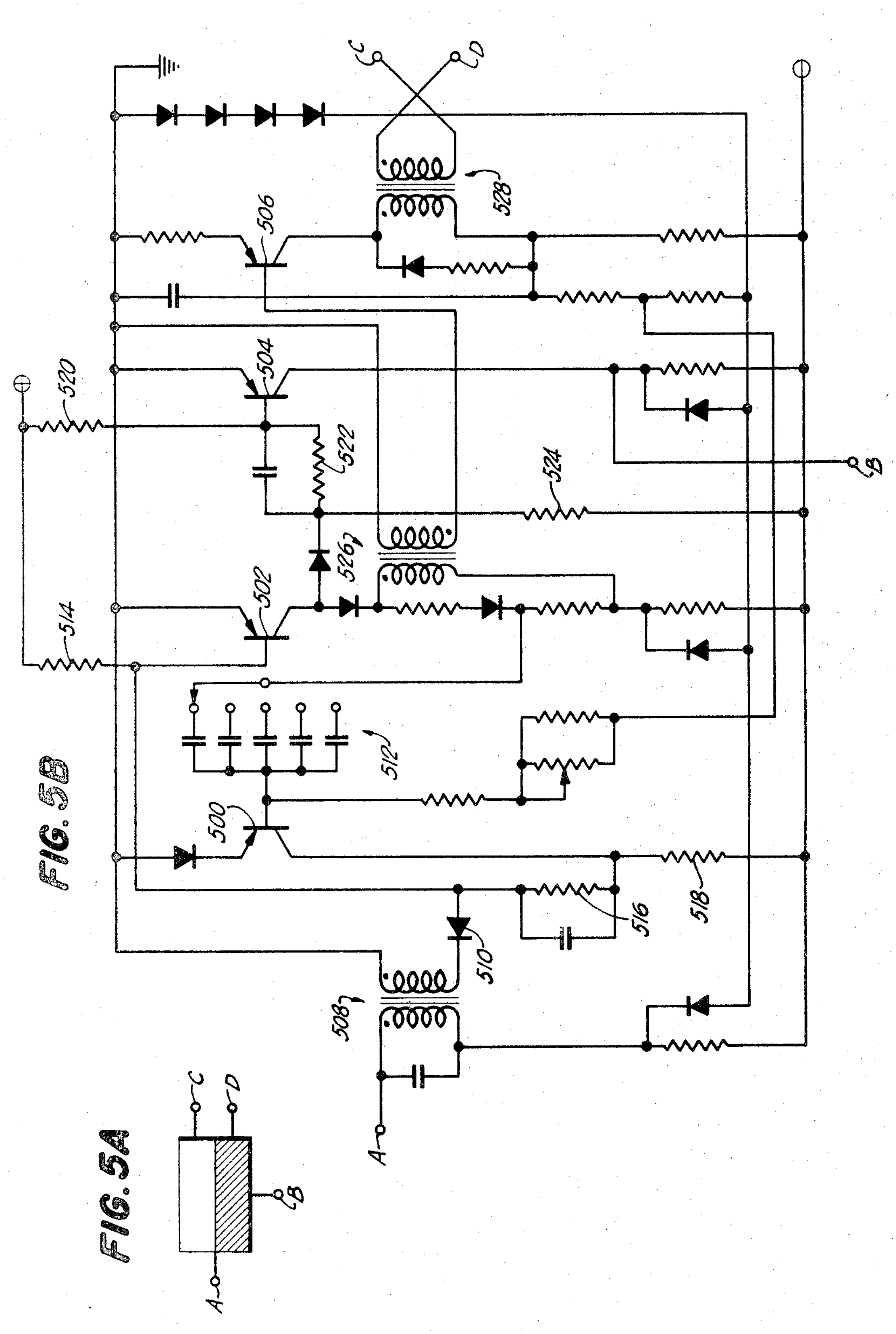

FIG. 5A of the drawings illustrates a logic symbol for a monostable circuit or delay circuit, and a typical circuit corresponding to this symbol is illustrated in FIG. 5B. In general, the monostable circuit is controlled by an input signal applied to an input terminal A to produce a steady state negative output signal at an output terminal B for selected period of time. The duration of the negative-going output signal at the terminal B is independent of the duration of the signal applied to the input terminal A. This circuit also supplies either a positive-going pulse at a terminal D or a negative-going pulse at a terminal C at the termination of the delay interval.

Referring now more specifically to the monostable circuit shown in FIG. 5B, this circuit includes four transistors 500, 502, 504, and 506, two of which, 500 and 504, are normally in a conductive condition. The conductive transistor 504 normally maintains a more positive or a potential approaching ground at the output terminal B as indicated by the shading in the lower portion of the rectangle forming the logic symbol illustrated in FIG. 5A. When a negative-going signal is applied to the terminal A, a pulse transformer 508 couples the negative-going signal through a diode 510 to the base of the transistor 502 to bias this base negative relative to its grounded emitter. This places the transistor 502 in conduction so that a positive-going pulse is coupled through a selected one of a plurality of timing condensers 512 to the base of the conductive transistor 500. This places the transistor 500 in a nonconductive condition. When the transistor 500 is placed in a nonconductive condition, a voltage divider including a plurality of resistance elements 514, 516, and 518 applies a steady state negative potential to the base of the transistor 502 to hold this transistor in a conductive condition.

When the transistor 502 is placed in a conductive condition, an intermediate point on a voltage divider including a plurality of resistance elements 520, 522, and 524 is returned to ground potential, and a more positive potential is applied to the base of the normally conductive transistor 504 so that this transistor is placed in a nonconductive condition. This places a negative potential on the output terminal B. The conductive transistor 502 also pulses the primary winding of a transformer 526. However, the polarity of the output pulse developed in the secondary winding of this transformer biases the base of the normally nonconductive transistor 506 in a positive direction and does not change the nonconductive state thereof.

The delay of the monostable circuit is determined by the selection of one of the plurality of capacitors 512 and the resistance of the elements connected to the base of the transistor 500. After a delay interval determined by the RC time constant of these components, the base of the transistor 500 drops to a negative potential relative to its emitter, and this transistor is placed in a conductive condition. When the transistor 500 is placed in a conductive condition, the negative potential is removed from the base of the transistor 502, and this transistor returns to a nonconductive state so that the base of the transistor 504 is driven in a negative direction relative to its emitter to place this transistor in a conductive condition. This terminates the application of the negative potential to the output terminal B.

In addition, the termination of current flow through the transistor 502 is effective through the pulse transformer 526 to couple a momentary negative-going pulse to the base of the transistor 506. This places this transistor in a conductive condition so that current flows through the primary winding of a pulse transformer 528. If the output terminal D is grounded, the flow of current through the primary winding of the pulse transformer 528 produces a negative-going pulse at the output terminal C. Alternatively, if the output terminal C is grounded or connected to a reference potential, the secondary winding of the transformer 528 produces a positive-going pulse at the output terminal D.

Thus, the monostable circuit provides a negative-going signal at the output terminal B persisting for the duration of the time delay of the monostable circuit, and the terminals C and D selectively provide oppositely poled pulses at the end of this delay interval. In the logic diagram, only the terminals of the logic symbol that provide output signals that are used are shown.

Figures 6A, 6B:
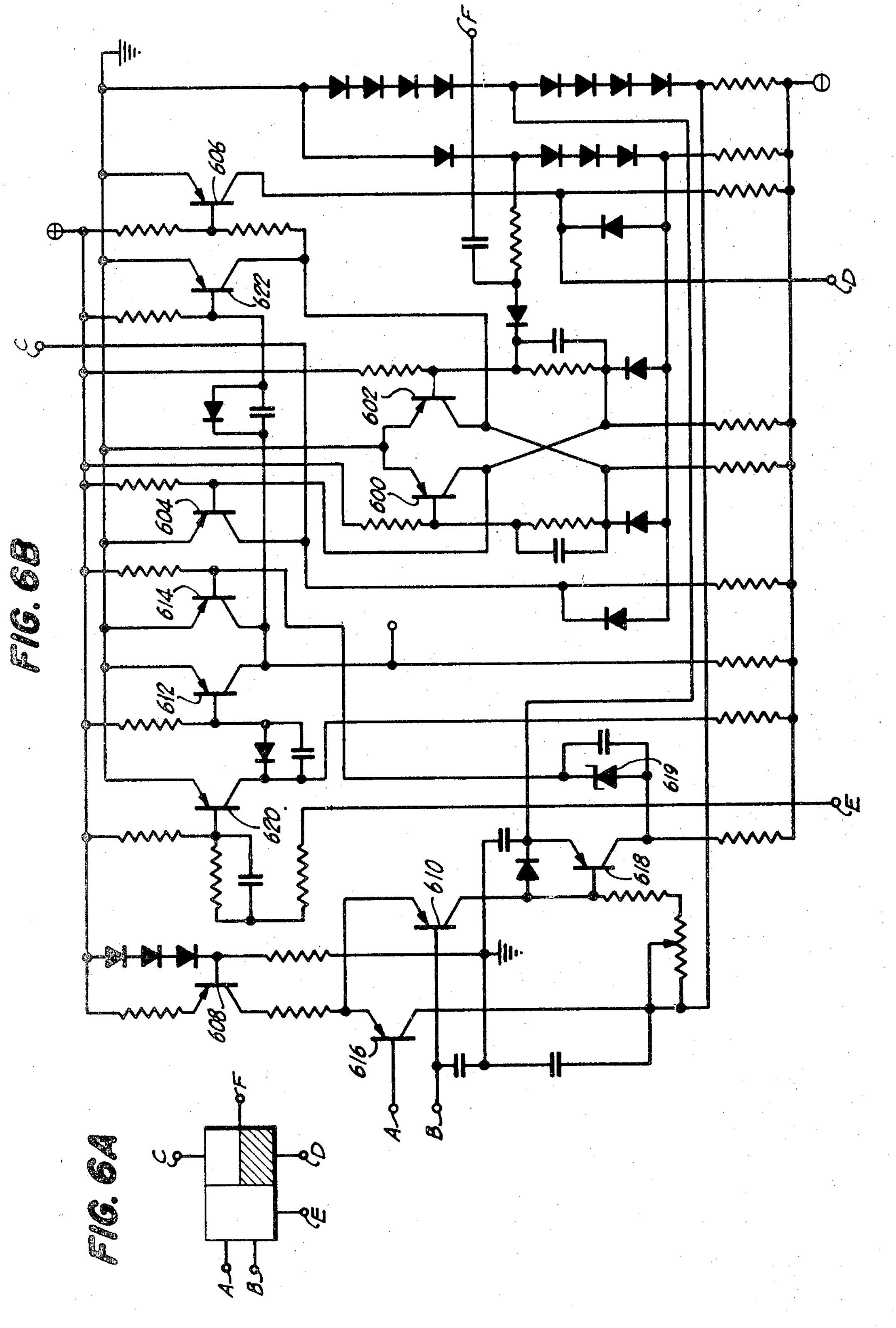
Figure 7:
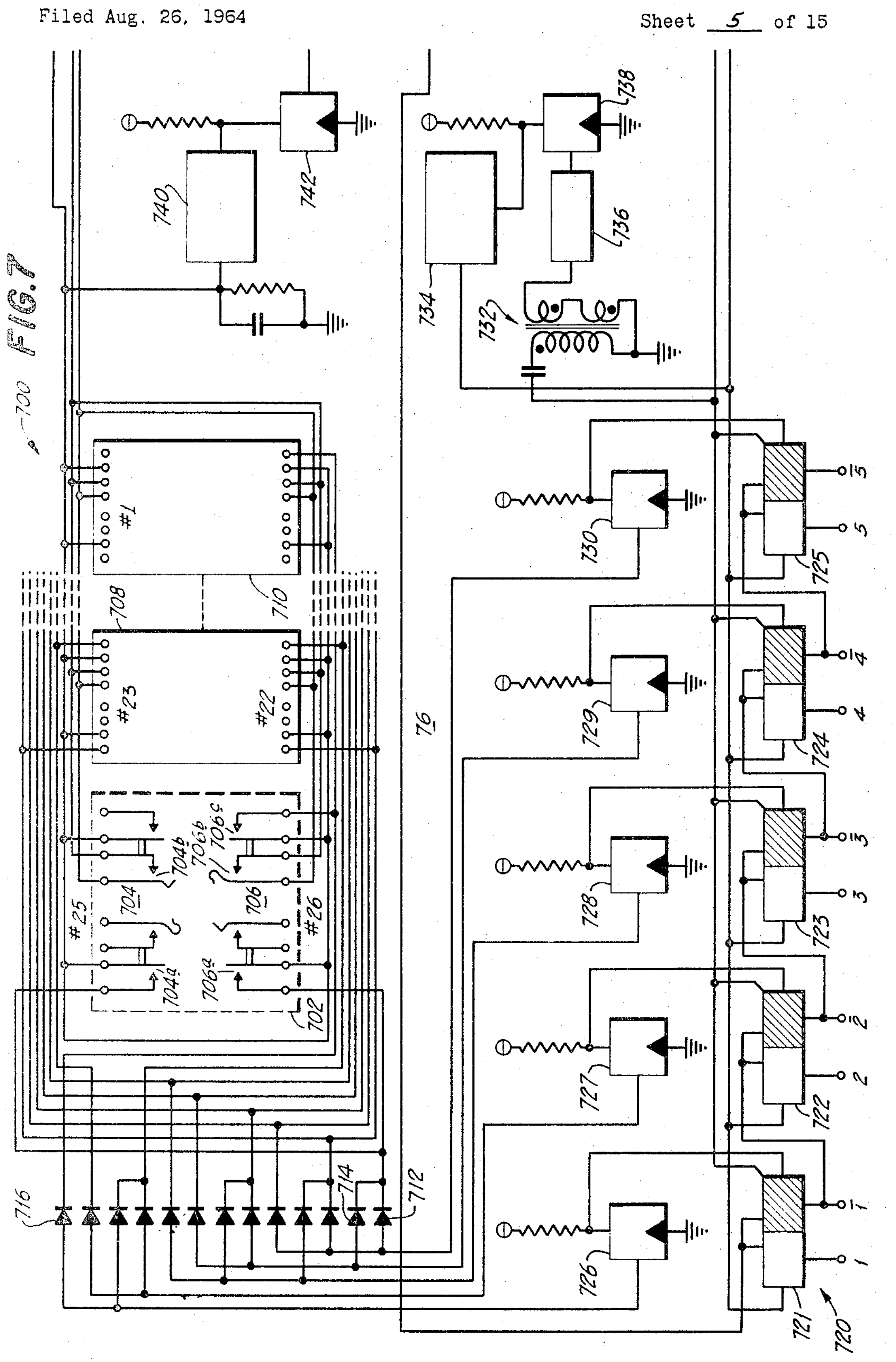
Figure 8:
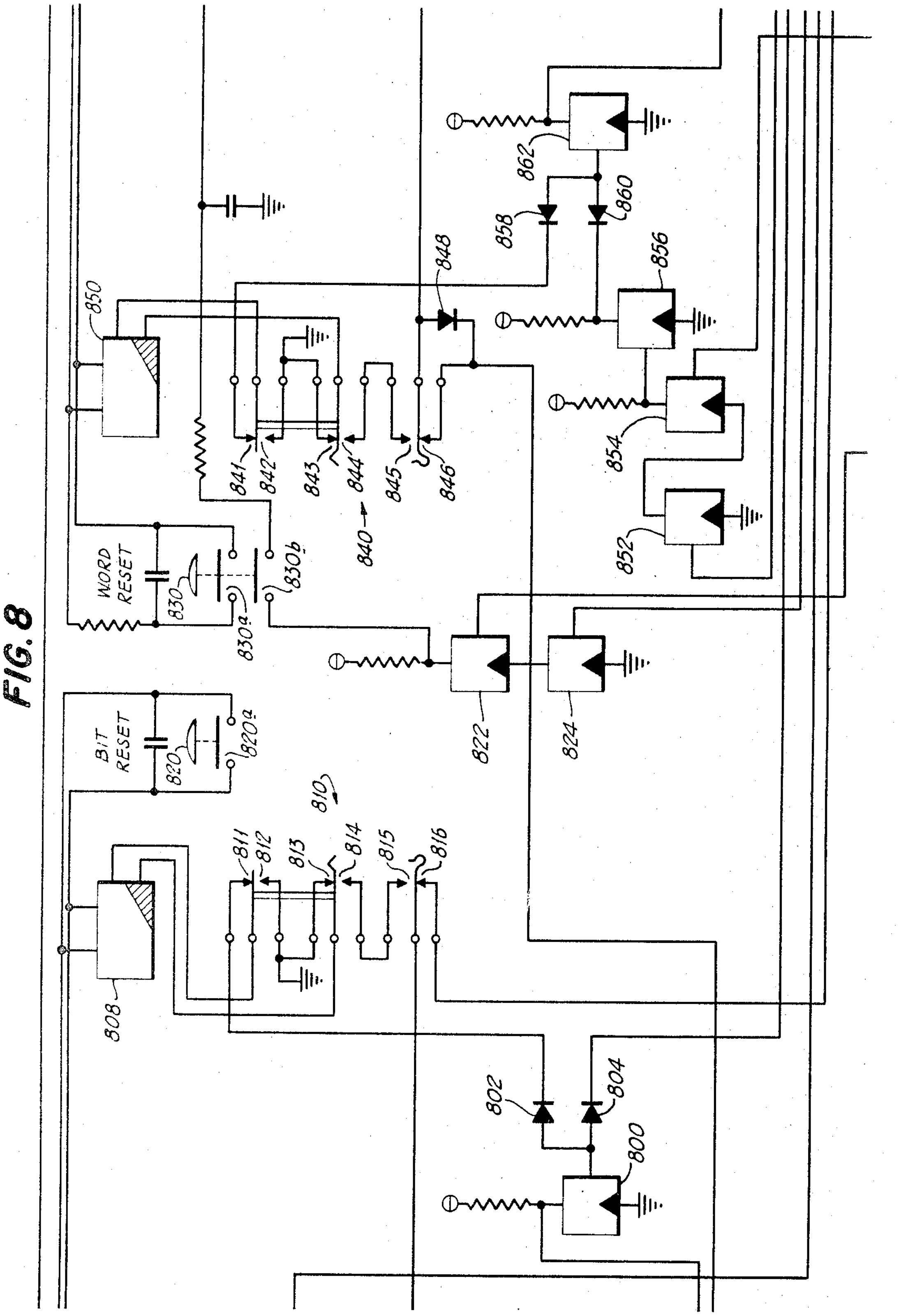
Figure 9:
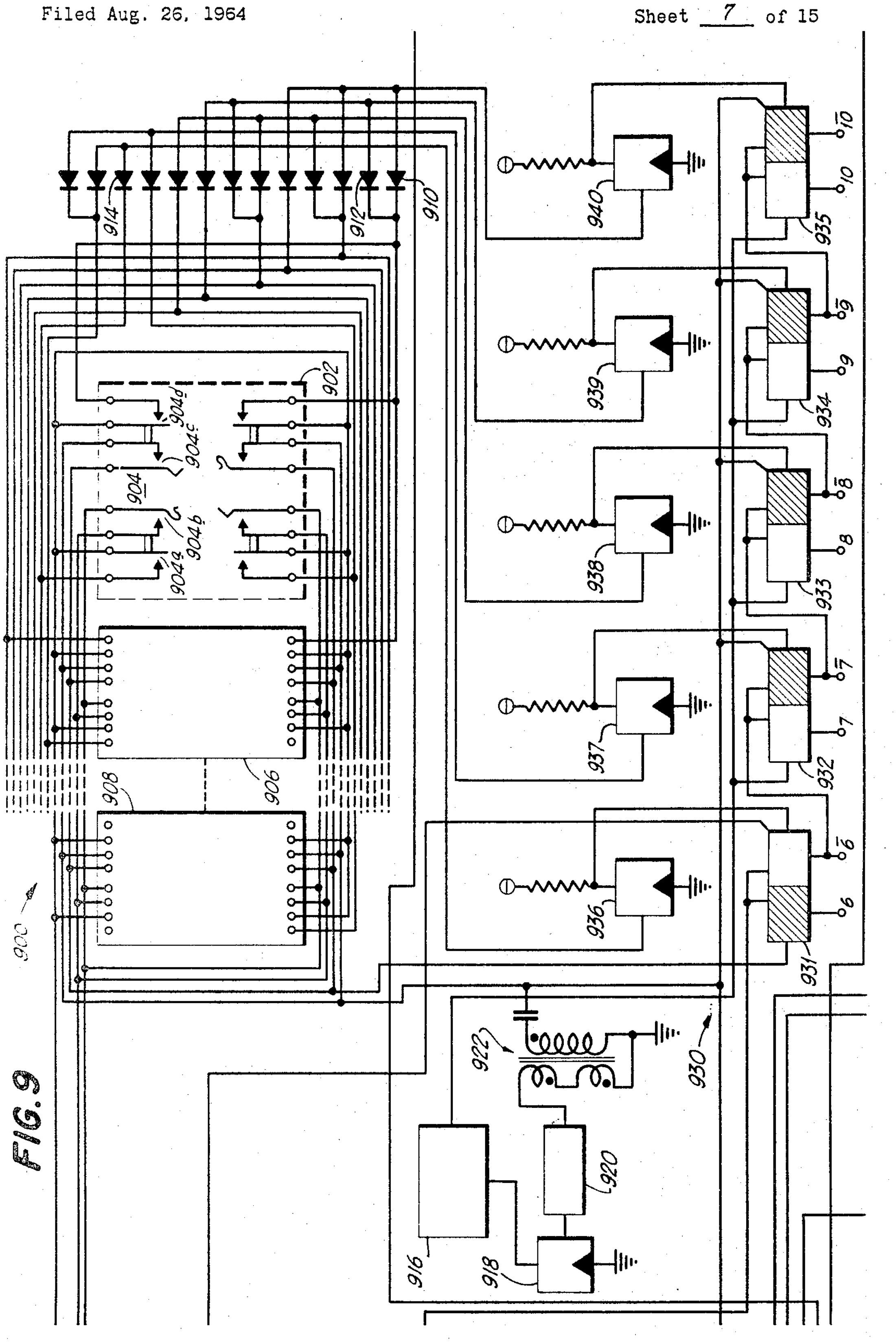

FIG. 6A of the drawings illustrates a logic symbol for a detector unit or slicer flip-flop, and FIG. 6B illustrates a representative circuit corresponding to this symbol. In general, the detector unit comprises a difference amplifier having a gate or strobe input for selectively setting a storage flip-flop in dependence on the relation between the values of an unknown input signal and a reference potential.

In the representative circuit shown in FIG. 6B, a pair of transistors 600 and 602 are cross-coupled to provide a bistable or flip-flop circuit in which the transistor 602 is reset to a normal nonconductive condition by the application of a positive-going pulse to a reset terminal F. In this condition, a first output transistor 604 is in a nonconductive condition to apply a negative potential to an output terminal C, and a second output transistor 606 is normally in a conductive condition to apply a more positive output signal to a terminal D. These normal output potentials are represented by the shaded and open right-hand portions of the block forming the logic symbol illustrated in FIG. 6A. In the normal condition of the circuit, a plurality of additional transistors 608, 610, 612, 614, 616, and 618 are in a conductive condition. The transistor 608 provides a constant current source for the conductive transistors 610 and 616.

A negative reference potential establishing one operating parameter for the difference amplifier portion of the circuit is applied to an input terminal B, and the unknown input potential is applied to a terminal A. As the input signal applied to the terminal A becomes more negative than the reference potential applied to the terminal B, the conduction through the transistor 616 increases and the conduction through the transistor 610 decreases. If this unbalance persists for a time-voltage product on the order of 50 milli-nanoseconds, for example an unbalance voltage of five millivolts persisting for ten nanoseconds, the base of the transistor 618 is driven more negative so that conduction through this transistor increases. This increased conductivity drives a Zener diode 619 to apply a positive-going pulse to the base of the transistor 614.

The positive-going pulse applied to the base of the transistor 614 terminates conduction through this transistor. The change in conduction through the transistor 614 is not effective to change the setting of the storage flip-flop unless and until such time as the detector unit is enabled or strobed. This permits the value of the unknown potential applied to the input terminal A to be determined at a particular point in a time cycle.

More specifically, when the relative values of the potentials applied to the terminals A and B are to be evaluated or compared, a negative-going pulse is applied to a strobe input terminal E. This places the transistor 620 in a conductive condition so that the base of the transistor 612 is driven positively with respect to its emitter. This terminates conduction through this transistor and removes the clamp on the transistor 614. The conduction through this transistor is terminated in the manner described above when the magnitude of the voltage applied to the terminal A exceeds, in a negative direction, the level set by the reference potential applied to the terminal B.

The termination of conduction through both the transistors 612 and 614 applies a more negative potential to the base of a transistor 622. This places this transistor in conduction so that the transistor 602 is placed in a conductive condition and the transistor 600 is placed in a nonconductive state. The change in the conductive state of the transistor 600 applies a more negative potential to the base of the transistor 604 so that the potential applied to the output terminal C rises to a more positive value. The conduction through the transistors 602 and 622 biases the base of the transistor 606 positive with respect to its emitter so that conduction through this transistor is terminated. This applies a more negative potential to the output terminal D. Thus, in response to the receipt of a signal at the input terminal A exceeding the preset level, the conductive state of the storage flip-flop including the transistors 600 and 602 is reversed, and the potentials applied to the output terminals C and D are reversed in accordance therewith.

When the negative enabling pulse is removed from the strobe terminal E, the transistor 620 returns to a nonconductive state, and the transistor 612 returns to a conductive state. This, in turn, returns the transistor 622 to a nonconductive state. The setting of the flip-flop including the transistors 600 and 602 is not changed. Since the transistor 602 remains in a conductive state, the transistor 606 remains in a nonconductive state. When the potential applied to the input terminal A drops below the preset level, the transistors 610, 614, 616, and 618 return to their normal states of conductivity. The storage flip-flop is reset or cleared by the application of a positive-going pulse to the reset terminal F. When the flip-flop is reset to a condition in which the transistor 600 is in a conductive state and the transistor 602 is in a nonconductive state, the transistor 604 returns to a nonconductive state, and the transistor 606 returns to a conductive state so that the output terminals C and D provide their normal output potentials.

As indicated above, the system or apparatus 60 can be used to test either the partially assembled bit strip 64 or the completed memory 62. A bit strip 64 is shown in fragmentary schematic form in FIG. 16 of the drawings and comprises a dielectric or other supporting member 1600 having suitable core supporting means along opposite edges thereof, such as a plurality of slotted recesses 1602, for receiving individual ones of the cores 100 and for supporting these cores in spaced predetermined positions. In one bit strip 64 with which the system 60 of the present invention has been used, the supporting panel 1600 is formed with twenty-six recesses 1602 for receiving and supporting twenty-six cores 100 along each edge.

In the bit strip 64, part of the core windings necessary in the completed memory 62 are provided. More specifically, the sense openings 106 in all of the cores along one edge of the board 1600 are linked by a single conductor 1604 to provide a single turn sense winding. The conductor 1604 links the apertures 106 in successive cores 100 in an opposite sense, and the ends of the conductor 1604 are connected to a pair of terminals 1606. The cores 100 on the bit strip 64 are also provided with one drive winding comprising a two turn inhibit or digit winding formed by a single conductor 1608 which is threaded through the drive openings 102 in all of the cores 100 positioned along one edge of the support 1600. Since the conductor 1608 enters and returns through each of the openings 102 in the same direction, the continuous conductor 1608 provides a two turn winding providing an inhibit drive for each of the cores 100 disposed along one edge of the support 1600. Similar sense windings (not shown) and inhibit windings (not shown) are provided for the cores 100 disposed along the other edge of the support 1600. In the bit strip 64, the drive windings for the center apertures 104 are not provided, and these windings are provided when a plurality of the bit strips 64 are joined together to form the complete memory plane 62.

Although a variety of tests can be performed on the cores 100 in the bit strip 64 using the system 60 of the present invention, the operation of this system is illustrated in conjunction with a test in which the "1" signal response of the cores 100 is checked to determine whether it exceeds a predetermined minimum amplitude, and the "*d*0" signal response of the cores 100 is checked to determine whether it exceeds a much lower minimum level, thereby insuring the presence of a "*d*0" response signal. This test is shown schematically in FIG. 27 of the drawings in which a pair of waveforms 2700 and 2702 represent the "1" response of the cores 100 which must exceed, respectively, minimum amplitudes represented by a pair of lines 2704 and 2706. In this figure, two waveforms 2708 and 2710 represent the "*d*0" response signals from the cores 100 which must exceed minimum levels represented by a pair of lines 2712, and 2714, respectively. Because of the fact that the sense winding provided by the conductor 1604 (FIG. 16) links the sense apertures 106 in successive cores 100 in an opposite sense, the "1" or "*d*0" response potentials provided at the terminals 1606 alternate in polarity if the relative directions of the drives to which the cores 100 are subjected remain constant. In FIG. 27, the waveforms 2700 and 2708 represent the "1" and "*d*0" response of the cores 100 arbitrarily designated as even numbered, whereas the waveforms 2702 and 2710 represent the "1" and "*d*0" response signals, respectively, of the cores 100 arbitrarily designated as odd numbered cores.

To carry out the minimum level evaluations on the "1" and "*d*0" response signals of the cores 100, the system 60 selectively supplies a series of drive pulses to each of the cores 100 in a given sequence within different time slots of the repetitive time frame provided by the program generator 66, this sequence being repeated for each of the cores 100 on the bit strip 64 to be tested. In one representative program, a "1" is written in the core in the first time slot, the "1" response is read in the second time slot, and "0" is written in the third time slot, the "0" is distributed to provide a "*d*0" in the fourth time slot, and the "*d*0" response is read in the fifth time slot. No useful operations are performed during the remaining three time slots of the eight time slots comprising the repetitive time frame generated by the program generator 66. The inhibited mode used in testing the bit strip 64 requires the application of a write current in the center opening 104 in the first time slot, the application of an oppositely poled read current to the center opening 104 in a second time slot, the concurrent application of write and inhibit currents to the two openings 103 and 104 in the third time slot, the application of an inhibit current to the end opening 102 in the fourth time slot, and the application of a read current to the center opening 104 in the fifth time slot. These drive currents operate the magnetic core 100 under test to the various magnetic states illustrated in FIGS. 17–21 of the drawings.

Figure 16:
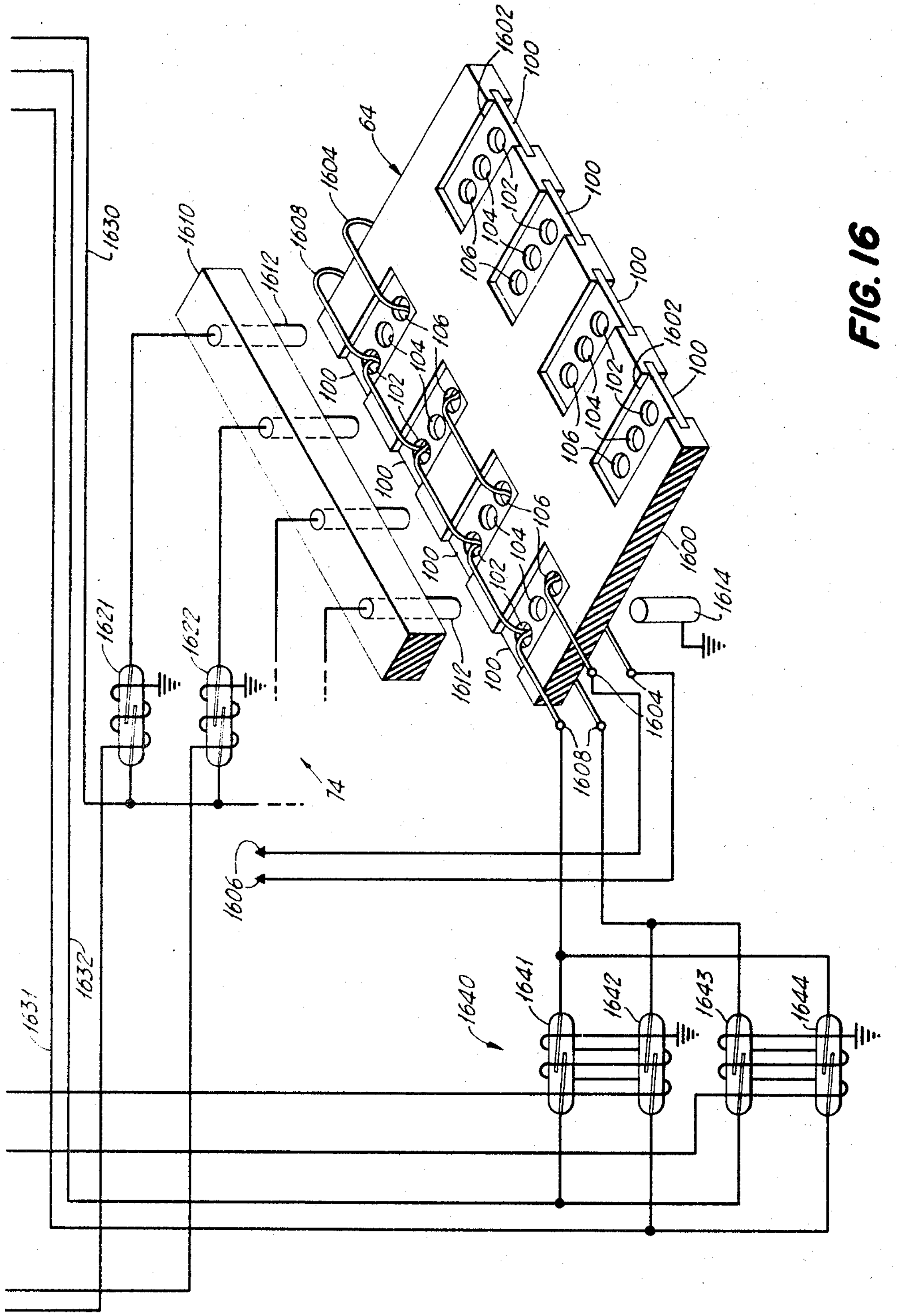

The bit strip 64 shown in FIG. 16 includes the two turn inhibit winding provided by the conductor 1608 for applying inhibit current to the end openings 102 of all of the cores 100 disposed along one edge of the bit strip 64. To provide means for supplying the read and write currents to the center openings 104, the bit strip 64 is placed in a suitable fixture (not shown) including a movable supporting element 1610 carrying a plurality of electrically conductive probes 1612 which are adapted to be inserted through all of the center openings 104 in the cores 100 disposed along one side of the supporting element 1600. The free ends of the inserted probes 1612 are received within suitable receptacles 1614 which are connected to a source of reference potential or otherwise returned to the drive pulse sources. The relative positions of the probes 1612 and the receptacles 1614 as well as the relative directions of the opening and closing movements of the fixture can be reversed. To provide read and write current to the probes 1612, each of the probes is connected through an individual and normally open switch in a group 1620 of twenty-six switches to a common read-write conductor 1630. The conductor 1630 is provided with a pair of plugs 1465 and 1475 which are inserted into a pair of receptacles 1464 and 1474 connected to the outputs of a write driver or pulse source 1460 and a read driver or pulse source 1470 of conventional design. Thus, when a switch 1621, for instance, in the group 1620 is operated, the probe 1612 for the first core 100 on one side of the bit strip 64 is connected to the output of the read driver 1470 and the write driver 1460. Alternatively, when a second switch 1622 in the group 1620 is operated, the probe 1612 for the second core 100 to be tested is connected over the common conductor 1630 to the output of the read driver 1470 and the write driver 1460.

The program generator 66 controls the read pulse source 1470 and the write pulse source 1460 to supply read and write signals to the probes 1612 in the bit strip testing fixture in the proper ones of the time slots in the testing time frame. The program generator 66 can be of any suitable construction but preferably is of the type shown and described in the above-identified application of William H. Kastning. As set forth therein, adjustment of a pair of switches 1462 and 1472 connected to the inputs of the drive pulse sources 1460 and 1470, respectively, renders these drivers effective to supply pulses to the probes 1612 in any desired sequence. In the illustrative example referred to above in which the "1" response is to be read in the second time slot and the "*d*0" response is to be read in the fifth time slot, the switch 1472 is operated to select pulses appearing in the second and fifth time slots having a primary timing and a primary duration on the order of three microseconds. Thus, the read pulse generator 1470 is enabled during each time frame to supply a negative-going signal of three microseconds duration to the selected one of the probes 1612, this read signal beginning somewhat later than the beginning of the time slot because of the primary time delay provided by the program generator 66.

Similarly, the switching means 1462 is adjusted to select enabling pulses for the write driver 1460 in the first and third time slots. These pulses are selected to have secondary timing and a duration of around two microseconds. Not only do these secondary signals provided by the program generator 66 have a shorter duration than the primary signals, but they also are delayed in initiation somewhat beyond the beginning of the signals having primary timing. Thus, the write pulse source 1460 is enabled in the first and third time slots to provide a positive-going write signal of two microseconds duration.

In the representative example set forth above, a "0" is written in the third time slot, and this "0" is altered to provided a "*d*0" state in the fourth time slot. In the inhibited mode used in testing the bit strip 64, these two operations require the presence of an inhibit signal. Accordingly, a switching means 1452 in the program generator 66 is operated to select enabling signals in the third and fourth time slots which are applied to the gate or control input of an inhibit pulse source 1450. These enabling signals are provided with primary timing so that the inhibit pulse source 1450 provides a negative-going signal of around three microseconds duration with primary timing in the third and fourth time slots. When the system 60 is used to test the bit strip 64, a pair of plugs **1455*a* and 1457*a* are inserted in a pair of sockets or female connectors 1454 and 1456 connected to the output of the inhibit pulse source 1450 to connect to the output of the a pair of conductors 1631 and 1632 to a switching assembly 1640 including four switches 1641–1644. The outputs of these four switches are connected to the two terminations of the continuous conductor 1608 providing the inhibit windings for all of the cores 100 on one side of the board 64. The switches 1641–1644 are divided into two pairs 1641, 1642, and 1643, 1644 which are alternately operated to apply the inhibit pulse from the source 1450 to the conductor 1608** with opposite polarities as alternate ones of the cores are tested.

It is necessary to provide the switching assembly 1640 for reversing the polarity of the inhibit signals applied to the conductor 1608 to insure uniform drive conditions for the cores 100 during the testing operation. More specifically, because of physical considerations, it is necessary to probe the center openings 104 to provide the drive windings to which the read and write pulses are applied from only a single side of the support 1600 for the bit strip 64. Since the read and write signals are applied to the cores 100 from the same side thereof in the testing fixture, the relative polarities of the drive signals for all of the cores are uniform. However, the sense winding provided by the conductor 1604 threads successive cores 100 in an opposite sense. In order to maintain the uniformity of the drive conditions schematically illustrated in FIGS. 17–21 of the drawings, it is therefore necessary to reverse the polarity of the inhibit drive applied to the end opening 102. This function is performed by the switching assembly 1640. Accordingly, the program generator 66 selectively controls the pulse sources 1450, 1460, and 1470 to supply a fixed pattern of read, write, and inhibit signals to the cores 100 in successive time slots of successive time frames. The read and write signals are applied in sequence to each of the cores 100 during successive time frames under the control of the switching means 1620 controlled by the bit counter 76, while the inhibit drive is applied to all of the cores 100 under test with alternate polarities under the control of the switching assembly 1640 which is, in turn, controlled by the bit counter 76.

To permitt he signal response of the cores 100 to be evaluated, the terminals 1606 of the single sense winding provided by the conductor 1604 are connected to a pair of sockets or receptacles 1201 connected to the input of an amplifier 1200. The output of this amplifier is coupled through an attenuating network 1202 to be applied to the inputs of a pair of amplifiers 1204 and 1206. The network 1202 is such as to provide greater attenuation of the signals applied to the input of the amplifier 1204 whose output controls the evaluation of the "1" or "*d*1" response than of the signals applied to the input of the amplifier 1206 which supplies signals for controlling the evaluation of the "0" or "*d*0" response. This is desirable because of the greater amplitude of the "1" or "*d*1" response signals. The construction of the amplifiers 1204 and 1206 is conventional and is such as to provide substantially identical signals of opposite polarity on a pair of output leads from each of these amplifiers. As an example, the amplifier 1204 in response to an input signal of a given polarity provides identical output signals of opposite polarity on a pair of output leads **1204*a* and 1204*b*. Similarly, in response to the application of a signal of a given polarity to the input of the amplifier 1206, identical signals of opposite polarity are concurrently applied to a pair of output conductors 1206*a* and 1206*b*. The signals appearing on the conductors 1204*a*, 1204*b*, 1206*a*, and 1206*b* are selectively applied to the inputs of the plurality of detectors 70 under the control of a switch 1210 to condition the plurality of detectors 70 for performing the selected evaluating operations. The operation of the switch 1210 to its different positions controls the types of enabling signals and the combination of input signals applied to the plurality of detectors 70**.

The plurality of detectors 70 includes four slicer flip-flops or detectors 1220, 1230, 1240, and 1250. The detectors 1220 and 1230 are used to evaluate "1" or "*d*1" response signals, and the detectors 1240 and 1250 are used to evaluate "0" or "*d*0" response signals.

In the sequence of tests used to evaluate the performance of the cores 100 in the bit strip 64, the opposite polarity "1" and "*d*0" signals supplied by the sense conductor 1604 are checked to insure that they exceed given minimum levels. To prepare the detectors 70 for performing this particular operation, a plurality of potentiometers 1292, 1294, 1296, and 1298 energized from the reference negative potential source 1291 in a potentiometer network 1290 are selectively adjusted to provide reference potentials of a desired value to the known potential or reference potential inputs of the four detectors 1220, 1230, 1240, and 1250. The detector 1220 is used to detect the level of the "1" response from the odd cores 100, and the potentiometer 1298 is adjusted to a setting providing a reference potential corresponding to the line 2706 (FIG. 27). The detector 1230 evaluates the "1" response of the even numbered cores 100 and is supplied with a reference potential indicated by the line 2704 by the potentiometer 1296. The "0" response signal of the odd cores 100 is evaluated by the detector 1240, and its reference potential terminal is supplied with a potential corresponding to the line 2714 by the potentiometer 1294. The potentiometer 1292 supplies a reference potential to the detector 1250 represented by the line 2712, the detector 1250 evaluating the "0" response of the even numbered cores 100.

The switch assembly 1210 selectively supplies the four detectors 1220, 1230, 1240, and 1250 with the proper strobing or enabling potential to enable these detectors during the time slots in which read operations are performed, and also selectively interconnects the outputs of the amplifiers 1204 and 1206 with the unknown potential inputs of these four detectors. The switch 1210 is shown in a setting for testing memory units 62 and is operated a single step in a clockwise direction in the manner shown schematically in FIG. 12 to condition the circuit for testing bit strips. In this actuated setting, the output conductor **1204*b* on the amplifier 1204 is connected through a conductive segment 1213 on the switch 1210 to the input of the even core "1" evaluating detector 1230. The other output conductor 1204*a* from the "1" amplifier 1204 is connected to the unknown input of the odd "1" response evaluating detector 1220. Since the detectors 1220 and 1230 are only responsive to negative-going signals and the amplifier 1204 provides alternate positive and negative signals on each of the conductors 1204*a* and 1204*b* in response to alternate polarity input signals from the core 100 under test, only one or the other of the two detectors 1220 and 1230 can be set during the testing of a single core. The circuit connections are such that if the "1" response signal is of an amplitude greater than the level indicated by the two lines 2704 or 2706 (FIG. 27), the detector 1220 will be set by the output signal from odd cores and the detector 1230** will be set by the output signal from even cores.

With respect to the "*d*0" evaluating detectors 1240 and 1250, the output conductor **1206*a* from the amplifier 1206** is directly connected to the input of the odd "*d*0" signal response evaluating detector 1240. The output conductor **1204*b*** is connected to the unknown potential input of the even "*d*0" signal response level evaluating detector 1250 through a conductive segment 1212 on the switch 1210. Since oppositely poled signals are provided by the conductors **1206*a* and 1206*b* in response to a given input signal to the amplifier 1206, the detectors 1240 and 1250 are capable of responding only during alternate testing cycles of the system. The detector 1240** is set if the level of the "*d*0" response signal derived from odd numbered cores exceeds the level 2714 (FIG. 27), and the detector 1250 is set only if the "*d*0" signal response from an even numbered core exceeds the level 2712.

As indicated above, the setting of the switch 1210 also controls the selection of the type of strobing or enabling pulse to be applied to the detectors 1220, 1230, 1240, and 1250 during the different types of operations performed by the system 60. In the representative test for the bit strip 64 described above, the "1" response signal is checked in the second time slot. In this test, it is desirable to determine whether the "1" response signal shown by the waveforms 2700 and 2702 (FIG. 27) exceeds the limits represented by the lines 2704 and 2706 at any time during the second time slot in which this response is checked. Accordingly, when the switch 1210 is operated to its bit strip setting, the strobe or enabling inputs to the detectors 1220 and 1230 are connected through a conductive segment 1215 on the switch 1210 to the output of an inverter 1400, the input of which is coupled to the output of an inverter 1402. This input of this inverter is connected to a switch 1408 which can be manually operated to select any one of eight different conductors extending to the program generator 66 and on which appear negative signals representing each of the eight different time slots in the repetitive time frame or time cycle of the program generator 66. In the illustrative test set forth above, the switch 1408 is operated to select the second conductor on which negative-going signals for the full width of the second time slot appear. This negative-going signal in the second time slot of each time frame is coupled through the inverters 1402 and 1400 and the conductive segment 1215 on the switch 1210 to enable the detectors 1220 and 1230 for the full duration of the second time slot of each testing time frame.

The "*d*0" response evaluating detectors 1240 and 1250 are rendered effective to evaluate the "*d*0" response in the fifth time slot of each time frame. However, because of the low amplitude of the "*d*0" response shown by the waveforms 2708 and 2710 (FIG. 27), it is desirable to enable the detectors 1240 and 1250 for only a selected period of time to avoid response of these detectors to noise or other spurious signals. Accordingly, the strobe inputs to the detectors 1240 and 1250 are connected through a conductive segment 1216 on the switch 1210 in its bit strip position to the pulse output of a monostable circuit 1404, the input of which is coupled through an inverter 1406 to a manually operable switch 1410. Since the "*d*0" evaluation operation is to take place in the fifth time slot, the switch 1410 is operated to select the fifth time slot conductor. Thus, during the fifth time solt of each time frame, the inverter 1406 sets the monostable circuit 1404. After the delay interval of this circuit, it supplies a negative-going pulse of around five hundred nanoseconds duration to the inputs of the "*d*0" response evaluating detectors 1240 and 1250. In this manner, the "1" evaluating detectors 1220 and 1230 are enabled during the entire width of the second time slot to evaluate the "1" response, and the detectors 1240 and 1250 are enabled for a five hundred nanosecond interval offset from the beginning of the fifth time cycle to evaluate the "*d*0" response.

To provide means for visually indicating the results of the "1" and "0" evaluating operations performed by the detectors 1220, 1230, 1240, and 1250, four lamps 1224, 1234, 1244, and 1254 are selectively illuminated under the control of four lamp amplifiers 1222, 1232, 1242, and 1252 which are controlled, respectively, by the four detectors 1220, 1230, 1240, and 1250. The inputs to the amplifiers 1222, 1232, 1242, and 1252 are connected to the set inputs of the four detectors 1220, 1230, 1240, and 1250 so that the lamps 1224, 1234, 1244, and 1254 normally are not energized when the detectors are reset to their normal position. A number of different signal response conditions represented by certain set and reset conditions of the detectors, as represented by the on or off conditions of the lamps, is set forth in the following tables for odd and even cores.

DETECTOR LAMPS

| | 1224 | 1234 | 1244 | 1254 | |
|---|---|---|---|---|---|
| Odd Core 100. | Off | Off | On | Off | Low "1" |
| | On | Off | Off | Off | Low "d0" |
| | Off | Off | Off | Off | Low "d0" and "1" |
| | On | Off | On | Off | Correct response |
| Even Core 100. | Off | On | Off | Off | Low "d0" |
| | Off | Off | Off | On | Low "1" |
| | Off | Off | Off | Off | Low "1" and "d0" |
| | Off | On | Off | On | Correct response |

As indicated in the table above, the plurality of detectors 1220, 1230, 1240, and 1250 can be set to a variety of different conditions in dependence on the satisfactory or unsatisfactory completion of the particular set of signal evaluating tests used to check the cores 100 on the bit strip. Further, these detectors can be set to different combinations or permutations of conditions when other tests are performed, including the tests to which the memory unit 62 is subjected. The control circuit 72 includes means for evaluating whether the settings to which these detectors have been operated represent a satisfactory or an unsatisfactory test result, and these different means are selectively rendered responsive to the settings of the detectors 1220, 1230, 1240, and 1250 in different combinations in dependence on the different type of test for which the system 60 is conditioned. This selection is performed by a switch assembly 1260 interposed between the detectors and a plurality of checking or evaluating means, such as a plurality of AND gates.

More specifically, the control circuit 72 includes one AND gate formed by two diodes 1276 and 1277 and an inverter 1278 for evaluating the results of testing the "1" response of odd cores. A similar gate for evaluating the "1" response for even cores includes a pair of diodes 1279 and 1280 and in inverter 1281. An additional AND gate including a pair of diodes 1282 and 1283 and an inverter 1284 evaluates the "*d*0" response from odd cores, and the settings of the detectors during the "*d*0" response testing of even cores is evaluated by an AND gate including a pair of diodes 1285, 1286 and an inverter 1287. To condition these AND gates for checking the settings of the four detectors 1220, 1230, 1240, and 1250, the switching assembly 1260 is operated a single step in a clockwise direction from the normal memory testing setting shown in the drawings to a bit strip setting. With the switching assembly 1260 in this setting, the diode 1276 in the odd "1" gate is connected to the set output of the even "1" detector 1230 over a conductive segment 1264, and the diode 1277 is connected to the reset output of the odd "1" detector 1220 over a circuit including a conductive segment 1263. Since the odd detector 1220 should be set and the even detector 1230 should not be set, the diodes 1276 and 1277 are both enabled to place the inverter 1278 in a nonconductive condition only when the even "1" detector 1230 has not been set and the odd "1" detector 1220 has been set during the testing of an odd core.

Similarly, the diode 1279 in the even "1" evaluating gate is connected over a circuit including a conductive segment 1261 to the set output of the odd "1" detector 1220 while the other diode 1280 is connected over a circuit including a conductive segment 1262 to the reset output of the even "1" detector 1230. Thus, the two diodes 1279 and 1280 are enabled to place the inverter 1281 in a nonconductive condition only when the even "1" detector 1230 is set and the odd "1" detector 1220 is reset during the "1" evaluating operation on even cores.

With respect to the odd "0" AND gate, the diode 1282 is connected directly to the reset output of the odd "0" detector 1240, and the diode 1283 is connected over a circuit including a conductive segment 1266 to the set output of the even "0" detector 1250. Thus, when the detector 1240 is set and the even "0" detector 1250 is not set, the inverter 1284 in the odd "0" evaluating gate is rendered nonconductive to indicate a satisfactory test result. A diode 1285 in the even "0" gate is connected over a circuit including a conductive segment 1265 on the switch assembly 1260 to the set output of the odd "0" detector 1240, and the other diode 1286 in this gate is connected over a circuit including a conductive segment 1267 to the reset output of the even "0" detector 1250. Thus, the inverter 1287 is placed in a nonconductive state to signify the satisfactory completion of a "*d*0" evaluation of an even numbered core only when the even "0" detector 1250 is set indicating a "*d*0" response having a value greater than the level represented by the line 2712 (FIG. 27) and the odd "0" detector 1240 is not set. In this manner, the switching assembly 1260 selectively conditions the checking circuits in the control circuit 72 for providing a response only when the plurality of detectors 1220, 1230, 1240, and 1250 are set in correct permutations or combinations of set or reset conditions in dependence on the type of test being performed by the system 60.

As set forth above, the access matrix 74 selectively couples the core drivers 68 to the different cores 100 in the bit strip 64 to be tested in sequence under the control of the bit counter 76. In the illustrated system, the read pulse source 1470 and the write pulse source 1460 are rendered effective to deliver read and write pulses in sequence to the cores 100 (FIG. 16) by connecting the operating windings of the switches 1621 and 1622 in the access matrix 74 to the bit counter 76 for sequential operation. The bit counter 76 (FIGS. 7 and 10) is operated step-by-step in response to the satisfactory completion of the testing of the individual cores 100 so that following the testing of one core, the bit counter 76 directs the read and write pulses from the sources 1470 and 1460 to the probe 1612 for the next core to be tested.

The bit counter 76 comprises a counting chain 720 (FIG. 7) including five flip-flops 721–725 coupled for sequential operation and providing five pairs of positive and negative potentials to the output terminals identified as 1, $\bar{\mathbf{1}}$, 2, $\bar{\mathbf{2}}$, 3, $\bar{\mathbf{3}}$, 4, $\bar{\mathbf{4}}$, and 5, $\bar{\mathbf{5}}$. These outputs terminals of the flip-flops 721–725 are selectively connected with AND gate inputs to twenty-seven output driver and indicating stages or channels. The AND gate at the input of each of these channels is responsive to or is enabled by positive signals so that each of the channels is rendered effective in sequence as the counting chain 720 is advanced step-by-step. These output driver indicating channels are selectively connected to the operating windings of the relays forming the matrix 74 so that these relays are operated in sequence to direct the drive pulses to successive ones of the cores and thus permit the successive evaluation thereof during sequential time frames of the program generator 66.

As an example, a first output driver and indicating channel 1000 (FIG. 10) includes an input gate comprising five diodes 1002 connected to the indicated outputs of the counting chain 720. All of these inputs are enabled in the reset or normal condition of the chain 720 so that an inverter 1004 in the channel 1000 is placed in a nonconductive condition to apply a negative potential to a lamp amplifier 1010 which illuminates a lamp 1014 to provide a visual indication that the core 100 in the bit strip 64 storing the first bit is to be tested. The negative potential at the output of the inverter 1004 is also applied to the input of the inverter 1006 to place this inverter in conduction so that a drive amplifier 1008 is placed in a conductive condition. When the bit strip 64 is to be tested, the plugs connected to the leads extending to the operating windings of the relays forming the access matrix 74 are selectively interconnected with the plurality of output driver channels controlled by the bit counting circuit 720. As an example, a plug **1012*a* connected to the operating winding of the relay 1621 for directing drive and write pulses to the first probe 1612 is inserted in a receptacle or socket 1012 connected to the output of the driver amplifier 1008. Therefore, in the first position of the counter 720, the winding of the relay 1621 is energized, and the outputs of the read pulse source 1470 and the write pulse source 1460 are connected to the probe 1612 inserted through the center opening 104 in the first core 100 to be tested on the bit strip 64**.

If the testing on the first core 100 results in satisfactory response signals, the control circuit 72 supplies an operating pulse to the input stage of the counting circuit 720 in the bit counter 76 so that the conductive state of the input flip-flop 721 is changed. This inhibits one of the diodes 1002 in the input gate to the channel 1000 and completes the enabling of the input gate for a second channel 1020. When the channel 1000 is disabled, the illumination of the lamp 1014 is terminated, and the driver amplifier 1008 is disabled to release the first relay 1621 in the matrix 74. When the second channel 1020 is concurrently enabled, a similar lamp is illuminated to provide an indication that the second core 100 is being tested. Further, a driver amplifier similar to the lamp amplifier 1008 is enabled for completing the circuit for energizing the winding of the next relay 1622 in the access matrix 74 over a circuit including an output socket 1021 and a plug **1021*a* connected to the winding of the relay 1622. Thus, in response to the satisfactory testing of the first core 100, the relay 1621 is released to disconnect the read pulse source 1470 and the write pulse source 1460 from the probe 1612 for the first core, and the relay 1622 is operated to connect these pulse sources to the probe 1612** for the second core to be tested.

This progressive operation continues to permit the sequential testing of all of the cores 100 on the bit strip 64. The bit strip includes twenty-six cores 100 on a side so that twenty-six output and driver channels controlled by the counting circuit 720 are required during bit strip testing. However, when the bit counter 76 is used to control the testing of individual bits in each of the words in the memory 62, these words include only twenty-four bits so that only twenty-four bit selecting stages controlled by the counter 720 are required. Further, since output driver stages are required in the system 60 driven by the word counter 80 for controlling the access matrix 78 to the memory 62 and since these stages are unused when a bit strip 64 is being tested, means are provided by which the bit counter 76 uses, during a bit strip testing operation, what normally would be an output stage for the word counter 80.

More specifically, the bit counter 76 includes twenty-four output stages similar to the stages 1000 and 1020 which are connected to the first twenty-four relays in the matrix 74 in the manner described above. When the counter 720 advances to its twenty-fifth step, an inverter 1022 is placed in a nonconductive condition to forward a negative potential to a switching assembly 1180 which is selectively operable to two different positions to condition the counters for bit strip or memory testing. The switching assembly 1180 is shown in its memory position and is operated a single step in a clockwise direction as indicated in dashed line to a bit strip setting in which the negative potential provided at the output of the inverter 1022 is forwarded over a conductive segment 1185 to the input of an inverter 1172 in a driver and indicating channel 1170 normally forming a part of the driver circuits controlled by the word counter 80. When the inverter 1172 is placed in a conductive condition, an output driver amplifier 1174 applies a drive pulse to an output socket 1176. This socket is connected to the switch in the matrix 74 connected to the probe 1612 for the twenty-fifth core to be tested. The negative potential from the output of the channel 1022 is also applied to the input of a lamp amplifier 1178, the output of which is connected through a conductive segment 1187 on the switch assembly 1180 to a lamp **1179*a*. The selective illumination of the lamp 1179*a* indicates that the twenty-fifth core on the bit strip 64** is to be tested.

At the end of the testing of the twenty-fifth core 100, the channel 1022 is diabled and a channel 1024 is enabled. This channel is identical to the channel 1000 and includes an output driver amplifier connected to a socket **1024*a* in which is inserted a plug connected to the operating winding of the relay in the matrix 76 connected to the probe 1612 for the twenty-sixth core to be tested. Thus, the bit counter 76 now selects the twenty-sixth core for testing. At the end of this testing operation, the first test on the cores 100 on one side of the bit strip 64 has been completed, and the counting circuit 720 terminates the enabling of the channel 1024 and completes the enabling of an AND gate for an inverter 1026**.

When the inverter 1026 is placed in a nonconductive condition, the negative signal appearing at the output of this inverter indicates that the testing cycle on one side of the bit strip 64 has been completed. More specifically, the negative potential provided at the output of the inverter 1026 is forwarded over a conductive segment 1182 in the switch 1180 to the cathode of a diode 804 forming part of a NOR gate in the input to an inverter 800. This places the inverter 800 in conduction so that a positive-going signal is applied to one reset input of all of the flip-flops 721–725 in the bit counter 720. This operates these flip-flops to a state in which a ground enabling potential is applied to the output terminals 1, 2, 3, 4, and 5.

The positive-going signal from the inverter 800 is also coupled through a pulse transformer 732 and a magnetostrictive delay line 736 providing a delay on the order of two microseconds to the input of an inverter 738. The inverter 738 drives a pulse source or amplifier 734 to supply a positive-going signal to another set of input leads for the flip-flops 721–725 so that these flip-flops are operated to a state in which the positive enabling potential is applied to the terminals $\bar{1}$, $\bar{2}$, $\bar{3}$, $\bar{4}$, and $\bar{5}$. This resets the counter 720 to its normal condition in which it is capable of performing a cycle of testing operations on the next group of twenty-six cores on the bit strip 64. By operating the flip-flops 721–725 to one reset condition and, after a time delay, operating all of these flip-flops to their alternate states, correct resetting of the chain 720 to the desired condition is insured, and any false operation resulting from carries between successive stages of the counting circuit 720 is prevented.

As indicated above, the direction of the inhibit drive through the conductor 1608 is reversed for alternate odd and even cores under the control of the assembly 1640 which includes the four reversing relays 1641, 1642, 1643, and 1644. This switching assembly 1640 is also controlled by the counting circuit 720 in the bit counter 76. Further, since the reversing of the inhibit drive is necessary only during the testing of the bit strip 64, driver stages normally controlled by the word counter 80 during the testing of a complete memory 62 are rendered effective to drive the relays in the assembly 1640 in response to the setting of the switching assembly 1180 to its bit strip position.

More specifically, the common winding for the relays 1641 and 1642 is connected to a plug **1156*a* which is inserted in a socket 1156 connected to the output of a drive amplifier 1154 in a drive and indicator channel 1150. The common winding for the relays 1643 and 1644 is connected to a plug 1166*a* which is inserted in a socket 1166 connected to the output of an amplifier 1164 in a channel 1160. Thus, the amplifiers 1154 and 1164 in the two drive channels 1150 and 1160 are connected to the relays in the assembly 1640 when a bit strip 64 is to be tested. With the switching assembly 1180 in the bit strip position, the input of an inverter 1152 for controlling the drive amplifier 1154 is connected over a conductive segment 1181 to a terminal that is connected to a terminal that is connected to the 1 output terminal of the input flip-flop 721. Similarly, an inverter 1162 for controlling the drive amplifier 1164 is connected over a conductive segment 1183 to the $\bar{1}$ output of the flip-flop 721**.

The input flip-flop 721 operates to alternately supply a negative potential to the terminals 1 and $\bar{1}$ with negative potential being applied to the terminal 1 in the normal or reset condition of the circuit 720. This negative potential applied to the 1 terminal in the normal condition of the counting circuit 720 is applied over the conductive segment 1181 to normally place the inverter 1152 in a conductive condition so that the drive amplifier 1154 normally operates the two switches 1641 and 1642 to apply an inhibit pulse from the source 1450 to the inhibit conductor 1608 in a first direction during the testing of the first core 100, which first core is an odd core. When the first input pulse is received by the counting circuit 720, the conductive state of the flip-flop 721 is altered and a negative potential is forwarded through the conductive segment 1183 to the input of the inverter 1162. This renders the drive amplifier 1164 conductive to operate the switches 1643 and 1644, the switches 1641 and 1642 being released by the removal of the negative potential from the terminal 1. The inhibit drive pulse for the second core 100 to be tested, which core is an even numbered core, is now applied to the inhibit conductor 1608 in a reversed direction. Although the negative signals applied to the terminals 1 and $\bar{1}$ to control the inverters 1152 and 1162 are also applied to a pair of lamp amplifiers 1158 and 1168, a pair of lamps 1159 and 1169 associated with these two lamp amplifiers are not illuminated because the energizing circuits thereto are interrupted by the shifted positions of a pair of conductive segments 1186 and 1187 on the switch 1180.

The counting circuit 720 in the bit counter 76 can also be restored to a normal position at any desired time by momentarily actuating a bit reset switch 820. When the switch 820 is operated, a pair of contacts **820*a* are closed to control a pulse generator 808 to supply a negative-going pulse through a pair of normally closed contacts 811 on an advance switch 810 to the cathode of a second diode 802 in the NOR gate at the input of the inverter 800. This operates the inverter 800 to produce a resetting of the counting circuit 720 in the manner described above. Further, the bit counter 720 can be operated step-by-step under manual control if it is desired to advance this counter manually rather than under the control of the circuit 72. This step-by-step advance is controlled by the actuation of the switch 810. When this switch is operated, the contacts 811 as well as a plurality of additional normally closed contacts 813 and 816 are opened, and the plurality of contacts 812, 814, and 815 are closed. The opening of the contacts 813 disconnects one terminal of the pulse output transformer in the pulse generator 808 from ground, and the closure of the contacts 812 connects the alternate or negative output to ground. The closure of the contacts 814 connects the positive-going pulse output from the source 808 to the pulse input to the counter 720 over a circuit including the closed contacts 815. The open contacts 816 interrupt the connection between the input of the counter 720 and the control circuit 72. When the switch 820 is then operated to close the contacts 820*a*, the pulse generator 808 develops a positive-going rather than a negative-going pulse, and this pulse is applied to the input of the counter 720 rather than to the NOR gate at the input to the inverter 800. Thus, the source 808 advances rather than resets the counter 720. The release of the switch 810** restores the bit counting circuit and operating and resetting circuits to their normal conditions.

The bit counter 76 also includes manually operable means 700 for selecting any predetermined one of the cores 100 on the bit strip 64 for test by directly operating the counting circuit 720 to a pattern of set and reset conditions of the flip-flops 721–725 in which the desired output driver stage is selected. The means 700 includes thirteen switching units similar to three illustrated units 702, 708, and 710, each of which includes two separate switching means manually actuable to select the desired one of the twenty-six cores. As an example, if the twenty-fifth core controlled by the driver stage 1022 is to be selected, a switch 704 is operated to close two pairs of normally open contacts **704*a* and 704*b*. The contacts 704*b* are preliminary operate type springs and closed prior to the closure of the contacts 704*a*. When the contacts 704*b* are closed, the pulse generator 808 delivers a negative-going pulse through the diode 802 to the input of the inverter 800 so that the counter 720 is reset to its normal condition in the manner described above. The closure of the contacts 704*a* connects the output of a pulse amplifier 740 to a particular combination of encoding diodes shown to the left of the unit 702 in FIG. 17 which primes the plurality of flip-flops 721–725 to the desired combination of conductive states under the control of five inverters 726–730**.

The pulse amplifier 740 is driven by an inverter 742, the input of which is coupled to a source of negative-going clock pulses in the program generator 66. The negative-going pulses provided by the pulse amplifier 740 are forwarded through the closed contacts **704*a* and a pair of diodes 714 and 712 to place the two inverters 729 and 730 in a conductive condition. This supplies positive-going pulses to the set inputs of the flip-flops 724 and 725 so that these flip-flops are operated to a condition in which a positive enabling potential is applied to the terminals 4 and 5. Since the status of the flip-flops 721, 722, and 723 is not changed from their reset condition, positive potentials are also applied to the outputs $\bar{1}$, $\bar{2}$, and $\bar{3}$. As shown by the identifying numerals disposed adjacent the input terminals of the AND gate for the channel 1022 in FIG. 10, this combination of positive potentials enables this channel to operate a switch in the relay matrix 74 individual to the twenty-fifth core to be tested. The system is restored to a normal condition by releasing the switch 704**.

Figure 10:
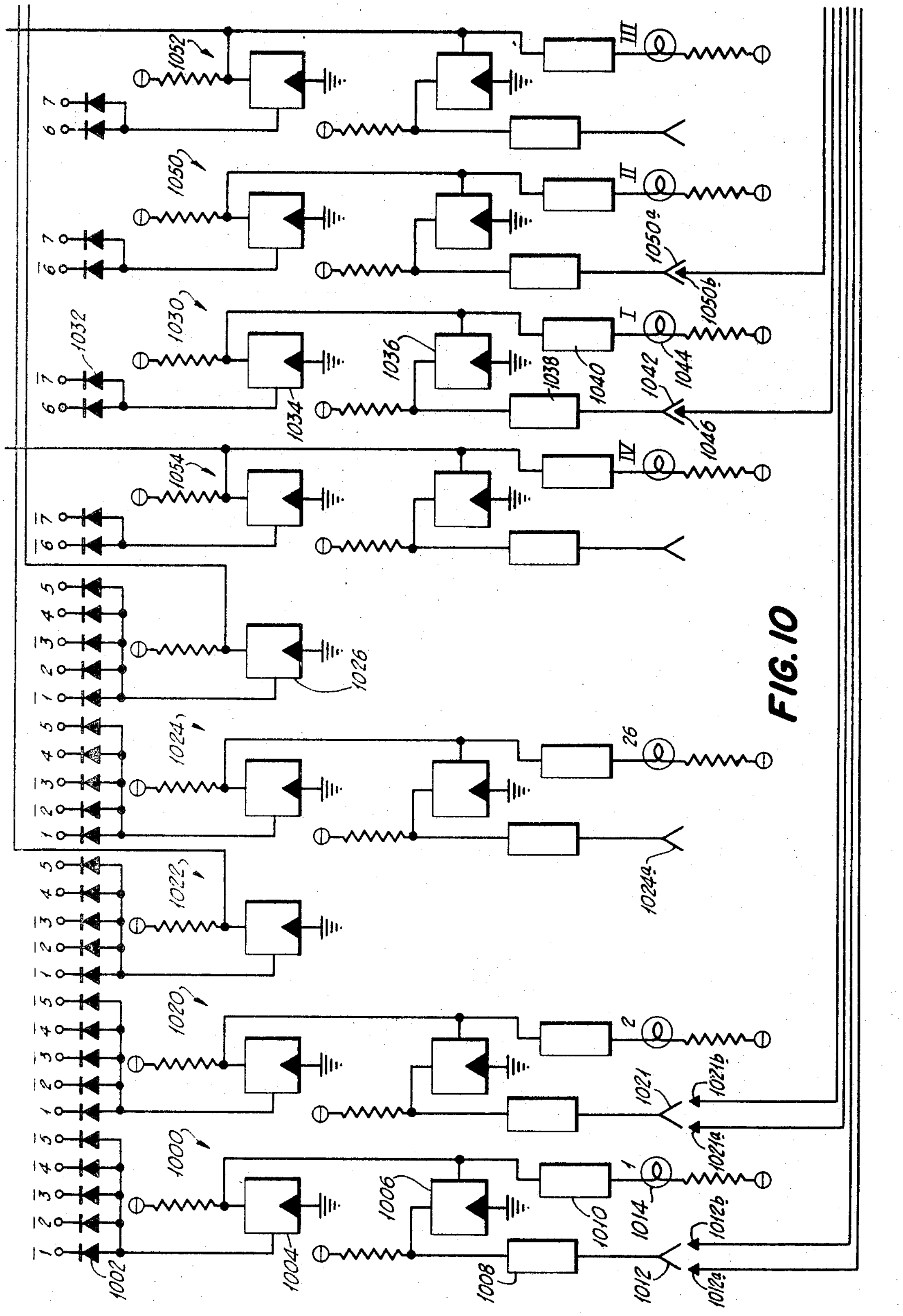
Figure 11:
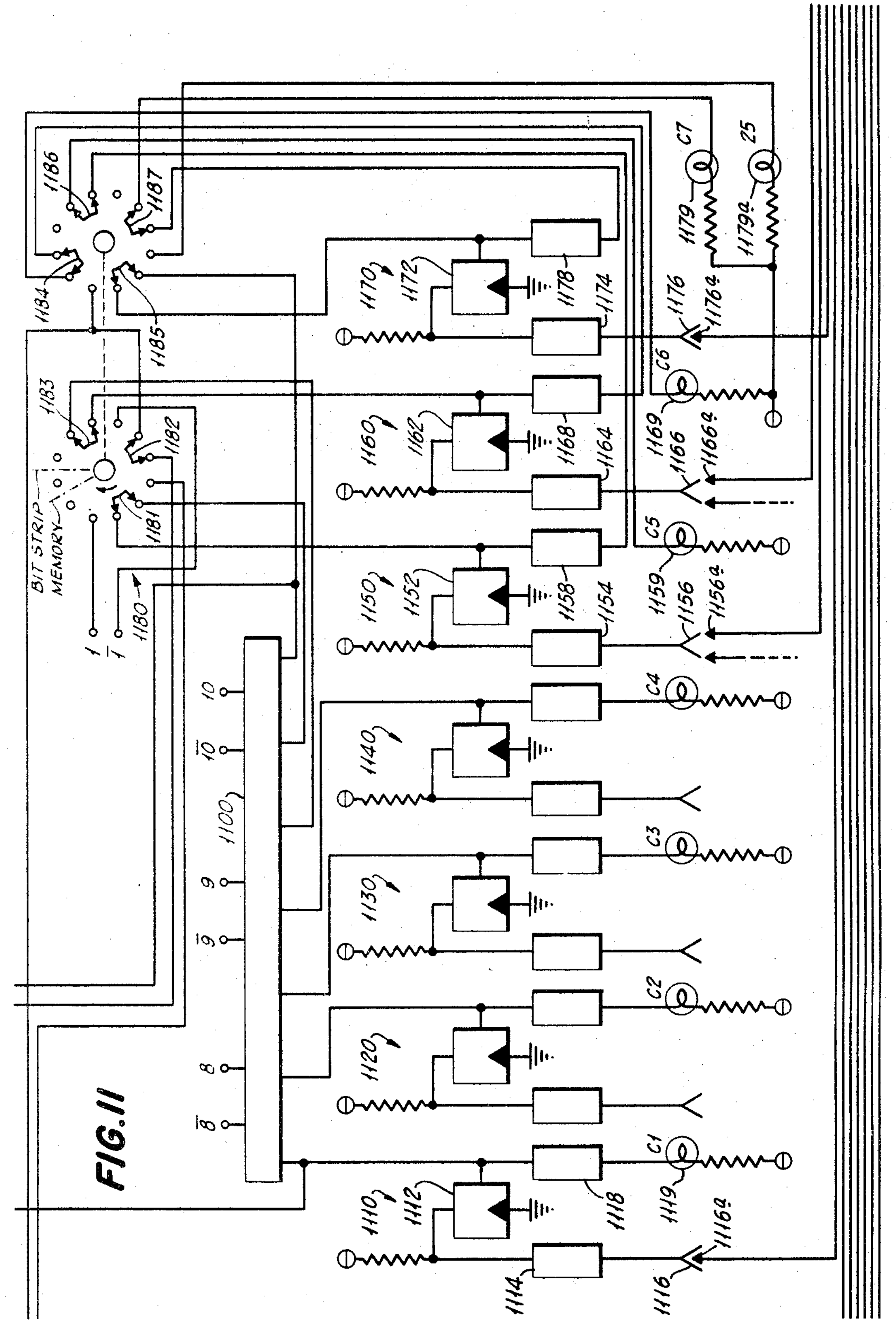
Figure 12:
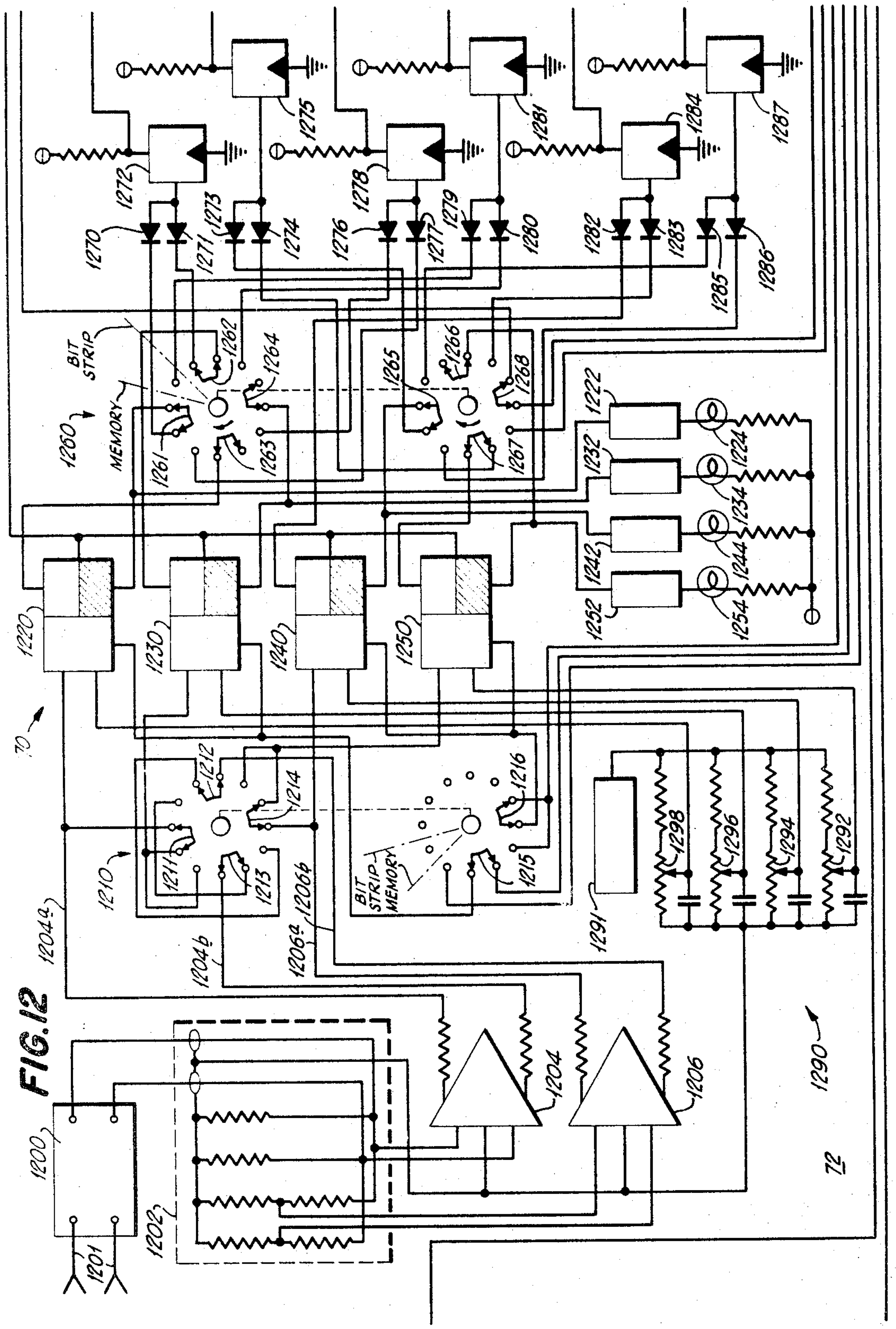
Figure 13:
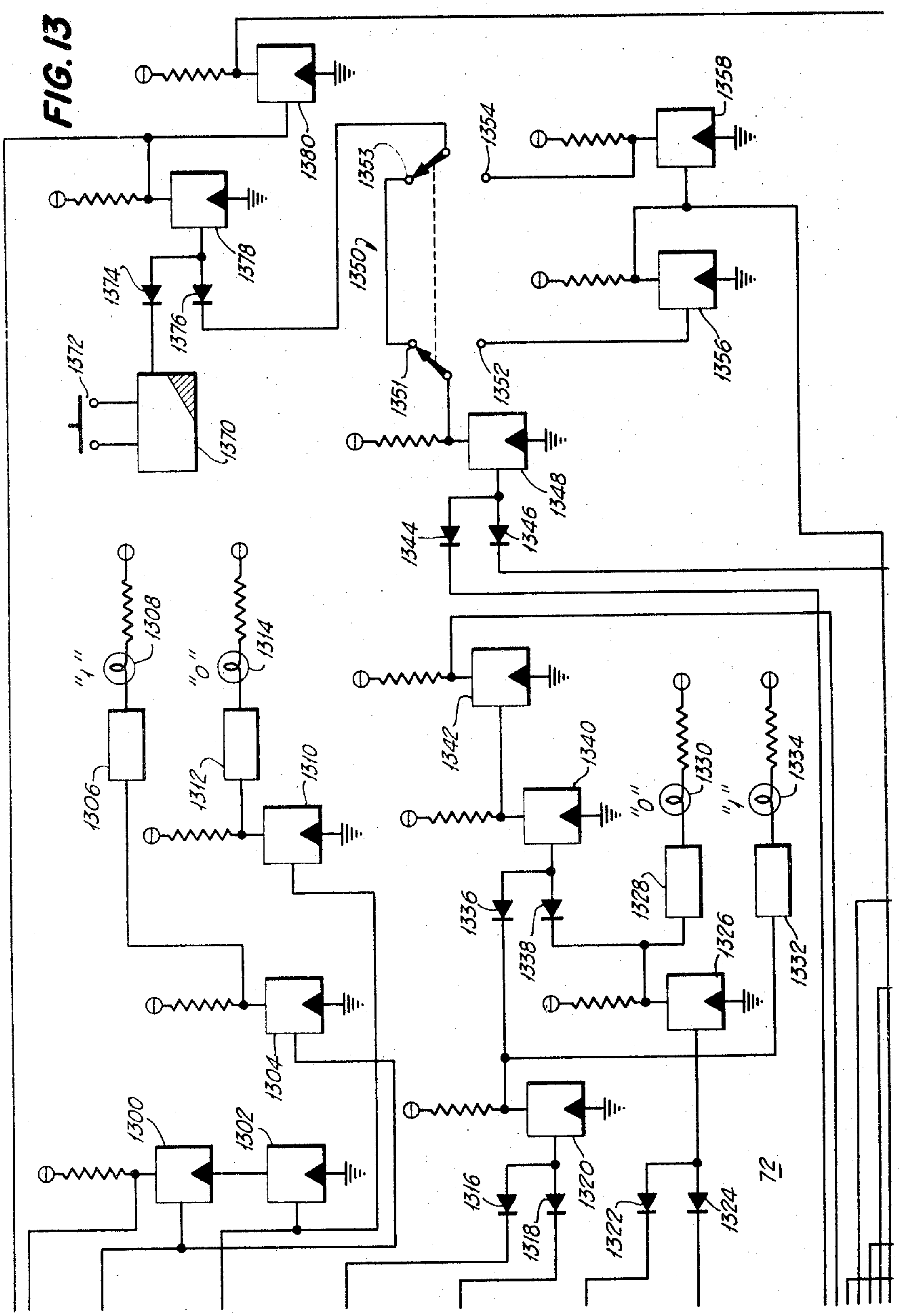
Figure 14:
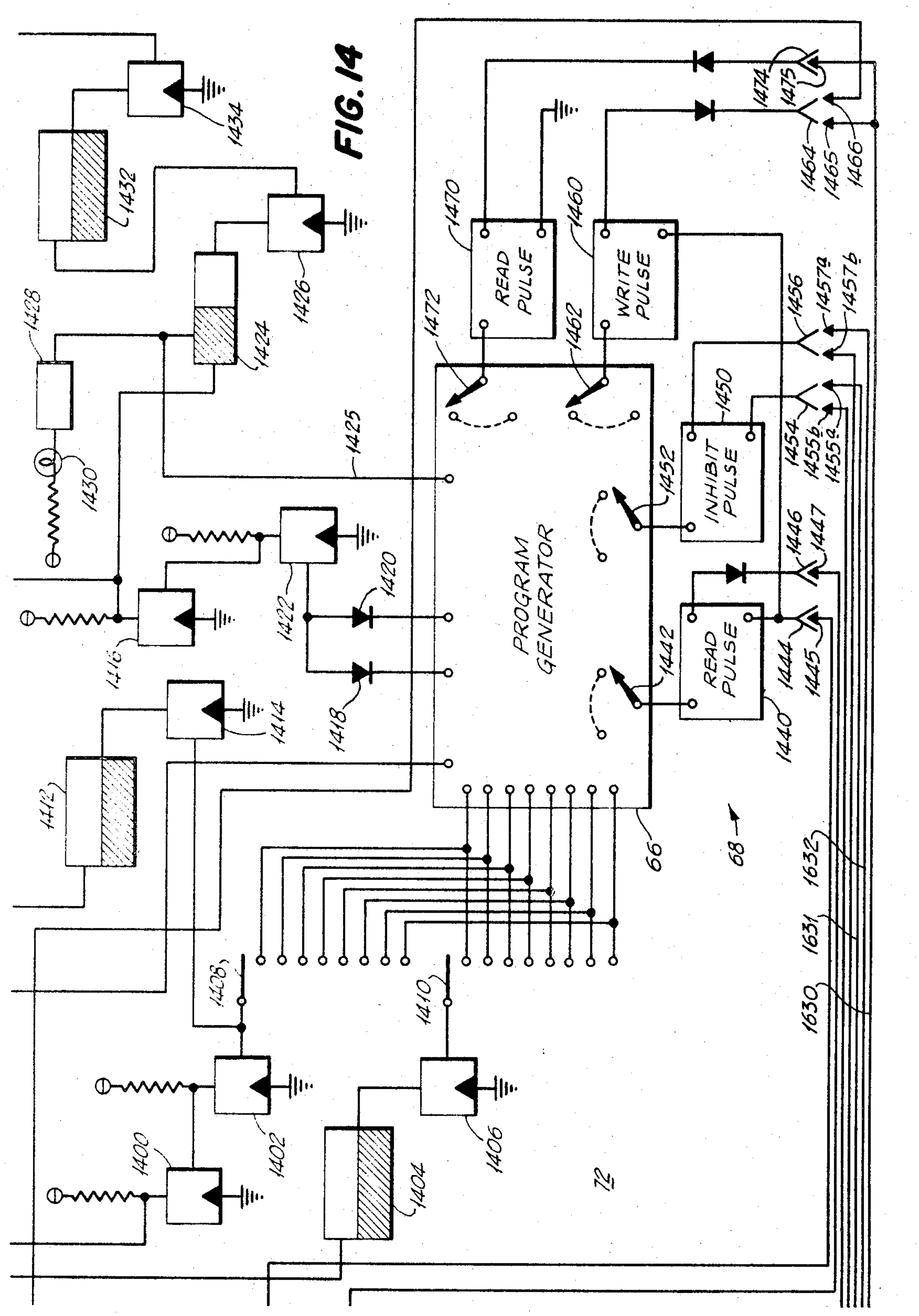

Similarly, if a switch 706 in the unit 702 is operated to select the twenty-sixth core 100, three pairs of contacts **706*a*, 706*b*, and 706*c* are closed. The closure of the contacts 706*b* operates the pulse generator 808 to reset the counting circuit 720 to its normal condition. The closure of the contacts 706*a* again forwards a negative-going pulse from the amplifier 740 to the diodes 714 and 712 to place the inverters 729 and 730 in a conductive condition. However, the closed contacts 706*c* also forward a negative-going pulse through a diode 716 to place the inverter 726 in a conductive condition. Thus, a positive potential is now supplied to the terminals 1, $\bar{2}$, $\bar{3}$, 4, and 5. As shown in FIG. 10, this enables the driver channel 1024 to select and operate the switch in the relay matrix 74** individual to the twenty-sixth core to be tested.

After the adjustments described above have been made to condition the system 60 for automatically testing the twenty-six cores on one side of a bit strip 64, the bit strip 64 is placed in the testing fixture, and the support 1610 is actuated so that the twenty-six probes 1612 enter the center openings 104 on the twenty-six cores 100 on the side of the bit strip 64 to be tested and are received in the receptacles 1614. In the normal condition of the control circuit 72, the program generator 66 is disabled and must be manually placed in operation to initiate a cycle of testing operation following the insertion of the bit strip 64 to be tested. More specifically, a program generator control flip-flop 1424 is now in a set condition in which a negative potential is applied to the input of an amplifier 1428 to illuminate a lamp 1430 indicating the inhibited or inoperative condition of the program generator 66. The negative potential provided by the flip-flop 1424 is also supplied to the generator 66 over a conductor 1425 to inhibit the transmission of the counting pulses used to provide the time slot signals as shown and described in detail in the above-identified copending application of William H. Kastning.

When the system 60 is to be placed in operation to test the bit strip 64 in the test fixture, a switch 1372 is momentarily operated to control a pulse generator 1370 to supply a negative-going signal through a diode 1374 in a NOR gate to the input of an inverter 1378. This places the inverter 1378 in conduction so that a positive-going signal is supplied to the reset inputs of the four detectors 1220, 1230, 1240, and 1250. This restores these detectors to normal reset conditions. The positive-going pulse provided at the output of the inverter 1378 also controls an inverter 1380 to supply a negative-going signal to the input of an inverter 1434. The inverter 1434 sets a monostable delay circuit 1432 so that after a time delay sufficient to reset the necessary components of the control circuit 72 and the bit counter 76, the circuit 1432 delivers a negative-going pulse to the input of an inverter 1426. The inverter 1426 resets the generator control flip-flop 1424 to the condition illustrated in FIG. 14 in which the negative potential is removed from the input of the lamp amplifier 1428 and the conductor 1425. This terminates the illumination of the lamp 1430 and places the program generator 66 in operation so that eight discrete negative signals are developed representing the eight time slots in the testing time frame.

During the first time slot, the write pulse source 1460 is rendered effective to apply a positive-going write pulse to the conductor 1630. Since the counting circuit 720 in the bit counter 76 is in its normal condition, the drive amplifier 1008 in the first channel 1000 is in an operative condition to operate the relay 1621. Thus, the first write pulse is forwarded from the conductor 1630 to the probe 1612 in the first core 100 to be tested. This pulse operates the core 100 to a "1" condition.

The program generator 66 next enables the read pulse source 1470 in the second time slot to provide a negative-going pulse which is forwarded over the conductor 1630 and the operated switch 1621 to the probe 1612 inserted in the center opening 104 of the first core. This operates the core 100 from the "1" condition shown in FIG. 18 to the read condition shown in FIG. 21 and reverses the direction of the flux in the sense leg 114 of this core to induce the potential represented by the waveform 2702 (FIG. 27) in the sense conductor 1604.

This potential is coupled through the amplifier 1200 and the attenuation network 1202 to be applied to the input of the amplifier 1204 and results in the application of a negative-going pulse over the conductor 1204*a* to the input of the odd "1" detector 1220 and of a positive-going signal over the conductor 1204*b* and the conductive segment 1213 to the input of the even "1" detector 1230. The "1" response signal is also coupled through the amplifier 1206 to be applied to the inputs of the detectors 1240 and 1250. However, these detectors are not rendered responsive due to the lack of strobe pulses in this time slot. The detectors 1220 and 1230 are rendered responsive to the "1" response potentials for the entire duration of the second time slot under the control of the inverters 1400 and 1402. If the amplitude of the "1" response signal represented by the waveform 2702 (FIG. 27) exceeds the limit represented by the line 2706, the detector 1220 is set. The detector 1230 is not set because of the positive polarity of the pulse applied to the input thereof.

When the detector 1220 is set, a negative potential is applied to the input of the lamp amplifier 1222, and the lamp 1224 is illuminated, the remaining lamps remaining in a darkened condition. The more positive potential provided at the reset output of the detector 1220 is also forwarded over the conductive segment 1263 to be applied to the diode 1277. The diode 1276 is returned to a more positive potential at the set output of the detector 1230. Thus, both of the diodes 1276 and 1277 are enabled, and the inverter 1278 is placed in a nonconductive condition representing the satisfactory completion of the evaluation of the magnitude of the "1" response signal for the odd core.

The negative potential provided at the output of the inverter 1278 is forwarded through a diode 1316 in a NOR gate to place an inverter 1320 in a conductive condition. The positive-going signal provided at the output of the inverter 1320 inhibits operation of a lamp amplifier 1332 so that illumination of a lamp 1334 is terminated. The darkened condition of the lamp 1334 indicates that the "1" response of the core 100 under test has been satisfactory. In addition, the more positive potential provided at the output of the inverter 1320 enables a diode 1336 forming one input to an AND gate connected to the input of an inverter 1340.

During the third time slot, the program generator first enables the inhibit pulse source 1450 so that an inhibit signal is transmitted over the conductors 1631 and 1632 and the operated switches 1641 and 1642 to be applied to the inhibit winding common to all of the cores 100 on one side of the bit strip 64 provided by the conductor 1608. Subsequently, the program generator 66 enables the write pulse source 1460 so that a write signal is superimposed on the inhibit signal in only the first core 100 selected by the operated switch 1621. This writes a "0" in the core 100 and provides the magnetic state shown in FIG. 17 of the drawings. The superposition and differential timing of the inhibit pulse and the write pulse avoids half-switching of the core 100.

During the fourth time slot, the program generator 66 again enables the inhibit pulse source 1450 so that an inhibit signal having a first polarity is applied to the inhibit winding 1608 to apply the drive condition shown schematically in FIG. 20 of the drawings. However, the magnetic state of the core 100 in this "*d*0" condition is the same as in the "0" condition shown in FIG. 17.

During the fifth time slot, the program generator 66 enables the read pulse source 1470 to apply a read signal over the conductor 1630 and the operated switch 1621 to the probe 1612 inserted in the first core 100 to be tested. This restores the core 100 to the read condition shown in FIG. 21 and induces a "*d*0" signal in the sense conductor 1604 of the general configuration represented by the waveform 2710 (FIG. 27). This signal is coupled through the amplifier 1200 and the attenuation network 1202 to be applied to the input of the amplifier 1206 and produces a negative-going signal on the conductor 1206*a* and a corresponding positive-going signal on the conductor 1206*b*. The detectors 1240 and 1250 are selectively rendered responsive to signals appearing on the conductors 1206*a* and 1206*b* in this fifth time slot under the control of the monostable circuit 1404 and the inverter 1406. As set forth above, these components are rendered effective in the fifth time slot to provide a five hundred nanosecond pulse delayed in the fifth time slot after the read pulse applied to the core 100 a time sufficient to permit the dissipation of noise and other spurious signals. At this time, the negative-going pulse provided at the output of the monostable circuit 1404 is applied to the enabling inputs of the two "0" evaluating detectors 1240 and 1250. If the amplitude of the "*d*0" response signal is greater than the level represented by the line 2714 (FIG. 27), the detector 1240 is set. The detector 1250 remains reset because it is not responsive to the positive-going signal provided by the conductor 1206*b*. Alternatively, if the level of the "*d*0" response signal represented by the waveform 2710 does not reach the level represented by the line 2714, the detector 1240 is not set.

Assuming that the detector 1240 is set and that the detector 1250 remains in its reset condition indicating the satisfactory completion of the odd core "*d*0" response test, the setting of the detector 1240 applies a negative potential to the input of the lamp amplifier 1242 so that the lamp 1244 is illuminated, the lamps 1254 and 1234 remaining in a darkened condition. This provides a visual indication that the tests on the "1" and "*d*0" responses have been satisfactorily completed.

In addiiton, when the detector 1240 is set, a more positive or ground potential is applied to the diode 1282, the diode 1283 being normally enabled at the reset input of the detector 1250. This places the odd "0" response evaluating inverter 1284 in a nonconductive condition so that a negative potential is forwarded through a diode 1322 in a NOR gate to the input of an inverter 1326. This places this inverter in a conductive condition to terminate the illumination of a lamp 1330 by a lamp amplifier 1328. The termination of the illumination of the lamp 1330 indicates that the "*d*0" evaluation has been satisfactorily completed. The more positive potential provided at the output of the inverter 1326 is also applied to a diode 1338 in the AND gate connected to the input of the inverter 1340. This completes the enabling of this AND gate.

More specifically, the enabling of the AND gate places the inverter 1340 in a nonconductive condition so that a more negative potential is applied to the input of an inverter 1342. This places the inverter 1342 in a conductive condition so that a more positive potential is forwarded over a circuit including a segment 1268 on the switching assembly 1260 to a diode 1344 in an AND gate. This AND gate also includes a diode 1346 which is connected to the output of an inverter 1416. The input of the inverter 1416 is connected to the output of an inverter 1422, the input of which is connected to an AND gate including a pair of diodes 1418 and 1420. The diodes 1418 and 1420 are enabled by the program generator 66 at the end of the time frame in the manner described in detail in the contemporaneously filed application of William H. Kastning. Accordingly, at the end of the time frame in which the first core is tested, the inverter 1422 is placed in a nonconductive condition so that a more negative potential is applied to the input of the inverter 1416. This places the inverter 1416 in a conductive condition to provide a positive-going signal at its output that is applied to one input of the flip-flop 1424. This operates the flip-flop 1424 to a set condition in which the negative potential is applied to the conductor 1425 to interrupt further operation of the program generator 66 and in which the lamp 1430 is illuminated to provide a visible indication that this generator is inoperative.

The more positive potential provided at the output of the inverter 1416 is also applied to the diode 1346 to complete the enabling of the AND gate connected to the input of the inverter 1348. This places the inverter in a nonconductive condition so that a more negative potential is applied to a switch 1350. When the system 60 is conditioned for automatic and sequential testing of each of the cores 100 in the bit strip 64, the switch 1350 is in a condition in which two pairs of contacts 1352 and 1354 are closed. Thus, the more negative potential provided at the output of the inverter 1348 is applied to the input of an inverter 1356 to place this inverter in a conductive condition. The more positive potential appearing at the output of the inverter 1356 is forwarded to the input stage 721 in the counting circuit 720 of the bit counter 76 so that the conductive state of the input stage 721 is reversed. This removes the more positive potential from the $\bar{1}$ terminal and applies a positive potential to the 1 terminal. This terminates the enabling of the gates for the channel 1000 so that the illumination of the lamp 1014 is terminated, and the drive amplifier 1008 is no longer effective. This releases the relay 1621 to disconnect the first probe 1612 in the text fixture from the write-read conductor 1630. The altered potential states provided at the outputs of the input flip-flop 721 also completes the enabling for the second output and indicating channel 1020. When the channel 1020 is enabled, the lamp indicating the testing of the second core 100 is illuminated, and the winding of the relay 1622 is energized to connect the second probe 1612 to the conductor 1630. This probe is located within the center opening 104 of the second core on the bit strip 64, which core is an even core.

This change in the conductive condition of the input flip-flop 721 also controls the switching assembly 1640 to reverse the direction in which the inhibit drive is applied to the cores 100. More specifically, a negative potential is no longer applied to the terminal 1, and the amplifier 1154 is rendered ineffective so that the switches 1641 and 1642 in the assembly 1640 are released. A negative potential is applied, however, to the terminal $\bar{1}$ which is forwarded over the conductive segment 1183 to render the amplifier 1164 effective to energize the winding for the relays 1643 and 1644. Accordingly, during the testing of the even cores, the inhibit conductors 1631 and 1632 are connected to the inhibit conductor 1608 on the bit strip 64 to provide signals of opposite polarity.

The positive-going potential provided at the output of the inverter 1356 is also applied to the input of an inverter 1358 so that this inverter returns to a nonconductive condition and forwards a more negative potential through the closed contacts 1354 to a diode 1376 in the NOR gate connected to the input of the inverter 1378. This places the inverter 1378 in conduction so that a positive-going pulse is applied to the reset terminals of the four detectors 1220, 1230, 1240, and 1250 to reset these detectors to their normal condition.

When the detectors 1220, 1230, 1240, and 1250 are restored to a normal condition, the illumination of the lamps 1224 and 1244 is terminated, and the inverters 1278 and 1284 are restored to a conductive condition. This returns the inverters 1320 and 1326 to a nonconductive condition to cause the illumination of the lamps 1330 and 1334. Further, the gate connected to the input of the inverter 1340 is no longer enabled, and this inverter returns to a conductive state to place the inverter 1342 in a nonconductive state. This, in turn, restores the inverters 1348 and 1356 to their normal conditions and terminates the pulse applied to the input of the counting circuit 720 in the bit counter 76.

In addition, the positive-going pulse from the inverter 1378 is applied to the input of the inverter 1380 so that it is placed in a nonconductive condition to apply a more negative potential to the inverter 1434. The inverter 1434, the monostable circuit 1432, and the inverter 1426 operate in the manner described above to reset the flip-flop 1424 so that the negative inhibiting potential is returned from the conductor 1425 and from the input to the lamp amplifier 1428. This terminates the energization of the lamp 1430 and removes the inhibit from the program generator 66 so that this generator operates through another time cycle during which the eight time slot representing signals are generated.

During this cycle of operation, a "1" is written in the first time slot under the control of the write pulse generator 1460 which is now connected to the second probe 1612 through the closed switch 1622. In the second time slot, a read pulse from the source 1470 is applied to this second probe to operate the second magnetic core 100 from the state shown in FIG. 18 to the state shown in FIG. 21. This reversal in the direction of the remanent magnetic field in the core leg 114 induces a potential in the sense winding provided by the conductor 1604. However, the polarity of this signal is reversed from that developed by the first core 100, as indicated by the waveform 2700 (FIG. 27).

This potential is forwarded through the amplifier 1200 and the attenuation network 1202 to be applied to the input of the amplifier 1204. However, because of the reversed polarity of the input signal, the amplifier 1204 now provides a negative-going signal on the conductor 1204*b* and a corresponding positive-going signal on the conductor 1204*a*. The two "1" evaluating detectors 1220 and 1230 are again enabled for substantially the full width of the second time slot under the control of the inverters 1402 and 1400 in the manner described above. Since the detector 1220 does not respond to a positive-going signal, this detector remains reset. If the magnitude of the "1" response signal represented by the waveform 2700 (FIG. 27) is greater than the level represented by the line 2704, the detector 1230 is set by the negative-going pulse on the conductor 1204*b*.

When the detector 1230 is set, the lamp 1234 is illuminated to indicate the satisfactory completion of the "1" evaluation operation. Further, the ground potential provided at the reset output of the detector 1230 is forwarded over the conductive segment 1262 to be applied to the diode 1280, the diode 1279 being returned to a more positive potential at the set output of the detector 1220 which remains in its normal state. Thus, the even "1" evaluating inverter 1281 is placed in a nonconductive condition to forward a more negative potential through a diode 1318 in the NOR gate connected to the inverter 1320. This places the inverter 1320 in a conductive condition so that the lamp amplifier 1332 again terminates the energization of the lamp 1334. When this lamp is no longer illuminated, the satisfactory completion of the "1" evaluating test on the second core is indicated. The more positive potential provided at the output of the inverter 1320 also enables one input to the AND gate connected to the inverter 1340.

During the third and fourth time slots, a "*d*0" is written in the second core 100 in the manner described above, and, in the fifth time slot, the "*d*0" condition is read. The detectors 1240 and 1250 are strobed or enabled in the fifth time slot in the manner described above under the control of the inverter 1406 and the monostable circuit 1404, and the response signal induced in the sense winding provided by the conductor 1604 is again coupled through the amplifier 1200 and the attenuating circuit 1202 to be applied to the input of the amplifier 1206. However the polarity of the "*d*0" response represented by by the waveform 2708 is reversed from that provided by the first core 100. Accordingly, the amplifier 1206 now provides a positive-going signal on the conductor **1206*a* and a negative-going signal on the conductor 1206*b*. This means that the detector 1240 is not set and the detector 1250** is set if the amplitude of the "*d*0" response represented by the waveform 2708 exceeds the level represented by the line 2712.

If the detector 1250 is set representing a "*d*0" response of sufficient magnitude, the amplifier 1252 is controlled to illuminate the lamp 1254. Thus, the lamps 1254 and 1234 are now illuminated, and the lamps 1244 and 1224 remain in a darkened condition to visually signify the satisfactory completion of the evaluation of the detecting operations on the second core. The positive potential provided at the reset output of the detector 1250 is forwarded through the conductive segment 1267 to the diode 1286 to enable this input. The input provided by the diode 1285 is also enabled because of the reset condition of the detector 1240. Thus, the inverter 1287 is now placed in a nonconductive condition to forward a negative potential through a diode 1324 in the NOR gate to place the inverter 1326 in a conductive condition. When the inverter 1326 is placed in a conductive condition, the illumination of the lamp 1330 is again terminated to signify the satisfactory results of the "*d*0" evaluation and the remaining input to the inverter 1340 is enabled. Thus, the inverter 1340 is placed in a nonconductive condition in the manner described above. Placing the inverter 1340 in a nonconductive condition causes the resetting of the detectors 1220, 1230, 1240, and 1250, a single step advance of the counting circuit 720 in the bit counter 76, the reversal of the operating state of the switching assembly 1640, and the removal of the inhibiting condition from the program generator 66 so that the third testing cycle can be initiated in which the characteristics of the third core 100 are checked.

The cyclic operation described above continues until such time as all of the twenty-six cores on one side of the supporting member 1600 for the bit strip 64 have been tested. At this time, the inverter 1026 resets the counter 720 to its normal condition in which the first core 100 in the bit strip 64 is selected. The system will then repeat the same sequence of testing operation on the twenty-six cores in the bit strip 64 for so long as the switch 1350 is retained in a position in which the contacts 1352 and 1354 are closed. Cyclic operation of the testing system 60 can be interrupted by operating the switch 1350 so that all of the contacts 1351, 1352, 1353, and 1354 are opened. This prevents the initiation of an additional cycle of operation and permits the inhibit signal on the conductor 1425 provided at the end of the time frame in which the switch 1350 was operated to remain on this conductor to inhibit further operation of the program generator 66. In one system 60 constructed in accordance with the present invention, complete testing of all of the twenty-six cores on the one side of the bit strip requires .2 seconds. Thus, it is possible to subject each of the cores 100 to repeated cycles of testing operation without requiring an excessive expenditure of time. The cycle time for testing only a single core is on the order of 6.5 milliseconds.

The system 60 can also be operated in a number of different modes to evaluate individual ones or groups of the cores 100 on the bit strip 64. As an example, by using the assembly 700 in conjunction with the bit reset key 820, individual ones of the cores can be tested. Further, an individual core can be subjected to a repeated series of tests without causing the advance of the bit counter 76 by operating the switch 1350 to a condition in which the contacts 1351 and 1353 are closed. In this condition, the negative signal provided at the output of the inverter 1348 as a result of a satisfactory testing operation on a given core is forwarded directly to the diode 1376 in the NOR gate connected to the input of the inverter 1378. This reinitiates the operation of the program generator 66 without forwarding an advance pulse to the bit counter 76 to change its setting.

This repeated testing of a single preselected core 100 is useful in determining the actual values of the "1" response signal or the "0" response signal for either an odd core or even core. With the switch 1350 in the setting in which the contacts 1351 and 1353 are closed, the potentiometers 1298, 1296, 1294, and 1292 can be adjusted to vary the values of the reference potentials supplied to the inputs of the detectors 1220, 1230, 1240, and 1250. By observing the darkened or illuminated condition of the lamps 1330 and 1334, it is possible to determine the exact signal value at which the related ones of the detectors are not set by the response signal. This indicates the maximum amplitude of either the "1" or "*d*0" response signal. In addition, with the switch 1350 set for repeated operation in which the counter 76 is not automatically advanced, successive ones of the cores 100 in the bit strip 64 can be tested by operating the bit advance switch 810 and the reset switch 820.

When all of the twenty-six cores 100 mounted on one side of the support 1600 have been fully evaluated, the fixture is released by elevating the support 1610 to remove the probes 1612 from the center openings 104 in the twenty-six tested cores. The position of the bit strip 64 is then reversed or inverted so that the second row of twenty-six cores are disposed in a testing position. The supporting means 1610 is then lowered to insert the probes 1612 in the center openings 104 of the second group of twenty-six cores 100 to be tested. The system 60 operates in the same manner to check and evaluate the second group of cores. When all testing operations on bit strips have been terminated, the bit strip testing fixture together with the access matrix 74 are removed. In other words, the structure shown in FIG. 16 of the drawings together with the circuit connections extending by means of detachable plug and socket connections to the remainder of the system are removed. This system can then be prepared for use in testing completed memory units 62.

The system 60 can be used to test completed magnetic memory planes of various types. The memory unit 62 with which the operation of the system 60 is illustrated is operated in a sequential access, word-organized mode and is formed by threading horizontal read and write windings through the openings 102 and 104 on the cores 100 of thirteen bit strips 64 to provide a memory having a storage capacity of twenty-six words, each containing twenty-four bits. An additional diode board is used in forming the memory unit 62 to provide means for grouping the read and write termination so as to reduce the number of inputs.

Figure 15:
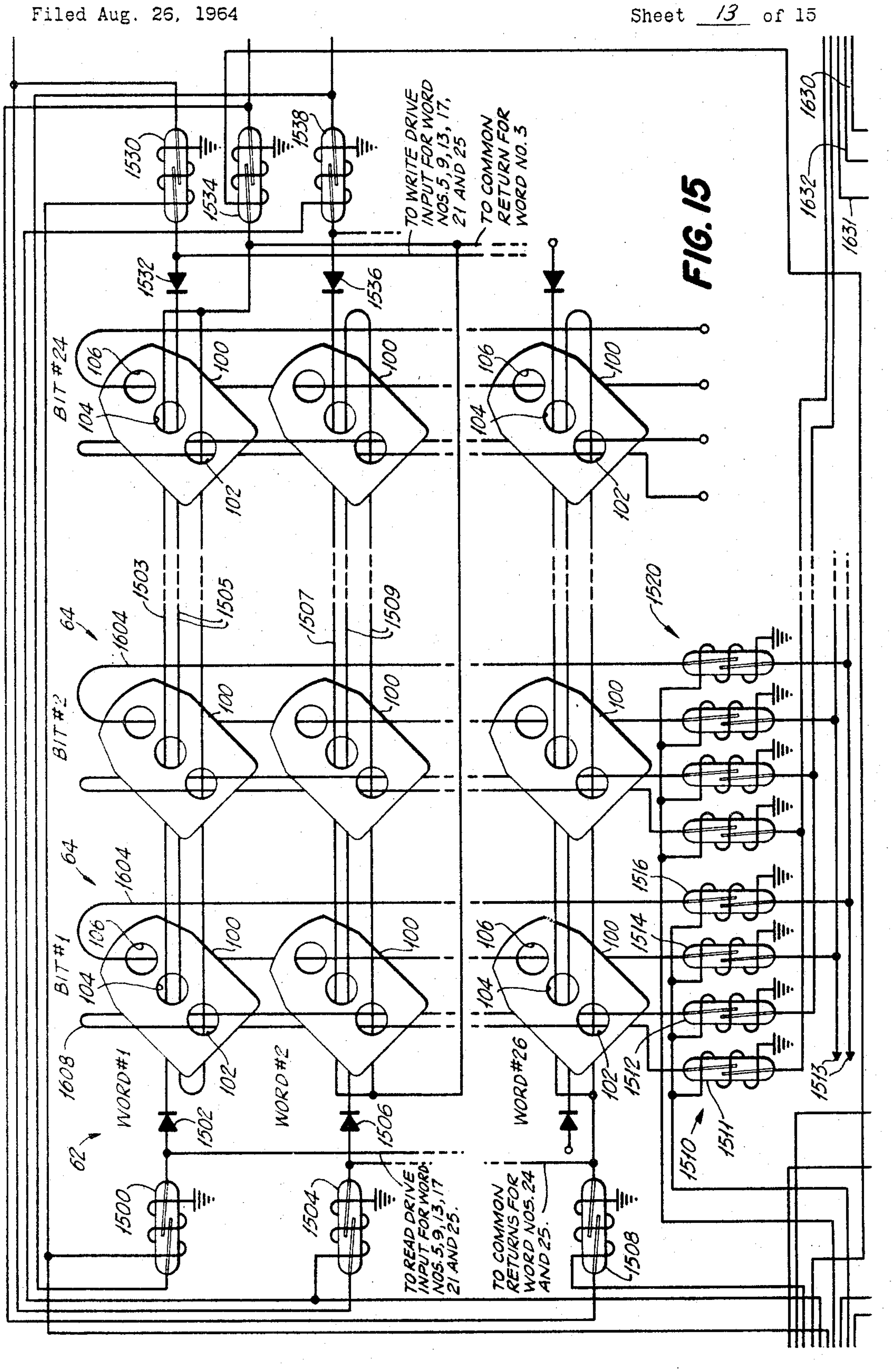

The construction of the memory unit 62 and the connected access matrix 78 used in testing is shown in condensed schematic form in FIG. 15 of the drawings. The input and output leads for the memory unit 62 and the access matrix 78 are selectively connected to the plurality of detectors 70, the core drivers 68, the bit counter 76, and the word counter 80 when the system 60 is to be used to test the memory unit 62. The selection technique used during testing is that of supplying read and write pulses to the openings 102 and 104 of all twenty-four of the bit storing cores 100 in a selected one of the words and of selectively supplying inhibit pulses to the individual bit storing cores in sequence as each core testing operation is completed during successive ones of the time frames of the program generator 66. The words are selected in sequence under the control of the word counter 80, and the individual bit storing cores within each of the individual words are selected under the control of the bit counter 76. The sense windings for the cores 100 are coupled in sequence to the detector means 70 under the control of the bit counter 76.

In FIG. 15, a single conductor 1503 connected to an access diode 1502 threads the center openings 104 of the twenty-four cores 100 forming the first word from left to right to provide a read winding. In this first word, a reentrant conductor 1505 connected to an access diode 1532 threads the center openings 104 of the twentyy-four cores 100 from right to left and returns from left to right through the inhibit openings 102 of the twenty-four cores to provide a write winding. The read conductor 1503 and the write conductor 1505 are provided with a common return which is selectively connected to a common return for a read pulse source 1440 and the write pulse source 1460 over a circuit including a relay 1534 and a plug 1445 inserted in a receptacle 1444. The read access diode 1502 is connected to the output of the read pulse source 1440 through a switch 1500 in the matrix 78 and a plug 1447 that is inserted into a receptacle 1446 connected to the output of the read pulse source 1440. Similarly, the write conductor access diode 1532 is connected through a switch 1530 in the access matrix 78 to the output of the write pulse source 1460 over a circuit including a plug 1466 adapted to be inserted into the receptacle 1464 at the output of the source 1460.

In the second word of the memory unit 62, a conductor 1507 connected to an access diode 1536 threads the center openings 104 of the twenty-four cores 100 forming the second word from right to left and is connected to a common return conductor by the normally open switch 1534 in the access matrix 78. A write conductor 1509 connected to an access diode 1506 for the second word threads the center openings 104 in the cores 100 from right to left and returns to the switch 1534 through the openings 102 from right to left. The write access diode 1506 is connected to the write conductor through a normally open switch 1504 in the access matrix 78, and the read access diode 1536 for the second word is adapted to be connected to the read conductor through a normally open switch 1538 in the matrix 78.

The read and write conductors 1503, 1505 in the first word and the read and write conductors 1507, 1509 in the second word of the memory 62 thread the openings 102 and 104 of the cores 100 in opposite directions to provide reversed drives for the cores 100 in the odd and even words. However, in view of the fact that the sense winding provided by the conductor 1604 threads the cores 100 in the odd and even words in an opposite direction, the reversed polarity of the read and write drives for the odd and even words insures uniform polarity output signals on the sense windings provided by the conductors 1604.

As indicated above, the switches 1500, 1504, 1530, 1534, and 1538 for selectively connecting the first and second word read-write windings to the read pulse source 1440 and the write pulse source 1460 are selectively operated under the control of the word counter 80 to sequentially direct read and write drive signals in common to the twenty-four cores 100 in each word. The twenty-four bit storing cores 100 in each of the words are selectively connected to the inhibit pulse source 1450 and the sense windings provided by the conductors 1604 are selectively rendered effective to control a detector 70 under the control of twenty-four groups of four switches, such as two groups of switches 1510 and 1520 for the first and second bits, which are sequentially and selectively operated by the bit counter 76. More specifically, the bit #1 switch group 1510 includes four normally open switches 1511, 1512, 1514, and 1516. The operation of the relays 1511 and 1512 connects the inhibit or digit conductor 1608 threading the inhibit openings 102 to a pair of plugs **1455*b* and 1457*b* which are inserted in the receptacles 1454 and 1456 connected to the output of the inhibit pulse source 1450. The selective operation of the relays 1514 and 1516 connects the conductor 1604 providing the sense winding to a pair of terminals 1513 which are inserted in the receptacles 1201 to couple the sense windings for the memory 62 to the amplifier 1200 in the control circuit 72. Thus, as the switch groups similar to the groups 1510 and 1520 are sequentially operated, the twenty-six cores representing the same bit in each of the twenty-six words are rendered responsive to the inhibit pulses from the inhibit pulse source 1450 and are prepared to supply output signals to the common input amplifier 1200 in the control circuit 72**.

The system 60 is capable of performing a variety of different core evaluating operations on the individual cores 100 in the memory unit 62. The operation of the system 60 is described in conjunction with a specific sequence of tests in which the "*d*1" response of a core shown by waveform 2800 (FIG. 28) is checked to insure that its peak value exceeds a minimum level represented by a line 2802 and does not exceed a maximum limit represented by line 2804. Similarly, the "*d*0" response of the cores 100 shown by a waveform 2806 is checked to insure that it exceeds a minimum level represented by line 2808 and does not exceed a maximum level represented by the line 2810. In one illustrative testing program for the cores 100, the pulse generators 1440, 1450, and 1460 are controlled by the program generator 66 to write a "1" in the core 100 in the first time slot, to disturb the "1" in the second time slot, to read the "*d*1" response during a four hundred nanosecond interval in the third time slot, to write a "0" in the fourth time slot, to disturb the "0" in the fifth time slot, and to read or evaluate the "*d*0" response during a four hundred nanosecond interval in the sixth time slot.

To prepare the system 60 for this testing operation, the switching means 1462 (FIG. 14) in the program generator 66 is operated to supply enabling signals with secondary timing to the write pulse generator 1460 in the first and fourth time slots so that positive-going pulses of approximately two microseconds duration are supplied to the memory 62. The switching means 1452 is adjusted to positions supplying enabling pulses to the inhibit pulse generator 1450 in the first, second, and fifth time slots with primary timing so that the inhibit pulse generator 1450 delivers three microsecond negative-going pulses in these three time slots. The switching means 1442 is operated to supply enabling pulses to the read pulse generator 1440 in the third and sixth time slots so that this pulse source supplies the memory unit 62 with positive-going signals of around three microseconds duration with primary timing in the third and sixth time slots. This pattern of signals is generated during each time frame and operates the selected core 100 in the memory unit 62 to the different magnetic states required for performance of the illustrative evaluating test set forth above.

The superimposition of the write and inhibit pulses of different durations in the first time slot is effective to write a "1" in the core and to provide the magnetic flux state shown in FIG. 25 because of the use of the uninhibited switching mode in the testing operations on the completed memory 62. The application of only an inhibit pulse to a core in the state shown in FIG. 25 does not alter the remanent magnetic flux states in the core legs when the "1" is disturbed in the second time slot because the geometry of the core 100 is such as to prevent a reversal of the flux direction in the leg 110, i.e., the geometry of the core 100 is such that it cannot be placed in a condition in which only one leg must carry the return flux for three legs in which the direction of the remanent magnetic flux is opposite. The presence of the maximum limit detector 1220 insures that the magnetic state of the core 100 in which the "1" has been written has not been altered by the inhibit pulse in the second time slot to provide a true disturbed "1."

To prepare the plurality of detectors 70 consisting of the detectors 1220, 1230, 1240, and 1250 for performing the evaluating operations shown schematically in FIG. 28, the switching assembly 1210 is operated to its memory setting to select the proper strobing potentials for these detectors and to select the combination of input potentials to be applied to these detectors by the amplifiers 1204 and 1206. The potentiometer network 1290 is also adjusted to select suitable reference potentials to the detectors. Further, the switching assembly 1260 is operated to interconnect the outputs of the detectors 1220, 1230, 1240, and 1250 with suitable evaluating means in the control circuit 72.

The detector 1220 is conditioned to operate as a maximum level detector and is provided with a reference potential by the potentiometer 1298 corresponding to the level 2804 so that this detector is not set if the "1" response of the core is within the desired limits. The potentiometer 1296 is adjusted to provide the reference potential input of the detector 1230 with a potential corresponding to the limit represented by the line 2802 so that this detector is set to indicate that the "1" response signal has at least the necessary minimum value. The potentiometer 1294 is set to provide the detector 1240 with a reference potential representing the maximum limit corresponding to the line 2810, and the potentiometer 1292 is set to provide the reference potential input of the detector 1250 with a potential corresponding to the level represented by the line 2808. Accordingly, if the "*d*0" response of a core is proper, the detector 1240 is not set, and the detector 1250 is set.

As set forth above, the response signals provided by the conductors 1604 in the memory 62 have a uniform polarity. Thus, with negative-going signals applied to the inputs of the amplifiers 1204 and 1206 by the amplifier 1200 and the attenuating network 1202, only the response signals appearing on the corresponding polarity output leads **1204*a* and 1206*a* are used. When the switching assembly 1210 is in its memory setting, the negative-going potential applied to the conductor 1204*a* is connected directly to the unknown input terminal of the detector 1220 and is forwarded through the conductive segment 1211 to the corresponding terminal of the detector 1230. Similarly, the negative-going potential from the "0" response amplifier 1206 is applied directly over the cable 1206*a* to the input of the detector 1240 and is forwarded through the conductive segment 1214 to the unknown input terminal of the "0" evaluating detector 1250. The conductors 1204*b* and 1206*b* are not connected to any of the inputs of the detectors 1220, 1230, 1240, and 1250**.

The selective setting of the switching assembly 1210 also controls the strobing potentials applied to the detectors 1220, 1230, 1240, and 1250. As set forth above, the "1" response and the "*d*0" response of the core 100 is to be tested during a 400–500 nanosecond period during the third and sixth time slots, respectively. Accordingly, the switch 1408 is set to select the third time slot conductor so that a negative-going pulse is applied to the input of an inverter 1414 to control this inverter to set a monostable delay circuit 1412 in the third time slot. At the end of a preselected time delay, the monostable circuit 1412 provides a 400–500 nanosecond negative-going pulse which is forwarded over a conductive segment 1215 in the switch assembly 1210 to the strobe inputs of the two "1" evaluating detectors 1220 and 1230. To select the response period for the "0" evaluating detectors 1240 and 1250, the switching means 1410 is operated to its sixth position so that the inverter 1406 sets the monostable circuit 1404 to provide a 400–500 nanosecond pulse in the sixth time slot. This negative-going strobe pulse is forwarded over the conductive segment 1216 in the switch assembly 1210 to be applied to the strobe inputs of the two "0" evaluating detectors 1240 and 1250.

Since the lamp amplifiers 1222, 1232, 1242, and 1252 remain connected to the set outputs of the detectors 1220, 1230, 1240, and 1250, the four indicating lamps 1224, 1234, 1244, and 1254 are normally maintained in a darkened condition in the reset condition of the control circuit 72. These lamps are selectively illuminated in accordance with the pattern of set and reset conditions to which the four detectors 1220, 1230, 1240, and 1250 are operated during the evaluation of the cores. The significance of the different patterns of illumination of the lamps 1224, 1234, 1244, and 1254 is set forth in the following table:

| Lamp 1224 | Lamp 1234 | Lamp 1244 | Lamp 1254 | |
|---|---|---|---|---|
| Off | On | Off | On | "1" and "d0" correct |
| On | On | Off | On | High "1" |
| Off | Off | Off | On | Low "1" |
| Off | On | On | On | High "d0" |
| Off | On | Off | Off | Low "d0" |
| On | On | On | On | High "1", High "d0" |
| Off | Off | Off | Off | Low "1", Low "d0" |

As set forth in the table above, the detectors 1230 and 1250 are set and the detectors 1220 and 1240 remain in a reset condition when the test on the core 100 reaches a satisfactory conclusion. The satisfactory results of the tests on the "1" and "*d*0" responses are evaluated by a pair of AND gates in the control circuit 72. More specifically, a pair of diode 1270 and 1271 and an inverter 1272 provide means for evaluating the satisfactory completion of the "1" test, and a pair of diodes 1273 and 1274 and an inverter 1275 provide means for evaluating the satisfactory conclusion of the "*d*0" test. These AND gates are rendered effective or responsive to control by the plurality of detectors 1220, 1230, 1240, and 1250 by the switching assembly 1260 in its memory setting. More specifically, the diode 1270 is normally provided with an enabling potential at the set output of the detector 1220 over a circuit including the conductive segment 1261 on the switch 1260. The diode 1271 normally receives an inhibiting potential from the reset output of the detector 1230 over a circuit including the conductive segment 1262. Thus, this AND gate is normally inhibited, and the inverter 1272 is normally in a conductive state providing a more positive output. Similarly, in the "0" evaluating AND gate, the diode 1273 normally receives an enabling potential from the set output of the detector 1240 over a circuit including the conductive segment 1265. The diode 1274 is normally inhibited by a potential received from the reset output of the detector 1250 over a circuit including the conductive segment 1267. Thus, the inverter 1275 is normally in a conductive condition providing a more positive output potential. In this manner, by operating the switching assemblies 1210 and 1260 to their memory positions, the control circuit 72 and the plurality of detectors 1220, 1230, 1240, and 1250 are conditioned to perform the type of test used to evaluate the cores 100 in the memory unit 62.

As set forth above, the bit counter 76 and the word counter 80 control the access matrix 78 to select successive bit storing cores 100 in the different words of the memory 62. More specifically, the bit counter 76 controls the switching of the sense outputs of the cores 100 and the application of the inhibit signals thereto, while the word counter 80 controls the application of read and write drives to all of the cores 100 in successive ones of the twenty-six words. During the testing of the bit strips 64, the system 60 must obtain sequential access to each of the twenty-six cores on one side of the bit strip 64, but in the testing of the memory 62, each of the words includes only twenty-four bit storing cores. Thus, it is only necessary for the bit counter 76 to make twenty-four separate selections when testing memory units 62 rather than the twenty-six selections required in testing bit strips 64. In addition, the driver stages 1150, 1160, and 1170 controlled by the settings of the counter 720 in the bit counter 76 during bit strip testing operations are used for word selection rather than controlling the reversal of the polarity of the inhibiting pulse (drive channels 1150 and 1160) and the selection of a bit (drive channel 1170).

These alterations in the mode of operation of the bit counter 76 as well as other operations necessary to condition the bit counter 76 and the word counter 80 for controlling the access matrix 78 for the memory 62 are effected by operating the switching assembly 1180 to its memory setting. In this setting, the inputs to the inverters 1152 and 1162 are disconnected from the 1 and 1 terminals so that the channels 1150 and 160 are no longer responsive to the conductive state of the input flip-flop 721 in the bit counting circuit 270. Further, a pair of normally ineffective lamps 1159 and 1169 in these two channels controlled by a pair of lamp amplifiers 1158 and 1168 are rendered responsive to control over a circuit including a pair of conductive segments 1186 and 1184, respectively. The lamp amplifier 1178 previously used to control the illumination of the lamp **1179*a* representing the twenty-fifth core 100 in the bit strip 64 is disconnected from this lamp and is connected to another indicating lamp 1179 representing a particular setting of the word counter 80 over a circuit including the conductive segment 1187. The inputs to the lamp amplifier 1178 and the inverter 1172 are disconnected from the output of the inverter 1022 for the twenty-fifth core in the bit strip 64 and are connected to one of the outputs of a decoder 1100 over a circuit including the conductive segment 1185**.

The inputs to the channels 1150 and 1160 are connected to two outputs of the decoding network 1100 over circuits including the conductive segments 1181 and 1183. The decoding network 1100 is controlled by and forms a part of the word counter 80. Thus, the inputs to the channels 1150, 1160, and 1170 are no longer responsive to control from the bit counter 76 but are connected to the decoding network 1100 for selective operation under the control of the word counter 80.

When the system 60 is used to test bit strips, the bit counting chain 720 is reset to a normal condition when it reaches its twenty-seventh position following the testing of the twenty-sixth or last core 100 on the bit strip 64 under the control of the inverter 1026. However, when the switching assembly 1180 is operated to its memory position, the output of the inverter 1022 is disconnected from the input to the channel 1170 in the manner described above, and this inverter is connected by the conductive segment 1182 to the diode 804 in the NOR gate to the inverter 800. Thus, the counting circuit 720 is now reset to a normal condition when it reaches its twenty-fifth step or following the selection of the twenty-fourth bit storing core 100 in a given one of the words in the memory 62. Accordingly, the bit counter 720 is advanced step-by-step under the control of pulses supplied by the control circuit 72 in the manner described above so as to advance through twenty-four distinct settings in which the twenty-four bit storing cores in each word of the memory 62 are tested. In the twenty-fifth setting, the inverter 1022 resets the counter 720 to a normal condition.

To permit the sequential selection of the different bit storing cores 100 in the memory 62 under the control of the bit counter 76, the operating windings of the four relays in each of the bit selection groups, such as the groups 1510 and 1520, in the access matrix 78 are selectively and detachably connected to the various driver and indicating channels controlled by the bit counting circuit 720. As an example, the four operating windings for the relays 1511, 1512, 1514, and 1516, which relays select the twenty-six cores 100 occupying the first bit position in the twenty-six words, are connected over a conductor to a plug **1012*b* which is inserted in the receptacle 1012 connected to the output of the driver amplifier 1008 in the first channel 1000. Thus, when the counter 720 is reset to its first condition, the channel 1000 is rendered effective in the manner described above to illuminate the lamp 1014 providing a visual indication that the first bit has been selected. The amplifier 1008 in this channel also energizes the windings of the four relays in the group 1510 to operate these relays. As set forth above, the operation of the relays 1514 and 1516 connects the sense conductor 1604 for the cores occupying the first bit position to the input of the amplifier 1200, and the operation of the relays 1511 and 1512 connects the inhibit conductor 1608 to the output of the inhibit pulse source 1450. Similarly, the windings for the four relays in the second group 1520 in the access matrix 78, which relays control the twenty-six cores 100 occupying the second bit position in the twenty-six words, are connected over a conductor to a plug 1021*b* which is inserted in the receptacle 1021 at the output of the second channel 1020. In a similar manner, the remaining twenty-two groups of relays similar to the groups 1510 and 1520 are connected to the outputs of twenty-two additional driver and indicating stages controlled by the counting circuit 720**.

The word counter 80 is operable through a single cycle of operation during the testing of the memory 62 to control the relays forming the access matrix 78 to direct read and write pulses or signals to the different words of the memory 62 in sequence. The word counter 80 comprises a word counting circuit 930 including five flip-flops 931–935 connected for sequential or step-by-step operation through a plurality of different patterns of set and reset conditions in a binary counting progression. The word counting circuit 930 is advanced a single step in response to each complete cycle of operation of the bit counter 720. More specifically, the complementing inputs of the flip-flop 931 are connected over a circuit including a pair of normally closed contacts 846 on a word advance switch 840 to the output of the pulse amplifier 734. As set forth above, the amplifier 734 supplies a positive-going pulse for resetting the bit counting circuit 720 at the end of a complete cycle of operation. Accordingly, the pulse amplifier 734 also supplies a single operating pulse to the word counting circuit 930 in response to each complete cycle of operation of the bit counting circuit 720. The outputs of the flip-flops 931–935 which are designated as 6, $\bar{6}$, 7, $\bar{7}$, 8, $\bar{8}$, 9, $\bar{9}$, 10, and $\overline{10}$ are selectively connected to AND gate decoding circuits for selectively rendering a plurality of matrix drive and indicating means operative in accordance with the setting of the word counting circuit 930. These driver and indicating channels selectively operate the word access control relays in the matrix 78 and provide visual indications of the setting of the counting circuit 930 or, more specifically, the word in the memory 62 under test. In function, the counting circuit 930 is divided into two counting chains, one including two flip-flops 931 and 932, and the other including the three flip-flops 933–935. The flip-flops 931 and 932 control four output driver stages 1030, 1050, 1052, and 1054 identified as I, II, III, and IV, respectively, which control the read-write selection relays in the access matrix 78. The stages 931–935 control seven driver and indicating channels 1110, 1120, 1130, 1140, 1150, 1160, and 1170 identified as C1–C7 which selectively control the operation of the relays in the matrix 78 for switching the return leads common to the read-write windings in the memory 62.

Referring now more specifically to the channels 1030, 1050, 1052, and 1054, the channel 1030 includes an inverter 1034 that is selectively placed in a nonconductive condition when a pair of input diodes 1032 forming an AND gate connected to the designated terminals of the flip-flops 931 and 932 is completely enabled. When the inverter 1034 is placed in a nonconductive condition, a more negative potential is applied to the input of a lamp amplifier 1040 so that a lamp 1044 is illuminated to indicate that the stage I is effective. This negative potential at the output of the inverter 1034 is also applied to the input of an inverter 1036 which in turn controls a driver amplifier 1038 to energize the connected relays in the access matrix 78. In the illustrated example, a plug 1046 connected to the operating windings of a group of read-write access relays in the matrix 78 including the relays 1500 and 1530 is inserted into a receptacle 1042 connected to the output of the amplifier 1038. Thus, when the amplifier 1038 is energized, the relay 1500 is closed to connect the read pulse source 1440 to the access diode 1502 in the first word, and the relay 1530 is operated to connect the access diode 1532 for the first word to the output of the write pulse source 1460. In addition and as indicated in FIG. 15, the closure of the switches 1500 and 1530 also connects the read and write pulse sources 1440 and 1460 as the corresponding access diodes for the fifth, ninth, thirteenth, seventeenth, twenty-first, and twenty-fifth words. All of these read and write drives, however, are not effective to change the magnetic states of the related cores 100 because of the use of a switched common return for these drives.

When the word counter 930 advances to its next setting, the channel 1030 is disabled, and the channel 1050 is enabled. An output socket 1050*a* from the channel 1050 receives a plug 1050*b* to which is connected the operating windings of the switches 1504 and 1538 for connecting the read and write pulse sources 1440 and 1460 to the access diodes 1506 and 1536 for the second word, as well as those for word Nos. 6, 10, 14, 18, 22, and 26. During succeeding step-by-step operation of the word counter 930, the channels 1052 and 1054 are rendered effective in sequence. Thus, the two input stages 931 and 932 of the word counting circuit 930 selectively connect the read and write pulse sources 1440 and 1460 to the access diodes for four distinct groups of words in the memory 62.

A selected one of the read-write drives in each of these four groups selected by the settings of the flip-flops 931 and 932 is rendered effective to change the magnetic states of the related cores 100 under the control of the seven driver and indicating channels 1110, 1120, 1130, 1140, 1150, 1160, and 1170 which are selectively rendered effective in sequence under the control of the settings of the flip-flops 933–935. More specifically, the output terminals from these three flip-flops are connected to the input of the decoding network 1100 which can comprise a plurality of AND gates similar to the AND gates provided by the diodes 1032 connected to the input of the channel 1030 or the diodes 1002 connected to the input of the channel 1000.

In the normal or reset condition of the three stages 933–935, a channel 1110 is enabled so that negative potentials are applied to the input of a lamp amplifier 1118. This causes the illumination of a lamp 1119 to provide a visible indication that the channel 1110, which is otherwise identified as C1, is effective. This negative potential is also applied to the input of an inverter 1112 to render an amplifier 1114 effective. A receptacle 1116 connected to the output of the amplifier 1114 receives a plug 1116*a* which is connected to the operating winding of the relay 1538. A receptacle 1176 connected to the output of the last channel 1170 which is identified as C7 receives a plug 1176*a* which is connected to the operating winding of a relay 1508. The relay 1508 switches the common drive return lead for the last group of words.

When the channel 1110 is rendered effective, the relay 1534 is operated to connect the return for the conductors 1503 and 1505 for the first, second and third words to the return terminals of the read pulse source 1440 and the write pulse source 1460. Since the operation of the relay 1534 completes the return circuit in only one of the group of seven words enabled by the operation of the relays 1500 and 1530, the concurrent operation of the channels 1030 and 1110 selects only word 1. When the channel 1030 is rendered ineffective and the channel 1050 is rendered effective, the channel 1110 remains effective because of the setting of the flip-flops 933–935 has not been changed, and the operation of the relays 1504 and 1538 coupled with the continued energization of the relay 1534 renders the read-write drives for the second word effective so that the second word is selected. The selection sequence controlled by the four channels 1030, 1050, 1052, and 1054 identified as I, II, III, and IV and the seven channels 1110, 1120, 1130, 1140, 1150, 1160, and 1170 identified as C1–C7 is illustrated in FIG. 29. Indicia similar to the table shown in FIG. 29 is used on the test equipment in conjunction with the lamps 1044 and 1119 shown in FIG. 29. By determining the intersection of the row and column in which an illuminated lamp 1044 and an illuminated lamp 1119 appear, the number of the word under test can be determined.

Therefore, the counting circuit 930 is advanced step-by-step at the end of each complete cycle of operation of the bit counter 720 to select words in the manner shown in the table in FIG. 29, and a complete cycle of operation of the word counter 80 is signified by the operation of the counting circuit 730 to a setting in which the III channel 1052 and the C7 channel 1170 are both in an operative condition. Since it is frequently desirable to subject each of the cores 100 in the memory 62 to repeated tests, the enabling of the channels 1052 and 1170 automatically resets the word counting circuit 930.

More specifically, when the III channel 1052 is enabled, a negative potential is applied to tht input of an inverter 854 in a NAND gate including a second inverter 852 whose input receives a negative potential from the decoding network 1100 at the same time that the channel 1170 is enabled. When the two inverters 852 and 854 are placed in a conductive condition, an inverter 856 is placed in a nonconductive condition so that a more negative potential is forwarded through a diode 860 in a NOR gate to the input of an inverter 862. This places the inverter 862 in conduction so that a positive-going signal is applied to one reset terminal of the four flip-flops 932–935 to place these flip-flops in a condition in which a negative potential is applied to the terminals $\overline{7}$, $\overline{8}$, $\overline{9}$, and $\overline{10}$.

The positive-going pulse provided at the output of the inverter 862 is also coupled through a pulse transformer 922 and a delay line 920 providing a delay on the order of two microseconds to the input of an inverter 918. The inverter 918 drives a pulse source or amplifier 916 to supply a positive-going pulse to another set of terminals on the flip-flops 932–935 which places these inverters in a condition in which ground potential is applied to the terminals $\overline{7}$, $\overline{8}$, $\overline{9}$, and $\overline{10}$. The input stage 931 should be in a condition in which ground potential is applied to the terminal 6 because this is the state in which this flip-flop is placed when the resetting operation is initiated. Thus, the counting chain 930 is restored to a normal condition at the end of the cycle of operation.

In the event that, for some reason, the input flip-flop 931 is in an incorrect state at the completion of the resetting operation so that ground is applied to the terminal $\overline{6}$ rather than to the terminal 6, the channel 1054 is enabled rather than channel 1030 in combination with the channel 1110 enabled by the decoding network 1110 when the stages 933–935 are reset to their normal condition. When the channels 1054 and 1110 are both enabled, indicating an improper reset condition, negative potentials are applied to the inputs of a pair of inverters 822 and 824 forming a NAND gate. These negative potentials place these two inverters in a conductive condition so that a more positive potential or ground is applied to a pair of normally open contacts 830*b* on a word reset switch 830.

Upon visually determining the improper reset condition, the test operator manually actuates the word reset switch 830 so that the contacts 830*b* and an additional pair of normally open contacts 830*a* are closed. The closure of the contacts 830*b* applies ground potential to the reset terminal of the input flip-flop 931 so that this flip-flop is restored to its proper reset or normal condition in which ground potential is applied to the terminal 6 rather than the terminal $\overline{6}$. Further, when the contacts 830*a* are closed, a pulse generator 850 is placed in operation to transmit a negative-going pulse through a pair of normally closed contacts 841 on the word advance switch 840 and a diode 858 in the NOR gate to the input of the inverter 861. This inverter is momentarily placed in conduction to reset the remaining stages 931–935 of the word counting circuit 930 in the manner described above.

The word advance switch 840 can also be actuated to advance the setting of the word counting circuit 930 step-by-step. More specifically, when the switch 840 is operated, the contacts 846 and 841 are opened together with a pair of contacts 843, and a plurality of normally open contacts 842, 844, and 845 are closed. The closure of the contacts 845 and 844 connects the complementing input of the flip-flop 931 to the positive-going pulse output from the pulse generator 850. The opening of the contacts 841 disconnects the negative pulse output of the generator 850 from the diode 858, and the concurrent closure of the contacts 842 grounds the negative pulse terminal so that this generator can supply only positive-going pulses. The opening of the contacts 843 removes the ground normally applied to the positive pulse output terminal of the generator 850. The opening of the contacts 846 disconnects the input flip-flop 931 from the resetting means in the bit counter 76. Thus, the closurer of the switch 840 coupled with the operation of the switch 830 advances the word counter 930 a single step. The switch 840 is restored to it normal position to return the word counting circuit 930 to its normal operating condition.

The word counter 80 also includes an assembly 900 for directly operating the word counting circuit 930 to a setting in which any desired one of the twenty-six words in the memory 62 can be selected. The assembly 900, which is similar to the assembly 700 in the bit counter 76, can be operated in conjunction with but following the assembly 700 to permit a desired bit in a desired word to be selected.

The assembly 900 includes a group of thirteen switch units similar to three illustrated switch units 902, 906, and 908. Each of these units includes a pair of manually operated switching means for selecting two of the twenty-six words. A switch 904 in the unit 902 selects the twenty-fifth word and includes a plurality of contacts 904*a*–904*d* that are closed by actuation of the switch. The contacts 904*b* and 904*c* are preliminary make springs and operate prior to the closure of the contacts 904*a* and 904*d*. The closure of the contacts 904*b* controls the pulse generator 850 to reset the counting circuit 930 in the manner described above by placing the inverter 862 in a conductive condition. However, the closure of the contacts 904*c* connects the output of the inverter 862 to a setting lead for the input flip-flop 931 so that this flip-flop is operated to a condition in which ground potential is applied to the terminal $\overline{6}$ rather than the terminal 6 and thus alters the normal resetting of the chain 930 so that all of the flip-flops 931–935 are set in conditions in which the negative potential is applied to the output terminals 6, 7, 8, 9, and 10.

The closure of the contacts 904*a* and 904*d* selectively connects the output of the pulse amplifier 740 to a combination of diodes in accordance with the ones of the stages 931–935 that are to be operated to an alternate conductive condition under the control of five input inverters 936–940 individually associated with the flip-flop 931–935. More specifically, when the contacts 904*a* are closed, a negative-going pulse is forwarded through a diode 914 to the input of the inverter 936 which is placed in a conductive condition to apply a positive pulse to an input terminal to the flip-flop 931 so that ground potential is now applied to the terminal 6. The closure of the contacts 904*d* completes a circuit for forwarding negative pulses through a pair of diodes 910 and 912 to the inputs of the inverters 939 and 940. These inverters set the flip-flops 934 and 935 so that a more positive or ground potential is applied to the terminals 9 and 10. This combination of ground potentials on the terminals 6, $\overline{7}$, $\overline{8}$, 9, and 10 renders the driver channels 1030 and 1170 (I, C7) effective. As shown in the table in FIG. 29, this causes the selection of the twenty-fifth word.

When the apparatus 60 is to be placed in operation following the conditioning operations described above, the bit reset switch 820 is operated to clear the bit counter 76 so that the channel 1000 operates the switch group 1510 including the switches 1511, 1512, 1514, and 1516. This connects the sense conductor 1604 for all of the twenty-six cores 100 in the first bit position through the operated switches 1514 and 1516 to the input of the amplifier 1200. The operation of the switches 1511 and 1512 connects the inhibit conductor 1608 for the twenty-six cores 100 in the first bit position to the outputs of the inhibit pulse source 1450.

The operator then actuates the word reset key 830 so that the word counter 80 is restored to a normal condition in which the channels 1030 and 1110 are operative. If the counting circuit 930 does not return to a correct condition, this resetting failure is detected by the NAND gate including the inverters 822 and 824, and these inverters are placed in conduction in the manner described above to deliver a positive-going reset signal to the input flip-flop 931 through the closed contacts 830*b* on the key 830. The channel 1030 operates the switches 1500 and 1530. The operation of the switch 1500 connects the output of the read pulse source 1440 to the access diode 1502 and the conductor 1503, as well as the access diodes and the read conductors in word Nos. 5, 9, 13, 17, 21, and 25. The operation of the switch 1530 connects the write pulse source 1460 through the access diode 1532 to the write conductor 1505 for the first word, as well as to similar access diodes and write conductors in word Nos. 5, 9, 13, 17, 21, and 25. The channel 1110 operates the relay 1534 so that the common return for the conductors 1503 and 1505 in word No. 1 is connected to the return terminals of the read pulse source 1440 and the write pulse source 1460. The operated switch 1534 also connects the return terminals for word Nos. 2 and 3 to the return terminals on the pulse sources 1440 and 1460, but the access diodes in these words are not connected to the pulse sources 1440 and 1460. Thus, the core drivers 1440 and 1460 are conditioned to apply read and write signals to the twenty-four cores comprising the first word and the inhibit pulse source 1450 is conditioned to apply inhibit pulses to the twenty-six cores 100 occupying the first bit position. This means that the concurrent drives necessary for operating the core 100 to its various states are provided for only the single core 100 occupying the first bit position in word No. 1. In addition, the sense winding 1604 for only the cores occupying the first bit position is coupled to the input of the amplifier 1200.

The program generator 66 is normally maintained in an inoperative state by the negative inhibiting potential applied to the conductor 1425 by the set flip-flop 1424. When the cycle of operation is to be initiated, the switch 1372 is again momentarily closed so that the pulse generator 1370 supplies a negative-going pulse through the diode 1374 in the NOR gate to the input of the inverter 1378. This causes the resetting of the detectors 1220, 1230, 1240, and 1250 and the resetting of the generator control flip-flop 1424 in the manner described above so that the program generator 66 initiates the sequential generation of negative-going pulses in the eight time slots of the core testing time frame.

In the first time slot, the inhibit pulse source 1450 delivers an inhibit pulse through the operated switches 1511 and 1512 to the twenty-six cores 100 in the first bit position in all twenty-six words, and the write pulse generator 1460 superimposes an oppositely poled positive write plus operates the core 100 to the read state shown in closed switch 1530, the access diode 1532, and the closed switch 1534. Thus, the magnetic core 100 occupying the first bit position in word No. 1 is operated to the "1" condition shown in FIG. 25 of the drawings. During the second time slot, only the inhibit pulse generator 1450 is rendered effective to deliver an inhibit pulse to the conductor 1608 selected by the operated switches 1511 and 1512. However, this does not alter the magnetic state shown in FIG. 25 of the core under test.

During the third time slot, the read pulse generator 1440 delivers a positive-going read pulse to the read conductor 1503 through the closed switch 1500, the access diode 1502, and the closed switch 1534. This plus operates the core 100 to the read state shown in FIG. 26. When the core 100 is operated from the condition shown in FIG. 25 to the condition shown in FIG. 26, the direction of the flux in the core leg 114 is reversed so that a "1" or "*d*1" response is developed in the sense winding afforded by the conductor 1604. This signal is coupled through the operated switches 1514 and 1516, the amplifier 1200, the attenuation network 1202, and the amplifier 1204 to be applied to the inputs of the "1" evaluating detectors 1220 and 1230.

Since the switch 1408 has been adjusted to a position selecting the negative pulse appearing in the third time slot, the inverter 1414 and the monostable delay circuit 1412 provide a negative-going strobe signal to the inputs of the detectors 1220 and 1230 in a time position shifted from the beginning of the third time slot and having a duration of around four hundred nanoseconds. If the amplitude of the "1" response signal shown by the waveform 2800 (FIG. 28) is greater than the minimum limit represented by the line 2802 and is not greater than the limit represented by the line 2804, the detector 1220 remains reset and detector 1230 is set. Thus, at the end of the third time slot, both of the diodes 1270 and 1271 are enabled, and the inverter 1272 is placed in a nonconductive condition so that a more negative potential is applied to the input of an inverter 1300 forming one half of a NAND gate. This negative potential is also applied to the input of an inverter 1304 to place this inverter in a conductive condition so that the energization of a lamp 1308 by a lamp amplifier 1306 is terminated. The termination of the illumination of the lamp 1308 indicates that the "1" evaluation test on the bit No. 1 core in word No. 1 has been satisfactorily completed.

During the fourth time slot, the write amplifier 1460 is again enabled so that only the write conductor 1505 is energized through the closed switches 1530 and 1534 and the access diode 1532. This operates the core 100 in the bit No. 1 position of word No. 1 to the magnetic state shown in FIG. 23 of the drawings. During the fifth time slot, the inhibit pulse source 1450 is rendered effective to apply an inhibit signal to the conductor 1608 linking all of the cores 100 in the bit No. 1 position in word Nos. 1–26 through the operated switches 1511 and 1512. This operates the core 100 in the bit No. 1 position of word No. 1 to the "*d*0" state shown in FIG. 24 of the drawings.

During the sixth time slot, the program generator 66 enables the read pulse source 1440 so that a positive-going read signal is transmitted through the closed switches 1500 and 1534 and the access diode 1502 to be applied to all of the cores 100 in word No. 1. Since the sense conductor 1604 for only the cores 100 in bit position No. 1 is rendered effective by the closed switches 1514 and 1516, the "*d*0" response potential induced therein is coupled through the amplifier 1200, the attenuating network 1202, and the amplifier 1206 to be applied to the inputs of the "0" evaluating detectors 1240 and 1250. During this same sixth time slot, the inverter 1406 and the monostable circuit 1404 provide a 400–500 nanosecond negative enabling potential to the strobe inputs of the detectors 1240 and 1250 so that these detectors are rendered responsive to the "*d*0" signal.

If the amplitude of the "*d*0" response signal represented by the waveform 2806 (FIG. 28) is less than the level represented by the line 2810 and greater than the level represented by the line 2808, the detector 1240 remains reset and the detector 1250 is set. With this condition, which is also indicated by the selective illumination of the lamps 1224, 1234, 1244, and 1254, both of the diodes 1273 and 1274 are enabled so that the inverter 1275 is placed in a nonconductive condition. This forwards a negative potential to the input of an inverter 1310 which is placed in conduction. When the inverter 1310 is placed in conduction, the illumination of a lamp 1314 by a lamp amplifier 1312 is terminated to provide a visible indication that the "*d*0" response of the core 100 under test has been satisfactory.

The negative potential provided at the output of the inverter 1275 is also applied to the input of an inverter 1302 in the NAND gate. Both of the inverters 1300 and 1302 are now in a conductive condition indicating the satisfactory completion of the "1" and "*d*0" evaluations. When both of the inverters 1300 and 1302 are placed in a conductive condition, a more positive or ground signal is forwarded over the conductive segment 1268 of the switching assembly 1260 to the diode 1344 in the AND gate connected to the input of the inverter 1348. When the program generator 66 reaches the eighth time slot, the inverter 1422 is again placed in a nonconductive condition so that the inverter 1416 is placed in a conductive condition. This resets the control flip-flop 1424 so that further operation of the program generator 66 is inhibited in the manner described above. Further, the conductive inverter 1416 completes the enabling of the AND gate so that the inverter 1348 is placed in a nonconductive condition.

If the switch 1350 is operated to the condition in which the contacts 1352 and 1354 are closed, the negative potential provided at the output of the inverter 1348 is forwarded through the closed contacts 1352 to place the inverter 1356 in a conductive condition. This transmits a positive-going pulse to the input flip-flop 721 in the bit counting circuit 720 to reverse the conductive state of this stage. When this happens, the channel 1000 is no longer enabled, and the channel 1002 is enabled. When the channel 1000 is disabled, the relays 1511, 1512, 1514, and 1516 are released and the four relays in the group 1520 are operated. The release of the relays in the group 1510 disconnects the inhibit winding 1608 for the twenty-six cores in bit position No. 1 from the inhibit pulse generator 1450 and also disconnects the sense winding 1604 for these twenty-six cores from the input of the amplifier 1200. The concurrent operation of the four corresponding relays in the group 1520 connects the inhibit winding 1608 for the twenty-six cores in bit position No. 2 to the output of the inhibit pulse generator 1450 and also connects the sense winding 1604 for the cores in bit position No. 2 to the input of the amplifier 1200. Thus, the bit counter 76 is now advanced from a setting selecting the cores 100 in bit position No. 1 to the setting selecting the cores 100 in bit position No. 2.

The positive-going pulse provided at the output of the inverter 1356 is also applied to the input of the inverter 1358 so that this inverter is returned to a nonconductive condition to supply a more negative potential through the closed contacts 1354 to the diode 1376 in the NOR gate connected to the input of the inverter 1378. This places the inverter 1378 in a nonconductive condition to reset the plurality of detectors 1220, 1230, 1240, and 1250. When these detectors are reset, all of the lamps 1224, 1234, 1244, and 1254 are restored to a darkened condition, and the enabling signal for the gates connected to the inputs of the inverters 1272 and 1275 is terminated. This restores these inverters to a conductive condition and, through the inverters 1304 and 1310, restores the illumination of the lamps 1308 and 1314. It further disables the NAND gate including the inverters 1300 and 1302 so that the inverters 1348, 1356, 1358, and 1378 are restored to their normal conditions of conduction. However, at the same time that the detectors 1220, 1230, 1240, and 1250 are reset, the inverter 1380 controls the inverter 1434 to set the delay circuit 1432. After a delay sufficient to complete the resetting operation described above, the monostable circuit 1432 controls the inverter 1426 to reset the flip-flop 1424. When the flip-flop 1424 is reset, the inhibit is removed from the program generator 66, and a second cycle of testing operation is initiated during which the single core 100 in bit position No. 2 of word No. 1 is tested in the manner described above.

This operation continues until such time as each of the twenty-four cores in word No. 1 have been tested. At this time, the inverter in the channel 1022 resets the bit counting circuit 720 and forwards an operating signal to the word counter 930 so that the channel 1030 is disabled and the channel 1050 is enabled. When the channel 1030 is rendered ineffective, the relays 1500 and 1530 are released, and when the channel 1050 is rendered effective, the relays 1504 and 1538 are operated to connect the read pulse source 1440 and the write pulse source 1460 to the read and write conductors 1507 and 1509 in the second word. Since the status of the channel 1110 is not altered, the relays 1534 remains operated so that a common return is provided for the conductors 1507 and 1509. With the resetting of the bit counting circuit 720, the relay group 1510 is again operated so that the core 100 in bit position No. 1 in word No. 2 is now prepared for test. Thus, when the program generator 66 is next placed in operation, signals provided during the first time frame test or evaluate the core 100 in the bit No. 1 position of word No. 2.

All of the twenty-four cores in bit position Nos. 1–24 in word No. 2 are now tested, following which the bit counting circuit 720 is reset and the word counting circuit 930 is advanced another step to disable the drive channel 1050 and to enable the channel 1052. During the next sequence of testing cycles of the program generator 66, the cores in bit position Nos. 1–24 in word No. 3 are tested. At the completion of this cycle of operation, the bit counter 720 is again reset to select the bit No. 1 position and the word counter 930 is advanced an additional step. In being advanced to this step, the channel 1052 is disabled, and the channel 1054 is enabled. Further, the channel 1110 is disabled, and the channel 1120 is enabled. This causes the release of the relay 1534 and the operation of a corresponding relay controlled by the channel 1120 so that during the next series of operations, the twenty-four cores occupying bit position Nos. 1–24 in word No. 4 are checked, as illustrated in FIG. 29.

This operation continues until all of the cores 100 in the memory 62 have been checked. This checking operation proceeds very rapidly and requires the expenditure of relatively short time. Thus, it is possible to repeat the entire testing sequence for all of the cores 100 in the memory 62 merely by leaving the switch 1350 in a run condition. The system 60 will continue to repeat the testing cycle until such time as the switch 1350 is opened or until such time as a core is encountered during the testing operation that does not satisfy test standards. When this occurs, one of the inverters 1272 or 1275 remains in a conductive condition at the end of the test program, and the NAND gate including the inverters 1300 and 1302 is not completely enabled. Thus, the program generator 66 remains inhibited, and an advance signal is not supplied to the bit counter 76. An inspection of the illuminated ones of the lamps 1014, 1044, and 1119 locates the improper core.

At this time, the switching assembly 1350 can be operated to the illustrated repeat condition in which the contacts 1351 and 1353 are closed. The potentiometers 1292, 1294, 1296, and 1298 can be adjusted to determine the value of the inadequate "*d*0" or "1" response or merely to enable testing operations to continue after initiation by operation of the key or switch 1372. Further, the switch 1350 can be operated to the repeat setting in which the contacts 1351 and 1353 are closed to permit a single core in the memory 62 to be checked a number of times. In addition, with the switch 1350 in the run condition in which the contacts 1352 and 1354 are closed, any of the parameters provided by the potentiometers 1292, 1294, 1296, and 1298 can be varied to permit marginal cores 100 to be detected.

What is claimed and desired to be secured by Letters Patent of the United States is:

1. An apparatus for testing a memory unit including a plurality of magnetic elements each operable to a plurality of different magnetic states and each having at least one opening comprising a pair of signal responsive detecting means for evaluating the response of the magnetic elements, a sense winding linking the openings in the plurality of magnetic elements and operable to provide oppositely poled response signals representing like magnetic states in successive ones of the magnetic elements, and means coupled between the sense winding and the pair of detecting means for applying oppositely poled signals to the two detecting means for each response signal of either polarity provided by the sense winding.

2. In an apparatus for testing the magnetic cores, a pair of signal responsive detecting means, means for supplying reference signals to the detecting means representing test limits, means controlled by a core under test for supplying cariable signals to the detecting means for comparison with the reference signals, evaluating means controlled by the detecting means to indicate the results of the signal comparison in the pair of detecting means, and manually operable means for changing the response of the evaluating means to the pair of detecting means in accordance with the nature of the test being performed on the cores.

3. In an apparatus for testing the response signals derived from a magnetic core under test, a pair of signal responsive detecting means supplied with the response signals and including output means to which output signals are applied in dependence on the received response signals, indicating means controlled by the output signals for providing an indication of the satisfactory and unsatisfactory nature of the response signals, and means operable to a first setting for connecting the output means to the indicating means in a first manner when the pair of detecting means evaluates response signals of opposite polarities and operable to a second setting for connecting the output means to the indicating means in a second manner when the pair of detecting means evaluates a response signal of a single polarity.

4. In an apparatus for testing magnetic cores, a pair of signal responsive detecting means, means for supplying reference signals to the detecting means representing test limits, first means controlled by a core under test for supplying core response signals of opposite polarities to the pair of detecting means, second means controlled by a core under test for supplying core response signals of a single polarity to the pair of detecting means, and control means operable to one setting to render the first means effective to supply core response signals to the detecting means and operable to another setting to render the second means operative to supply core response signals to the detecting means.

5. An apparatus for testing a memory unit including a plurality of magnetic elements each operable to a plurality of different magnetic states and each having at least one opening comprising a pair of signal responsive detecting means for evaluating the response of the magnetic elements, a common sense winding passing through the openings in the plurality of magnetic element to link all of the elements and operable to provide oppositely poled response signals representing like magnetic states in successive ones of the magnetic elements, means coupling the response signals from the sense winding to the two detecting means, and means responsive to the oppositely poled response signals to operate alternate ones of the detecting means for providing an indication of the condition of successive ones of the magnetic elements.

6. An apparatus for testing a unit including a plurality of magnetic elements each operable to alternate "0" and "1" magnetic states and each having at least one opening comprising a pair of signal responsive "1" evaluating means, a pair of signal responsive "0" evaluating means, a single sense winding serially passing through the openings of the plurality of magnetic elements in opposite directions to provide oppositely poled response signals from the serially linked magnetic elements, means coupling the sense winding of the pair of "1" evaluating means and the pair of "0" evaluating means, means for placing the magnetic elements to their different magnetic states to generate "1" and "0" response signals in the sense winding, and means responsive to the oppositely poled response signals to operate different pairs of the evaluating means including one of the "1" evaluating means and one of the "0" evaluating means for indicating the results of the evaluation of successive ones of the magnetic elements.

7. An apparatus for testing a unit including a plurality of magnetic elements each operable to alternate "0" and "1" magnetic states and each having at least one opening comprising a pair of signal responsive "1" evaluating means, a pair of signal responsive "0" evaluating means, a single sense winding serially linking the openings of the plurality of magnetic elements in opposite directions to provide oppositely poled responsive signals from successive ones of the serially linked magnetic elements, means coupling the sense winding to the pair of "1" evaluating means and the pair of "0" evaluating means, drive means for supplying operating signals to operate each of the magnetic elements to at least two different magnetic states in sequence to provide "0" and "1" response signals, sequencing means for rendering the drive means effective to drive the plurality of magnetic elements in sequence, and control means rendering the pairs of "0" and "1" evaluating means responsive to signals from the sense winding in sequence.

8. The apparatus set forth in claim 7 including means operated in synchronism with the sequenching means for controlling the drive means to change the polarity of at least one of the operating signals supplied to successive ones of the magnetic elements.

9. The apparatus set forth in claim 7 including two indicating means for indicating the results of tht evaluation operations, each of the indicating means being controlled by a different pair of the "0" and "1" evaluating means.

10. An apparatus for testing a unit including a plurality of magnetic elements operable to different magnetic states and linked by a common sense winding, each of said magnetic elements including at least one opening, comprising signal responsive evaluating means coupled to the sense winding, a plurality of mechanical means each movable into one of the openings to establish a plurality of drive windings each individual to one of the magnetic elements, program means for energizing the drive windings in a given sequence to sequentially operate the magnetic elements to their different magnetic states, and means controlled by the evaluating means and the program means for indicating the condition of each of the magnetic elements.

11. The apparatus set forth in claim 10 in which the sense winding links successive cores in such a manner that successive cores produce oppositely poled response signals in the sense winding, and in which the evaluating means includes a pair of detecting means alternately responsive to the response signals.

12. An apparatus for testing a unit including a plurality of magnetic elements, comprising a common sense winding which links all of the magnetic elements and in which response signals are induced by changes in the magnetic states of the individual magnetic elements, the sense winding linking different ones of the magnetic elements in an opposite direction, signal responsive evaluating means coupled to the sense winding and operable to evaluate the response signals developed in the sense winding by the changes in the magnetic states of the individual elements, and drive means coupled to the magnetic elements for applying drive signals to the magnetic elements in sequence to operate the magnetic elements to their different magnetic states, said drive means including means for reversing the polarity of at least one of the drive signals applied to alternate ones of the magnetic elements.

13. An apparatus for testing a unit including a plurality of magnetic elements each operable to different magnetic states to produce at least two different response signals, winding means linking the plurality of magnetic elements, a pair of signal responsive evaluating means coupled by the winding means to the plurality of magnetic elements to evaluate the response signals, drive means for operating the magnetic elements to their different magnetic states to produce the two different response signals, selecting means coupled to the drive means for rendering the drive means effective to operate different selected ones of the elements, program means for operating the drive means through a fixed test program in which a given magnetic element is operated to its different magnetic states to produce the different response signals for evaluation, said program means also rendering different ones of the two evaluating means responsive to the different response signals from the given magnetic element at different points in the fixed test program, and control means for controlling the program means to repeat the fixed test program and for operating the selecting means to render the driver means effective to control a different magnetic element during each test program.

14. The apparatus set forth in claim 13 including indicating means controlled by the evaluating means for indicating an improper response from a magnetic element, and means controlled by the indicating means for arresting operation of the control means.

15. The apparatus set forth in claim 13 including indicating means controlled by the evaluating means when one of the magnetic elements does not operate properly for providing a visual indication identifying the improperly operating magnetic element.

16. An apparatus for testing units having a number of magnetic elements each operable to different magnetic states comprising driver means for operating a magnetic element to its different magnetic states to produce responsive signals, evaluating means for evaluating response signals received from a magnetic element, test program means for operating the driver means and evaluating means through a selected test program in which a magnetic element is operated to its different magnetic states and the responses of the magnetic element are evaluated by the evaluating means, selecting means operable to select the magnetic elements in sequence for evaluation by the driver means and evaluating means, and means interconnecting the test program means and the selecting means to control the test program means to repeat the test program for each magnetic element selected by the selecting means.

17. An apparatus for testing units having different numbers of magnetic elements each operable to different magnetic states comprising driver means for operating a magnetic element to its different magnetic states to produce responsive signals, evaluating means for evaluating response signals received from a magnetic element, test program means for operating the driver means and evaluating means through a selected test program in which a magnetic element is operated to its different magnetic states and the response of the magnetic element is evalutaed by the evaluating means, selecting means operable to select the magnetic elements in sequence for evaluation by the driver means and evaluating means, means interconnecting the test program means and the selecting means to control the test program means to repeat the test program for each magnetic element selected by the selecting means, and means for conditioning the selecting means to select different numbers of magnetic elements.

18· The apparatus set forth in claim 17 including means controlled by the evaluating means for arresting operation of the selecting means.

19. The apparatus set forth in claim 17 including manually operable means for operating the selecting means to select a desired one of the number of magnetic elements.

20. An apparatus for testing units having different numbers of magnetic elements each operable to different magnetic states comprising driver means for operating a magnetic element to its different magnetic states to produce responsive signals, evaluating means for evaluating response signals received from a magnetic element, test program means for operating the driver means and evaluating means through a selected test program in which a magnetic element is operated to its different magnetic state and the responses of the magnetic element are evaluated by the evaluating means, selecting means operable to select the magnetic elements in sequence for evaluation by the driver means and evaluating means, said selecting means including a plurality of counting stages, switching means operable to one position connection a group of the stages into a first counting circuit and operable to a second position connecting one group of the stages into a second counting circuit and another group of the stages into a third counting circuit driven at the end of each cycle of operation of the second counting circuit, and means for selectively operating the first and second counting circuits in synchronism with each performance of the test program by the test program means.

21. An apparatus for automatically testing each magnetic element in a memory unit containing a plurality of magnetic elements, test program means operable through a testing cycle in which a magnetic element is operated to different magnetic states and the response signals resulting from the operation of the magnetic elements to the different magnetic states are evaluated, indicating means controlled by the test program means for indicating the results of the response signal evaluations, selecting means operable to different settings to render different selected ones of the magnetic elements responsive to the test program means, and means controlled by the indicating means for operating the selecting means to its different settings.

22. The apparatus set forth in claim 21 including means controlled by the indicating means for arresting operation of the selecting means.

23. An apparatus for automatically testing each magnetic element in a memory unit containing a plurality of magnetic elements, test program means operable through a testing cycle in which a magnetic element is operated to different magnetic states and the response signals resulting from the operation of the magnetic elements to the different magnetic states are evaluated, indicating means controlled by the test program means for indicating the results of the responsive signal evaluations, selecting means including a plural stage counting circuit operable to different settings in a given counting sequence to render different ones of the magnetic elements responsive to control by the test program means, first means controlled by the indicating means to operate the counting means through the given counting sequence to select the magnetic elements in sequence, and second means including manually operable means for setting the counting circuit to any desired one of its settings to select any desired one of the magnetic elements.

24. An apparatus for testing units having a number of magnetic elements each operable to different magnetic states comprising driver means for operating a magnetic element to its different magnetic states to produce response signals, evaluating means for evaluating response signals received from a magnetic element, test program means for operating the driver means and evaluating means through a selected test program in which a magnetic element is operated to its different magnetic states and the responses of the magnetic element are evaluated by the evaluating means, selecting means operable to select the magnetic elements in sequence for evaluation by the driver means and evaluating means, means interconnecting the test program means to repeat the test program for each magnetic element selected by the selecting means, and means for controlling the test program means and the selecting means to repeatedly subject a selected core to a number of the test programs.

25. An apparatus for testing units having a number of magnetic elements each operable to different magnetic states comprising driver means for operating a magnetic element to its different magnetic states to produce response signals, evaluating means for evaluating response signals received from a magnetic element, test program means for operating the driver means and evaluating means through a selected test program in which a magnetic element is operated to its different magnetic states and the responses of the magnetic element are evaluated by the evaluating means, selecting means operable to select the magnetic elements in sequence for evaluation by the driver means and evaluating means, means interconnecting the test program means to repeat the test program for each magnetic element selected by the selecting means, and manually operable means connected to the test program means for changing the test program to place the magnetic elements in other magnetic states and to condition the evaluating means to evaluate the response signals resulting from these other magnetic states.

26. An apparatus for testing units having a number of magnetic elements each operable to different magnetic states comprising driver means for operating a magnetic element to its different magnetic states to produce response signals, evaluating means for evaluating response signals received from a magnetic element, a pulse source providing signals defining distinct time slots in a repetitive time frame, test program means controlled by the pulse source for operating the driver means and evaluating means through a selected test program during a single time frame in which a magnetic element is operated to its different magnetic states in selected time slots and the responses of the magnetic element are evaluated by the evaluating means in certain of the time slots, selecting means operable to select the magnetic elements in sequence for evaluation by the driver means and evaluating means, and control means interconnecting the test program means and the selecting means to control the test program means to repeat the test program for each magnetic element selected by the selecting means, said control means inhibiting operation of the pulse source at the end of each time frame and until the next magnetic element is selected by the selecting means.

(References on following page)

References Cited

UNITED STATES PATENTS

| | | | |
|---|---|---|---|
| 2,679,025 | 5/1954 | Rajchman et al. | 324—34 |
| 2,760,153 | 8/1956 | Rajchman et al. | 324—34 |
| 2,922,518 | 1/1960 | Kristensen | 324—34 X |
| 3,235,802 | 2/1966 | Biard et al. | 324—73 X |
| 3,248,721 | 4/1966 | Cockrell et al. | 324—73 X |
| 3,249,926 | 5/1966 | Ashley | 324—34 X |
| 3,253,134 | 5/1966 | North | 324—73 X |

OTHER REFERENCES

Dawley, Magnetic Core Evaluation System, IBM Technical Disclosure, vol. 2, No. 6, p. 126, April 1960.

Healey et al., Core Tester, IBM Technical Disclosure, vol. 1, No. 2, pp. 38 and 39, August 1958.

RUDOLPH V. ROLINEC, *Primary Examiner.*

R. J. CORCORAN, *Assistant Examiner.*

U.S. Cl. X.R.

324—73; 340—174

L-566-PT
(6-69)

UNITED STATES PATENT OFFICE
CERTIFICATE OF CORRECTION

Patent No. 3,440,526 Dated April 22, 1969

Inventor(s) William H. Kastning

It is certified that error appears in the above-identified patent and that said Letters Patent are hereby corrected as shown below:

Column 6, line 45, "transflux" should read --transfluxor--. Column 10, line 9, "303" should read --302--. Column 14, line 50 "and" should read --a--; line 51, "distributed" should read --disturbed--. Column 16, line 3, "to the output of the" should read --this pulse source over--; line 43, "permitt" should read --permit--; same line, "he" should read --the--. Column 18, line 47, "solt" should read --slot--. Column 20, line 29, after "of", second occurrence, should read --each of--. Column 21, line 75, "diabled" should read --disabled--. Column 31, line 31, "twentyy" should read --twenty--. Column 35, line 30, "1", second occurrence, should read --1̄--; line 33, "270" should read --720--. Column 38, line 45, "tht" should read --the--. Column 39, line 45, "closurer" should read --closure--. Column 40, line 9, "flop" should read --flops--. Column 41, line 18, "plus operates the core 100 to the read state shown in" should read --pulse on the core 100 in only the first word through the --. Column 41, line 32, "plus" should read --pulse--. Claim 2, column 44, line 47, "cariable" should read --variable--. Claim 5, column 45, line 14, "element" should read --elements--. Claim 8, column 45, line 61, "sequenching" should read --sequencing--. Claim 9, column 45, line 66, "tht", second occurrence, should read --the--. Claim 16, column 46, line 67, "responsive" should read --response--. Claim 17, column 47, line 9, "responsive" should read --response--; column 47, line 14, "evalutaed" should read --evaluated--. Claim 20, column 47, line 34, "responsive" should read --response--; column 47, line 44, "connection" should read --connecting--. Claim 23, column 48, line 3, "responsive" should read --response--.

SIGNED AND SEALED
OCT 6 - 1970

(SEAL)
Attest:

Edward M. Fletcher, Jr.
Attesting Officer

WILLIAM E. SCHUYLER, JR.
Commissioner of Patents